US012744033B1

(12) United States Patent
Strimel et al.

(10) Patent No.: US 12,744,033 B1
(45) Date of Patent: Sep. 22, 2026

(54) CONTEXTUAL INFORMATION FOR SPOKEN LANGUAGE PROCESSING

(71) Applicant: Amazon Technologies, Inc., Seattle, WA (US)

(72) Inventors: Grant Strimel, Presto, PA (US); Feng-Ju Chang, Pittsburgh, PA (US); Srikrishna Kompella, Homestead, PA (US); Saumya Yashmohini Sahai, Pittsburgh, PA (US); Mingzhi Yu, Bethel Park, PA (US); Kanthashree Mysore Sathyendra, Sunnyvale, CA (US); Jing Liu, Pittsburgh, PA (US); Ross William McGowan, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 163 days.

(21) Appl. No.: 18/521,526

(22) Filed: Nov. 28, 2023

(51) Int. Cl.
*G10L 15/18* (2013.01)
*G10L 15/187* (2013.01)
*G10L 15/22* (2006.01)

(52) U.S. Cl.
CPC ............ *G10L 15/187* (2013.01); *G10L 15/22* (2013.01)

(58) Field of Classification Search
CPC .............................. G10L 15/187; G10L 15/22
See application file for complete search history.

(56) References Cited

U.S. PATENT DOCUMENTS

| | | | | |
|---|---|---|---|---|
| 11,386,890 | B1 * | 7/2022 | Fan | G10L 15/197 |
| 2017/0278514 | A1 * | 9/2017 | Mathias | G06F 16/35 |
| 2019/0103101 | A1 * | 4/2019 | Danila | G10L 15/22 |
| 2021/0034662 | A1 * | 2/2021 | Aher | G06F 16/635 |
| 2021/0118442 | A1 * | 4/2021 | Poddar | G10L 15/32 |
| 2022/0180867 | A1 * | 6/2022 | Bobbili | G10L 15/30 |
| 2022/0222441 | A1 * | 7/2022 | Liu | G06F 40/35 |
| 2023/0343331 | A1 * | 10/2023 | Manuvinakurike | G10L 15/063 |

* cited by examiner

*Primary Examiner* — Qian Yang
(74) *Attorney, Agent, or Firm* — Pierce Atwood LLP

(57) ABSTRACT

Techniques for generating a multi-modal, context aware embedded representation of an entity and contextual data associated with the entity are described. The system may receive a natural language entity for which an embedded representation is to be generated. The system uses the natural language entity to determine/generate various context data associated with the entity (e.g., slot type, usage example, phonemes, audio data, image/video data, etc.). The system may tokenize and encode the natural language entity and the context data. Thereafter, the encoded entity and the context data may be inputted to a language model, which generates a single embedded representation corresponding to the entity and the context data. Thereafter, the embedded representation may be used by a system component for performing processing with respect to a user input.

20 Claims, 13 Drawing Sheets

CONTEXTUAL INFORMATION FOR SPOKEN LANGUAGE PROCESSING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
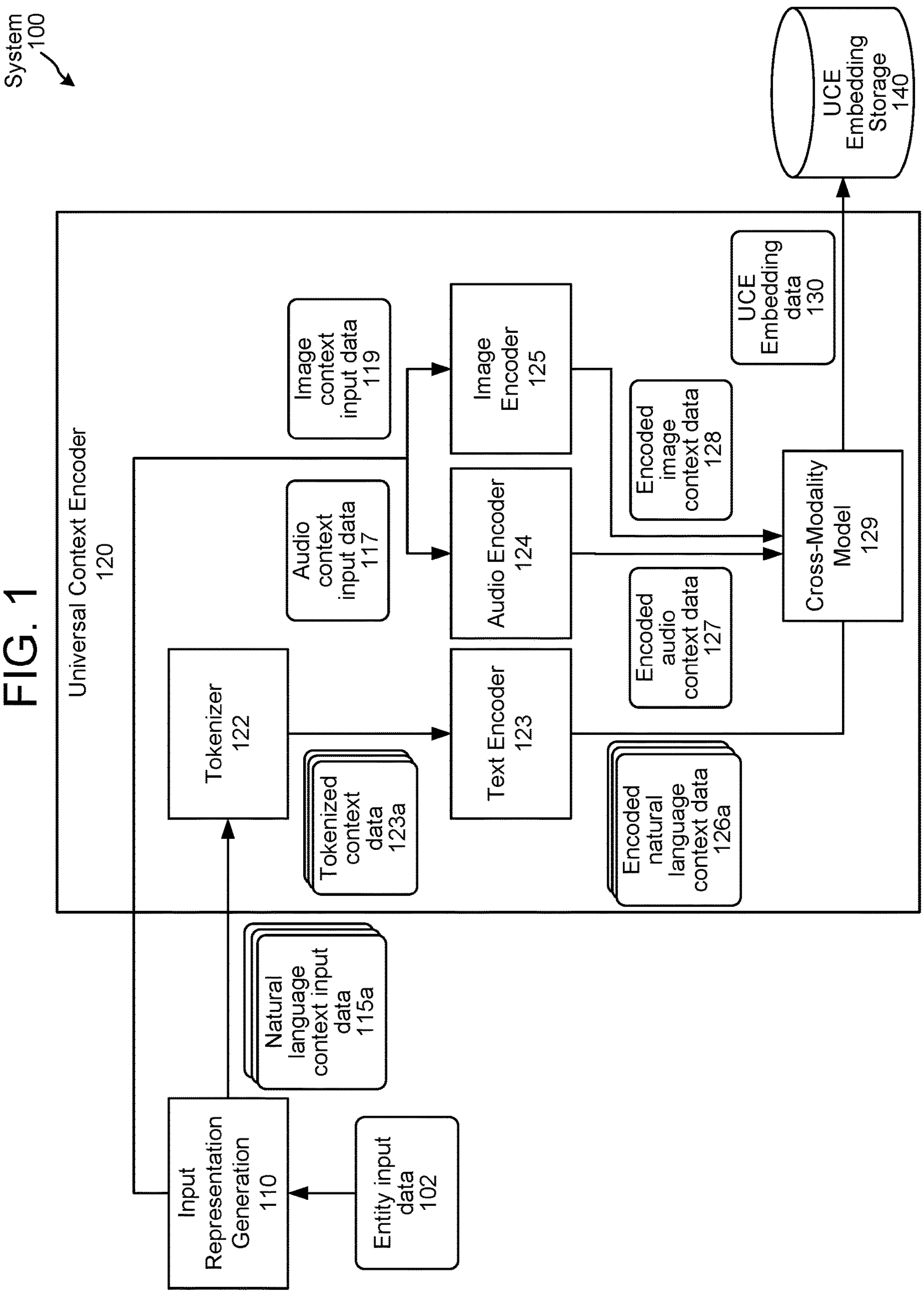
FIG. 1 is a conceptual diagram illustrating example components and processing of a system configured to generate an embedded representation of multi-modal data associated with an entity, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content. Language modeling (LM) is the use of various statistical and probabilistic techniques to determine the probability of a given sequence of words occurring in a sentence. LM can be used to perform various tasks including understanding a natural language input (e.g., when noise is present) and performing generative tasks that involve generating natural language output data.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform further processing on the ASR data to determine an action responsive to the user input.

The present disclosure describes techniques for generating multi-modal, context aware embedded representations corresponding to a natural language entity and various context data associated with the natural language entity. For example, for a natural language entity of "weekly recommendations," the system may generate an embedded representation corresponding to: the natural language entity; a slot type associated with the entity (e.g., "playlist name"); a phoneme representation corresponding to the entity (e.g., "w iy k l iy r eh k ah m ah n d ey sh ah n," or the like); an example usage (e.g., a natural language phrase(s) including the entity (e.g., a sentence(s) including the phrase, such as a sentence(s) determined from a storage (e.g., a profile storage), a database (e.g., the Internet), and/or a document), a user input including the entity, etc.) of the entity (e.g., "can you play my weekly recommendation playlist"); a definition of the entity (e.g., a natural language definition, a dictionary definition, etc.); audio data corresponding to the entity (e.g., audio including speech of "weekly recommendation"); and/or image/video data corresponding to the entity (e.g., a generated image corresponding to "weekly recommendation," image-based content that was being presented to a user when a user input including "weekly recommendation" was received, etc.).

The embedded representation may represent a contextual relationship(s) (e.g., a semantic relationship) between the entity, the slot type, the phoneme representation, the example usage, the definition, the audio, and/or the image/video. In other words, as each instance of the context data is associated with the entity, the instance of context data is also inherently associated with the other instances of context data associated with the entity. The embedded representation models both how the instance of context data relates (e.g., semantically) to the entity, as well as how the instance of context data relates to the other instances of context data associated with the entity (e.g., the embedded representation may represent how the example usage is (semantically) related to the entity as well as the slot type, the phoneme representation, the definition, the audio and/or the image/video). The system may use the embedded representation to perform processing with respect to a user input including the entity (e.g., to perform automatic speech recognition (ASR) processing and/or to perform natural language understanding (NLU) processing).

The present disclosure describes techniques for generating an embedded representation corresponding to a natural language entity and various (multi-modal) context data associated with the natural language entity, where the embedded representation corresponds to contextual relationships (e.g., semantic relationships) between the natural language entity and the various context data. Context data associated with a natural language entity may include a slot type associated with the entity (e.g., "user's name," "contact name," "application name," "custom device name," etc.), a phoneme representation of the entity, an example usage of the entity, a definition associated with the entity, audio data associated with the entity, image/video data associated with the entity, etc.

The system may be configured to determine an entity (e.g., from a user profile (e.g., an interaction history between a user and the system, contact names, playlist names, device names, application names, preferred pronunciations, etc.) and associated context data. In some embodiments, the associated context data may be retrieved by the system (e.g., from a user profile, along with the entity). In other embodiments, the system may generate the associated context data using the entity. For example, the system may use the entity to determine a slot type associated with the entity (e.g., using a classifier, NLU techniques, etc.). For further example, the system may use the entity to generate a phoneme representation corresponding to the entity (e.g., using a lexicon, a phoneme recognition model, etc.) As another example, the system may use the entity to generate an example usage of the entity (e.g., using a carrier phrase classifier, a transformer-based model, a language model, etc.). As an additional example, the system may use the entity to generate a definition associated with the entity (e.g., using a storage, a look-up, etc.). As an even further example, the system may use the entity to generate audio data representing a spoken version of the entity (e.g., using TTS techniques). As another example, the system may use the entity to generate image data and/or video data corresponding to the entity (e.g., using an image generation model, such as a stable diffusion model, a visual autoencoder, a generative adversarial network, a multi-modal transformer-based model, etc.).

The system may tokenize the entity and the associated context data. In some embodiments, the entity and associated context data may be further labeled to include an indication (e.g., a label, a tag, a specialized token, etc.) of the data type corresponding to the entity and the associated context data (e.g., "entity," "slot type," "phonemes," "example usage," "definition," "audio," "image," "video," etc.). The tokenized entity and associated context data may be input to an encoder (e.g., a language model, a BERT-based encoder, etc.), which may generate encoded representations of each of the inputs. The encoded representations may be input to a language model (e.g., a BERT-based model, large language model (LLM), Alexa generative model(s), etc.), which may generate the embedded representation corresponding to the entity and the associated context data. Thereafter, the embedded representation may be stored, and later retrieved for use by one or more components during processing performed with respect to a user input (e.g., an ASR component and/or an NLU component). For example, embedded representations for various terms may be used during ASR processing via an attention mechanism (e.g., a multi-head attention component, neural biasing, etc.) to enable application of attention to those entities and enable more accurate recognition of those entities.

In some embodiments, the embedded representation may be used by a LLM-based user input processing system. The embedded representation may be provided to a LLM. In other cases, the data used to generate the embedded representation, for example, the entity, the slot type, example usage, etc. may be included in a prompt to the LLM as example entities and associated data.

In some embodiments, the embedded representation may be stored in association with a particular user profile(s) and may be retrieved in response to the system performing processing with respect to a user input associated with the user profile(s).

The embedding representations, corresponding to various information related to an entity, can be used for other types of processing, such as sentiment detection, image processing, user recognition, skill selection, processing by skills, etc.

As used herein, an "entity" refers to one or more natural language words corresponding to a person, a place, a thing, or a natural language term that may relate to a user input (e.g., included in a user input, referred to implicitly by a user input, determined by the system as relating to the user input, etc.) and may be used by the system to process with respect to the user input. For example, an entity may be a person a user wants to contact, an address that a user wants to navigate to, a song or a playlist that a user wants to listen to, an event that a user wants information on, a media item (e.g., TV show, movie, podcast, etc.) that a user wants to access or learn more about, a product that a user wants to purchase, an item that a user wants to add to a list, a food item that a user wants to order, etc.

Teachings of the present disclosure provide, among other things, improved computer processing by providing a single embedded representation for contextual relationships between an entity and various (multi-modal) context data associated with the entity. The system can use the embedded representation to improve accuracy of processing performed with respect to a user input. For example, ASR may more accurately recognize certain terms that may be specific for a user, such as contact names, addresses, favorite items, user-provided device names, etc. by considering the embedded representation during speech recognition. Further, the embedded representation may be more representative of the entity and the associated context data as it may represent contextual relationships associated with various multi-modal context data (e.g., text, tokens (e.g., a word(s), a portion(s) of a word, and/or a character(s), such as punctuation), audio, image, video, etc.) associated with the entity.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates example components and processing of a system 100 configured to generate an embedded representation of a natural language entity (e.g., one or more natural language words) and various (multi-modal) context data associated with the natural language entity. The embedded representation may represent contextual relationships between the entity and the various context data and is usable by one or more system components to perform processing with respect to a user input. As shown in FIG. 1 the system 100 may include an input representation generation component 110, a universal context encoder 120 (also referred to herein as "UCE"), and a UCE embedding storage 140. As further shown in FIG. 1, the universal context encoder 120 may include a tokenizer component 122, a text encoder 123, an audio encoder 124, an image encoder 125, and a cross-modality model 129.

As shown in FIG. 1, the input representation generation component 110 may receive entity input data 102. The entity input data 102 may be natural language text or tokens corresponding to an entity. The entity may be a natural language word(s) and may be a phrase in some cases. For example, the entity input data 102 may correspond to a user's name, a contact name, a device name, a user-defined device name, an application/skill name, a product name, a company name, a user-defined playlist name, an acronym, slang/idiom/jargon, etc.

In some cases, the entity input data 102 may be an entity that is specific for a user 505, for example, user-defined names, personalized entities, certain entities preferred by the user, user's addresses/locations (e.g., home, work, school, etc.), etc. In such embodiments, the entity may be associated with a user input, a user profile, etc. In some embodiments, the entity input data 102 may include various (multi-modal) context data associated with an entity. The (multi-modal) context data may be associated with a user input, a user profile, etc.

In some cases, the entity input data 102 may be an entity that is specific for a domain or skill. As an example, for a music domain or music skill, the entity input data 102 may be music artists, songs, albums, etc. As another example, for a food ordering skill, the entity input data 102 may be food items, beverages, etc. As such, the entity input data 102 may be used to provide domain or skill specific terms to components for processing. As yet another example, the entity input data 102 may be a new/updated domain name or a skill name that system components (e.g., ASR component) may not have been trained (yet) to recognize.

In some cases, the entity input data 102 may be an entity that a component may not have been trained/configured to process. Such may be the case for entities like new songs, new artists, new events, trending topics/news, trending persons, etc. For example, the entity input data 102 may be a song that may have been released recently, the ASR component may not have been trained (yet) to recognize the song name, and the embedded representation corresponding to the song name may be provided to the ASR component to enable more accurate speech recognition.

In some embodiments, the context data included in the entity input data 102 may be natural language text or tokens associated with the entity. For example, the natural language text or tokenized context data may correspond to a sentence including the entity, a user input including the entity, one or more words surrounding the entity in a sentence/user input, a topic/subject associated with the entity, a heading associated with the entity, a slot type associated with the entity, phonemes corresponding to the entity, a definition of the entity (e.g., a dictionary definition), etc. For further example, the natural language text or tokenized context data may, additionally or alternatively, correspond to metadata associated with the entity and/or other multi-modal information included in the entity input data 102 (e.g., labels, indicators, mark-up language, specialized token, and/or data type indicators (e.g., "entity," "slot type," "phoneme," "usage example," "definition," "image," "video," "audio," etc.)).

Additionally, or alternatively, the context data included in the entity input data 102 may, in some embodiments, include audio data associated with the entity. For example, the audio data may correspond to a speech version of the entity. For further example, the audio data may correspond to a spoken user input including the entity that was captured by a microphone(s) of a user device. As another example, the audio data may be synthesized speech that may have been output to a user.

Additionally, or alternatively, the context data included in the entity input data 102 may, in some embodiments, include image/video data associated with the entity. For example, for an entity of "rutabaga," the entity input data 102 may include an image/video of a rutabaga. For further example, for an entity of "Sharon" corresponding to a contact name, the entity input data 102 may include a contact image corresponding to the contact of "Sharon." As another example, for an entity corresponding to an application name, the entity input data 102 may include an application icon corresponding to the application. As an even further example, the image/video data may correspond to an image/video that was being presented to a user when a user input including the entity was received.

The entity input data 102 may be sent to the input representation generation component 110. For example, the entity input data 102 may be sent to the input representation generation component 110 in response to the system 100 generating a response to a user input, where the entity input data 102 is associated with an entity included in the user input. For further example, the entity input data 102 may be sent to the input representation generation component 110 in response to determining a confidence value with respect to ASR data generated for input audio data fails to meet a threshold confidence value, where the entity input data 102 is associated with an entity included in a user input corresponding to the input audio data. As another example, the entity input data 102 may be sent to the input representation generation component 110 in response to the system determining that ASR data corresponding to input audio data was erroneous and/or the resulted in user dissatisfaction, where the entity input data 102 is associated with an entity included in a user input corresponding to the input audio data. As an even further example, the entity input data 102 may be sent to the input representation generation component 110 in response to the input representation generation component 110 requesting context data associated with an entity be sent to the input representation generation component 110, where the entity input data 102 may be generated using information retrieved from a storage (e.g., based on the entity input data 102 not previously being sent to the input representation generation component 110). As an additional example, the entity input data 102 may be sent to the input representation generation component 110 based on the entity input data 102 corresponding to an entity that was recently added to a profile storage 670 by a user (e.g., a new contact name, new preferred pronunciation, new application name, new playlist name, new custom device name, etc.). In some embodiments, entity input data may be sent to the input representation generation component 110 periodically. As such, the entity input data 102 may be sent to the input representation generation component 110 based on a threshold amount of time having passed. In some embodiments, the entity input data 102 may be retrieved from a profile storage 670.

In some embodiments, the input representation generation component 110 may store the entity input data 102 in a storage, which may be included in the input representation generation component 110. The input representation generation component 110 may determine whether the entity input data 102 is associated with an entity for which the input representation generation component 110 has previously received entity input data for. For example, the input representation generation component 110 may determine whether the storage includes the entity associated with the entity input data 102. If the entity is already represented in the storage, the input representation generation component 110 may cease processing with respect to the entity input data 102 and, optionally, request new entity input data be sent. In some embodiments, the input representation generation component 110 may determine whether the entity input data 102 includes context data associated with the entity that is not included in the storage. If so, the input representation generation component 110 may store the new context data in the storage in association with the entity and may cause a new embedded representation corresponding to the entity to be generated using the context data associated with the entity, including the new context data.

In some embodiments, the entity input data 102 may correspond to more than one natural language term and/or associated context data. For example, the entity input data 102 may include a list of contact names, application names, playlist names, customized device names, etc. In such embodiments, the input representation generation component 110 may store the entity input data 102 in a storage and select an entity and/or associated context data from the storage to process as described herein below.

The input representation generation component 110 may be configured to process the entity input data 102 to generate natural language context input data 115*a-n*, which may correspond to the entity itself and one or more instances of natural language context data (e.g., text and/or tokens) included in the entity input data 102 and/or associated with the entity. For example, for entity input data 102*a* corresponding an entity of "weekly recommendation," the natural language context input data 115*a-n* generated by the input representation generation component 110 may include one or more of: context input data 115*a*: "weekly recommendation," corresponding to the entity; context input data 115*b*: "playlist name," corresponding to a slot type associated with the entity; context input data 115*c*: "w iy k l iy r eh k ah m ah n d ey sh ah n," corresponding to a phoneme representation of the entity; context input data 115*d* "please play the weekly recommendation playlist" corresponding to an example usage of the entity (e.g., a phrase including the entity (e.g., a natural language sentence including the entity), a user input including the entity, etc.); and/or context input data 115*e* corresponding to a definition of the entity.

The input representation generation component 110 may be further configured to process the entity input data 102 to generate audio context input data 117 corresponding to audio associated with the entity (a spoken user input including the entity). The input representation generation component 110 may be further configured to process the entity input data 102 to generate image context input data 119 corresponding to an image/video associated with the entity (e.g., visual content being presented when a user input including the entity was received, visual context generated as being associated with the entity, etc.).

In some embodiments, the input representation generation component 110 may generate the natural language context input data 115*a-n*, the audio context input data 117, and/or the image context input data 119 to include the corresponding context data included in the entity input data 102. For example, the entity input data 102*a* may further include one or more of the slot type of "playlist name" associated with the entity, the phoneme representation of the entity of "w iy k l iy r eh k ah m ah n d ey sh ah n," the example usage of the entity of "please play the weekly recommendation playlist," the definition of the entity, the image associated with the entity, the video associated with the entity, and/or the audio associated with the entity. In some embodiments, the input representation generation component 110 may be configured to generate the information included in the natural language context input data 115*a-n*, the audio context input data 117, and/or the image context input data 119 (e.g., using the entity). For example, in such embodiments, the input representation generation component 110 may generate the information included in the one or more of the natural language context input data 115*a-n* (e.g., the slot type, the phoneme representation of the entity, the example usage of the entity, the definition, etc.), the audio context input data 117 (e.g., the audio), and/or the image context input data 119 (e.g., the image/video), as is discussed in detail herein below with respect to FIG. 2.

In some instances, the natural language context input data 115*a-n*, the audio context input data 117, and/or the image context input data 119 may further include metadata (e.g., data type indicators) associated with the entity and the context data included in the natural language context input data 115*a-n*, the audio context input data 117, and/or the image context input data 119. The metadata may identify the type of data following the metadata. Such metadata may be a label, a tag, a specialized token, etc. (e.g., "entity," "slot type," "phoneme," "usage example," 'definition" "image," "video," "audio," [ENT], [SLT], [PHM], [EGS], [DEF], [IMG], [VID], [AUD], etc.). For example, for the entity input data 102*a* including an entity of "weekly recommendation," the natural language context input data 115*a-n* generated by the input representation generation component 110 may include one or more of context input data 115*a* "Entity, weekly recommendation", context input data 115*b* "Slot type, playlist name", context input data 115*c* "phoneme, w iy k l iy r eh k ah m ah n d ey sh ah n," context input data 115*d* "Usage example, please play the weekly recommendation playlist," and/or context input data 115*e* corresponding to "definition, [definition associated with the entity]." For further example, for the entity input data 102*a*, the audio context input data 117 generated by the input representation generation component 110 may correspond to "audio, [audio associated with the entity]." As another example, for the entity input data 102*a*, the image context input data 119 generated by the input representation generation component 110 may correspond to "image/video, [image/video associated with the entity]."

In some embodiments, the natural language context input data 115*a-n* may be aggregated or concatenated into one vector or one input. For example, the aggregated or concatenated version may be "[ENT] weekly recommendation [SLT] playlist name [PHM] w iy k l iy r eh k ah m ah n d ey sh ah n [EGS] please play the weekly recommendation playlist."

The natural language context input data 115*a-n*, the audio context input data 117, and/or the image context input data 119 may be sent to the universal context encoder 120, which is configured to generate a multi-modal, context aware embedded representation of the entity and the context data associated with the entity (e.g., corresponding to the natural language context input data 115*a-n*).

As shown in FIG. 1, the natural language context input data 115*a-n* may be received at the tokenizer component 122, which is configured to process the natural language context input data 115*a-n* to generate tokenized context data 123*a-n* corresponding to tokenized representations of the natural language context input data 115*a-n* (e.g., based on words, syllables, punctuation, etc.). For example, the tokenizer component 122 may process the context input data 115*a* "entity, weekly recommendation" to generate tokenized context data 123*a* representing "'entity' 'weekly' 'recommendation'," a numerical representation of "'entity' 'weekly' 'recommendation'," or the like. The tokenizer component 122 is discussed in more detail herein below with respect to FIG. 3.

The tokenized context data 123*a-n* may be sent to the text encoder 123, which is configured to generate encoded natural language context data 126*a-n* corresponding to a context-aware embedded representation of the tokenized context data 123*a-n*, where encoded natural language context data 126*a* corresponds to a context-aware embedded representation of the tokenized context data 123*a* and represents one or more contextual relationships (e.g., semantic relationship (s)) between one or more portions of the natural language information represented by the tokenized context data 123*a* (e.g., contextual relationships between one or more tokens of the tokenized context data 123*a*). In some embodiments, the text encoder 123 may correspond to a pre-trained text encoder (e.g., a Bidirectional Encoded Representations for Transformers (BERT) encoder). The text encoder 123 is discussed in more detail herein below with respect to FIG. 3.

The audio context input data 117 may be sent to the audio encoder 124, which is configured to generate encoded audio context data corresponding to a context-aware embedded representation of the audio context input data 117. In other words, the encoded audio context data 127 may correspond to a context-aware embedded representation of the audio context input data 117 and may represent one or more contextual relationships between one or more portions (e.g., frames) of the audio information represented by the audio context input data 117. In some embodiments, the audio encoder 124 may correspond to a pre-trained audio encoder (e.g., a BERT encoder).

The image context input data 119 may be sent to the image encoder 125, which is configured to generate encoded image context data corresponding to a context-aware embedded representation of the image context input data 119. In other words, the encoded image context data 128 may correspond to a context-aware embedded representation of the image context input data 119 and may represent one or more contextual relationships between one or more portions (e.g., pixels, frames, etc.) of the image/video information represented by the image context input data 119. In some embodiments, the image encoder 125 may correspond to a pre-trained image encoder (e.g., a BERT encoder).

The encoded natural language context data 126*a-n*, the encoded audio context data 127, and/or the encoded image context data 128 may be sent to the cross-modality model 129, which is configured to generate UCE embedding data 130 corresponding to a multi-modal, context aware embedded representation of the encoded natural language context data 126*a-n*, which represents one or more contextual relationships (e.g., semantic relationship(s)) between one or more portions of the information represented by the encoded natural language context data 126*a-n*. In other words, the cross-modality model 129 is configured to perform attention across the entity and various multi-modality context data associated with the entity to generate the UCE embedding data 130, which corresponds to the entity and the context data associated with the entity, as well as represents one or more contextual relationships between the entity and the context data associated with entity. For example, for the entity "weekly recommendation", the UCE embedding data 130*a* corresponds to a single embedded representation of the multi-modal information associated with the entity "weekly recommendation" (e.g., one or more of the entity itself, the slot type "playlist name", the phoneme representation, the example usage of "play the weekly recommendation playlist", the natural language definition, the image/video data, or the audio data) and represents how the multi-modal information is semantically associated with the entity and the other multi-modal information. The cross-modality model 129 is discussed in more detail herein below with respect to FIG. 3.

In some embodiments, the UCE embedding data 130 may further correspond to context data that was not input to the universal context encoder 120 (e.g., not included in the natural language context input data 115*a-n*, the audio context input data 117, and/or the image context input data 119). For example, if the natural language context input data 115*a-n* corresponded to the abovementioned entity, slot type, and example usage, but did not correspond to a phoneme representation of the entity (e.g., because the entity input data 102 did not include the phoneme representation, because the input representation generation component 110 was unable to generate a phoneme representation, and/or the generated phoneme representation is incomplete/associated with a low confidence value) the UCE embedding data 130 generated by the universal context encoder 120 may correspond to a phoneme representation of the entity (and corresponding contextual relationships between the phoneme representation and the entity, slot type, and example usage), even though the phoneme representation was not included in the natural language context input data 115*a-n*. The universal context encoder 120 may be configured to generate context data that may not be available or may not be inputted to the universal context encoder 120. Training of the universal context encoder 120 to result in the generation of such UCE embedding data is discussed in more detail herein below with respect to FIG. 4.

The UCE embedding data 130 may be stored in the UCE embedding storage 140. In some embodiments, the UCE embedding data 130 may be stored in association with one or more users (e.g., user profiles, user (profile) IDs, etc.). For example, if one or more portions of the entity input data 102 is associated with a user/user profile, then the corresponding UCE embedding data 130 may be stored in association with the user/user profile. In some embodiments, the UCE embedding data 130 may be stored in association with other data associated with the processing performed to generate the UCE embedding data 130, such as the natural language context input data 115*a-n*, the audio context input data 117, and/or the image context input data 119. In some embodiments, where the UCE embedding data 130 is stored in association with the one or more users, the UCE embedding storage 140 may correspond to the profile storage 670. In some embodiments, the UCE embedding data 130 may be associated with a domain name, a skill name, a slot type, or other data in the UCE embedding storage 140.

In some embodiments, the UCE embedding data 130 may be retrieved by/sent to a system component(s) configured to perform processing with respect to a user input (e.g., an ASR component 650, an NLU component 660, etc.), as is discussed in more detail herein below with respect to FIGS. 6-10.

Figure 2:
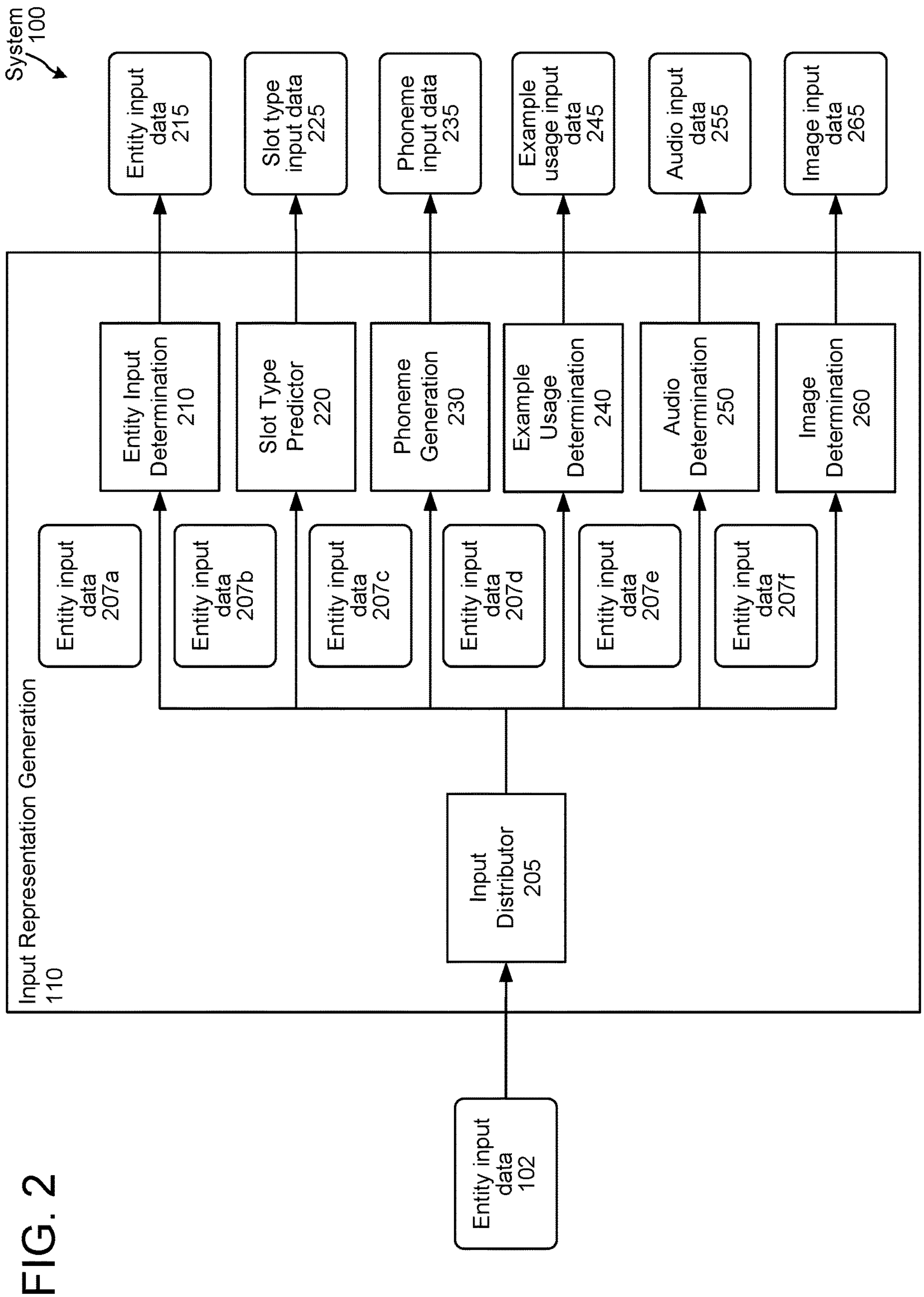
FIG. 2 is a conceptual diagram illustrating example components and processing of the input representation generation component, according to embodiments of the present disclosure.

FIG. 2 illustrates example components and processing of the input representation generation component 110. As shown in FIG. 2, the input representation generation component 110 may include an input distributor component 205, an entity input determination component 210, a slot predictor component 220, a phoneme generation component 230, an example usage determination component 240, an audio determination component 250, and an image determination component 260.

As discussed herein above, the input representation generation component 110 is configured to process various multi-modal input data to generate context input data corresponding to the multi-modal input data. In some embodiments, the data output by the input representation generation component 110 may correspond to a given instance of input data (e.g., one or more natural language words, tokens, audio data, image data, video data, etc.) combined (e.g., concatenated, appended, prepended, etc.) with a prompt indicating the data type of the data (e.g., "entity," "slot type," "phoneme," "usage example," "definition," "image," "video," "audio," etc.).

As shown in FIG. 2, the input representation generation component 110 may receive the entity input data 102 representing at least an entity for which a multi-modal, context aware embedded representation is to be generated. The entity input data 102 may be received at the input distributor component 205, which may be configured to determine and send entity input data 207*a-n* (e.g., corresponding to one or more portions of the entity input data 102) to one or more of the components included in the input representation generation component 110 (e.g., the entity input determination component 210, the slot predictor component 220, the phoneme generation component 230, the example usage determination component 240, the audio determination component 250, the image determination component 260, a natural language definition generator component, etc.). In some embodiments, the input representation generation component 110 may include a storage (not illustrated), which may store various instances of entity input data associated with various entities to be processed by the input representation generation component 110 and the universal context encoder 120. The entity input data 102 may be stored in the storage. Thereafter, the entity input data 102 may be retrieved and sent to the input distributor component 205. In some embodiments, the entity input data 102 may be stored in the storage in response to the entity input data 102 being sent to the input representation generation component 110 during runtime processing (e.g., during a particular time period, while the system 100 is interacting with a user, etc.). In some embodiments, the entity input data 102 may be retrieved during offline processing (e.g., not during runtime, when the system 100 is not interacting with a user, etc.).

As discussed above, the input distributor component 205 may determine and send entity input data to one or more of the components included in the input representation generation component 110. For example, as shown in FIG. 2, the input distributor component 205 may determine the entity input data 207*a-d* corresponding to one or more portions of the entity input data 102 and send the entity input data 207*a-d* to the entity input determination component 210, the slot predictor component 220, the phoneme generation component 230, and the example usage determination component 240. In some embodiments, the context data 207*a-d* may correspond to one or more data types included in the entity input data 102.

As shown in FIG. 2, the entity input data 207*a* may be sent to the entity input determination component 210. In some embodiments, the entity input data 207*a* may include the natural language entity for which a multi-modal, context-aware embedded representation (UCE embedding data) is to be generated. For example, the entity input data 207*a* may correspond to the entity "weekly recommendation." The entity input determination component 210 is configured to process the entity input data 207*a* to generate entity input data 215 corresponding to the natural language entity combined with a data type indicator (e.g., "entity"). For example, for the abovementioned example entity, the entity input determination component 210 may generate entity input data 215*a*: "entity, weekly recommendation," or the like. The entity input data 215 may be sent to the universal context encoder 120.

As further shown in FIG. 2, the entity input data 207*b* may be sent to the slot predictor component 220. In some embodiments, the entity input data 207*b* may include the natural language entity for which the multi-modal, context-aware embedding is to be generated. The slot predictor component 220 is configured to process the entity input data 207*b* to generate slot type input data 225 corresponding to a predicted slot type (e.g., a descriptive label associated with the entity, such as "device name," "contact name," "playlist name," "application name," etc.) associated with the entity combined with a data type indicator (e.g., "slot type"). For example, for entity input data 207*b*: "weekly recommendation," the slot predictor component 220 may generate slot type input data 225*a*: "slot type, playlist name," or the like.

In some embodiments, the slot predictor component 220 may generate a predicted slot type by determining a similarity between the natural language entity and one or more slot types (e.g., a semantic similarity using, for example, cosine similarity). In some embodiments, the slot predictor component 220 may implement a machine learning (ML) model configured to generate the predicted slot type. For example, the ML model may process one or more natural language words corresponding to an entity and classify the one or more natural language words as being associated with one or more slot types. In some embodiments, the ML model may be a classifier.

In some embodiments, the slot predictor component 220 may generate the predicted slot type using NLU techniques. For example, the slot predictor component 220 may process similar to the named entity recognition (NER) component discussed herein below with respect to FIGS. 9-10 to generate the predicted slot type.

In some embodiments, the entity input data 207*b* may additionally, or alternatively, include an indication of the slot type associated with the entity (e.g., that was included in the entity input data 102) (e.g., if the system 100 previously determined a slot type associated with the entity during processing of a user input including the entity). In some such embodiments, the slot predictor component 220 may generate the slot type input data 225 by combining the indication of the slot type with the data type indicator, as discussed herein above.

As also shown in FIG. 2, the entity input data 207*c* may be sent to the phoneme generation component 230. In some embodiments, the entity input data 207*c* may include the natural language entity for which the multi-modal, context-aware embedding is to be generated. The phoneme generation component 230 is configured to process the entity input data 207*c* to generate a phoneme representation (e.g., for a word "weekly recommendation", the corresponding phoneme representation may be "w iy k l iy r eh k ah m ah n d ey sh ah n") corresponding to the entity (e.g., a phoneme representation of the one or more natural language words corresponding to the entity). The phoneme generation component 230 is further configured to generate phoneme input data 235 corresponding to a combination of the generated phonemes and a data type indicator (e.g., "phonemes"). For example, for entity input data 207*c*: "weekly recommendation," the phoneme generation component 230 may generate phoneme input data 235*a*: "phonemes, "w iy k l iy r eh k ah m ah n d ey sh ah n," or the like. The phoneme input data 235 may be sent to the universal context encoder 120.

In some embodiments, the phoneme generation component 230 may generate the phoneme(s) corresponding to the natural language entity using a language dictionary/lexicon. For example, the phoneme generation component 230 may include (or otherwise have access to) a storage including mappings of phoneme representations to one or more corresponding entities. The phoneme generation component 230 may query the storage for the phoneme representation(s) of the natural language entity and use the phoneme representation(s) to generate the phoneme input data 235. In some embodiments, the phoneme representations included in the storage may be stored in association with one or more user profile IDs, where the phoneme representations represent a corresponding user's preferred pronunciation of the corresponding entity(ies). In such embodiments, the phoneme generation component 230 may query the storage for phoneme representations that are further associated with a user profile ID (e.g., received from a user recognition component/ an orchestrator component 630) for a user associated with the entity.

In some embodiments, the phoneme generation component 230 may generate the phoneme(s) corresponding to the one or more natural language words using an ML model (e.g., a phoneme recognition model, an ASR model, etc.).

In some embodiments, the entity input data 207*c* may additionally, or alternatively, include the phoneme(s) corresponding to the entity (e.g., that was included in the entity input data 102). In some such embodiments, the phoneme generation component 230 may generate the phoneme input data 235 by combining the phoneme(s) included in the entity input data 207*c* with the data type indicator (e.g., "phonemes"), as discussed herein.

As shown in FIG. 2, the entity input data 207*d* may be sent to the example usage determination component 240. In some embodiments, the entity input data 207*d* may include the natural language entity for which the multi-modal, context-aware embedding is to be generated. The example usage determination component 240 is configured to process the entity input data 207*d* to generate/determine natural language data representing an example usage of the entity (e.g., a phrase including the entity (e.g., a sentence(s) including the entity), a user input including the entity, etc.). For example, for example entity input data 207*d*: "weekly recommendation," the example usage determination component 240 may generate natural language data "play my weekly recommendation playlist." The example usage determination component 240 may combine the example usage with a data type indicator (e.g., "example usage") to generate example usage input data 245. For example, for the abovementioned entity input data 207*d*, the example usage determination component 240 may generate example usage input data 245*a*: "example usage, play my weekly recommendation playlist." The example usage input data 245 may be sent to the universal context encoder 120.

In some embodiments, the entity input data 207*d* may additionally, or alternatively, include a natural language phrase (e.g., sentence(s)) including the entity (e.g., that was included in the entity input data 102). For example, the entity input data 207*d* may include a user input that was received by the system 100 that included the entity, such as, for the entity "trending music," the entity input data 207*d* may further include a user input of "play the trending music playlist." In some such embodiments, the example usage determination component 240 may generate the example usage input data 245 by combining the natural language sentence with the data type indicator (e.g., "example usage"), as discussed herein above. In some embodiments, such a natural language phrase may correspond to a previous user input including the entity and received by the system 100. In other embodiments, the natural language phrase may be determined from storage (e.g., a user profile). In still other embodiments, the natural language phrase may be determined from a database/document external to the system component(s) 520 (e.g., the Internet), where the natural language phrase corresponds to one or more sentences including and/or surrounding usage of the entity.

In some embodiments, the example usage determination component 240 may generate the example user input using an ML model (e.g., a classifier, a text generation model, etc.). For example, the ML model may take as input the one or more natural language words corresponding to the entity and, optionally, the slot type corresponding to the entity and generate text corresponding to an example usage of the entity in a sentence. In some embodiments, the ML model may correspond to a transformer-based model (e.g., BERT-based model, Alexa generative model etc.), a generative adversarial network (GAN), an LSTM model, etc. For further example, the ML model may take as input the one or more natural language words and classify the natural language words as corresponding to one or more carrier phrases (e.g., "play my," "what is," "who is," "how do I," "turn on the," "turn off the," etc.). The example usage determination component 240 may generate the example user input based on combining the one or more natural language words with the carrier phrase(s) determined to correspond to the example usage.

As additionally shown in FIG. 2, entity input data 207*e* may be sent to the audio determination component 250. In some such embodiments, the entity input data 207*e* may include the natural language entity. The audio determination component 250 may be configured to generate audio input data 255 representing speech/audio corresponding to at least the entity. For example, for example entity input data: "weekly recommendation," the audio determination component 250 may generate audio data representing a spoken input of "weekly recommendation." The audio determination component 250 may combine the audio data with a data type indicator (e.g., "audio") to generate the audio input data 255. For example, for the abovementioned entity input data 207*e*, the audio determination component 250 may generate audio input data 255*a*: "audio, [audio data representing a spoken input of "weekly recommendation" ]," or the like. The audio input data 255 may be sent to the universal context encoder 120.

In some embodiments, the audio determination component 250 may be configured to generate the audio data, representing synthesized speech, corresponding to the entity using a TTS component (e.g., the TTS component 656). In some embodiments, the TTS component may be included in the audio determination component 250. In other embodiments, the audio determination component 250 may be configured to send the entity input data 207*e* to the TTS component. The TTS component may process the entity input data 207*e* to generate audio data corresponding to the entity input data 207*e*. Further details regarding the TTS component 656 are discussed in more detail herein below.

In some embodiments, the entity input data 207*e* may include the audio data corresponding to the entity (e.g., that was included in the entity input data 102). For example, the audio data may correspond to a spoken user input include the entity that was received by the system 100. For further example, the audio data may correspond to a synthetic speech response generated by the system 100 including the entity. In some such embodiments, the audio determination component 250 may generate the audio input data 255 by combining the audio data with the data type indicator (e.g., "audio"), as discussed herein above.

As also illustrated in FIG. 2, entity input data 207*f* may be sent to the image determination component 260. In some such embodiments, the entity input data 207*f* may include the natural language entity. The image determination component 260 may be configured to generate image input data 265 representing an image associated with the entity. For example, for example entity input data 207*f*: "weekly recommendation," the image determination component 260 may determine image data representing an image associated with "weekly recommendation." The image determination component 260 may combine the image data with a data type indicator (e.g., "image") to generate image input data 265. For example, for the abovementioned entity input data 207*f*, the image determination component 260 may generate image input data 265: "image, [image data representing an image associated with "weekly recommendation" ]," or the like. The image input data 265 may be sent to the universal context encoder 120.

In some embodiments, the image determination component 260 may be configured to generate the image data corresponding to the one or more natural language words using an ML model (e.g., a stable diffusion model, a generative adversarial model, a variational autoencoder, a flow-based model, a multi-modal LLM, etc.). For example, the ML model may take as input the one or more natural language words corresponding to the entity and generate image data corresponding to an image associated with the word.

In some embodiments, the entity input data 207*f* may include the image data corresponding to the image associated with the one or more natural language words (e.g., which may be included in the entity input data 102). For example, the image data may correspond to image content that was being presented when a user input including the entity was received by the system 100. For further example, the image data may correspond to an image that was previously generated as being associated with a user input including the entity. In some such embodiments, the image determination component 260 may generate the image input data 265 by combining the image data with the data type indicator (e.g., "image"), as discussed herein above.

As discussed above, in some embodiments, entity input data (not illustrated) may be sent to a natural language definition generator component (not illustrated). In some such embodiments, the entity input data may include the natural language entity. The natural language definition generator component may be configured to generate natural language data corresponding to a definition of the entity. For example, for example entity input data: "rutabaga," the natural language definition generator component may generate natural language data of "a large, round, yellow-fleshed root that is eaten as a vegetable" corresponding to a definition of the entity. The natural language definition generator component may combine the natural language data with a data type indicator (e.g., "definition") to generate definition input data (e.g., "definition, a large, round, yellow-fleshed root that is eaten as a vegetable.").

In some embodiments, the natural language definition generator component may be configured to generate the definition of the entity using a storage/lexicon. For example, the natural language definition generator component may include (or otherwise have access to) a storage including mappings of definitions to one or more corresponding entities. The natural language definition generator component may query the storage for the definition(s) of the natural language entity and use the definition(s) to generate the definition input data. In some embodiments, the definitions included in the storage may be stored in association with one or more user profile IDs, where the definitions represent a corresponding user's preferred/custom definition of the corresponding entity(ies). In such embodiments, the natural language definition generator component may query the storage for definition(s) that are further associated with a user profile ID (e.g., received from a user recognition component/an orchestrator component 630) for a user associated with the entity input data.

In some embodiments, the entity input data may include the natural language data corresponding to the definition (e.g., that was included in the entity input data 102). For example, the natural language data may correspond to a definition of the entity that was received/determined/generated by the system 100. In some such embodiments, the natural language definition generator component may generate the definition input data by combining the natural language data with the data type indicator (e.g., "definition"), as discussed herein above.

The entity input data 215, the slot type input data 225, the phoneme input data 235, the example usage input data 245, the audio input data 255, and/or the image input data 265 (and, in some embodiments, the definition input data) may be sent to the universal context encoder 120, which may process to generate the UCE embedding data 130 corresponding to the multi-modal, context-aware embedded representation of the entity and the associated context data. Further details regarding the processing of the universal context encoder 120 are discussed herein below with respect to FIG. 3.

Figure 3:
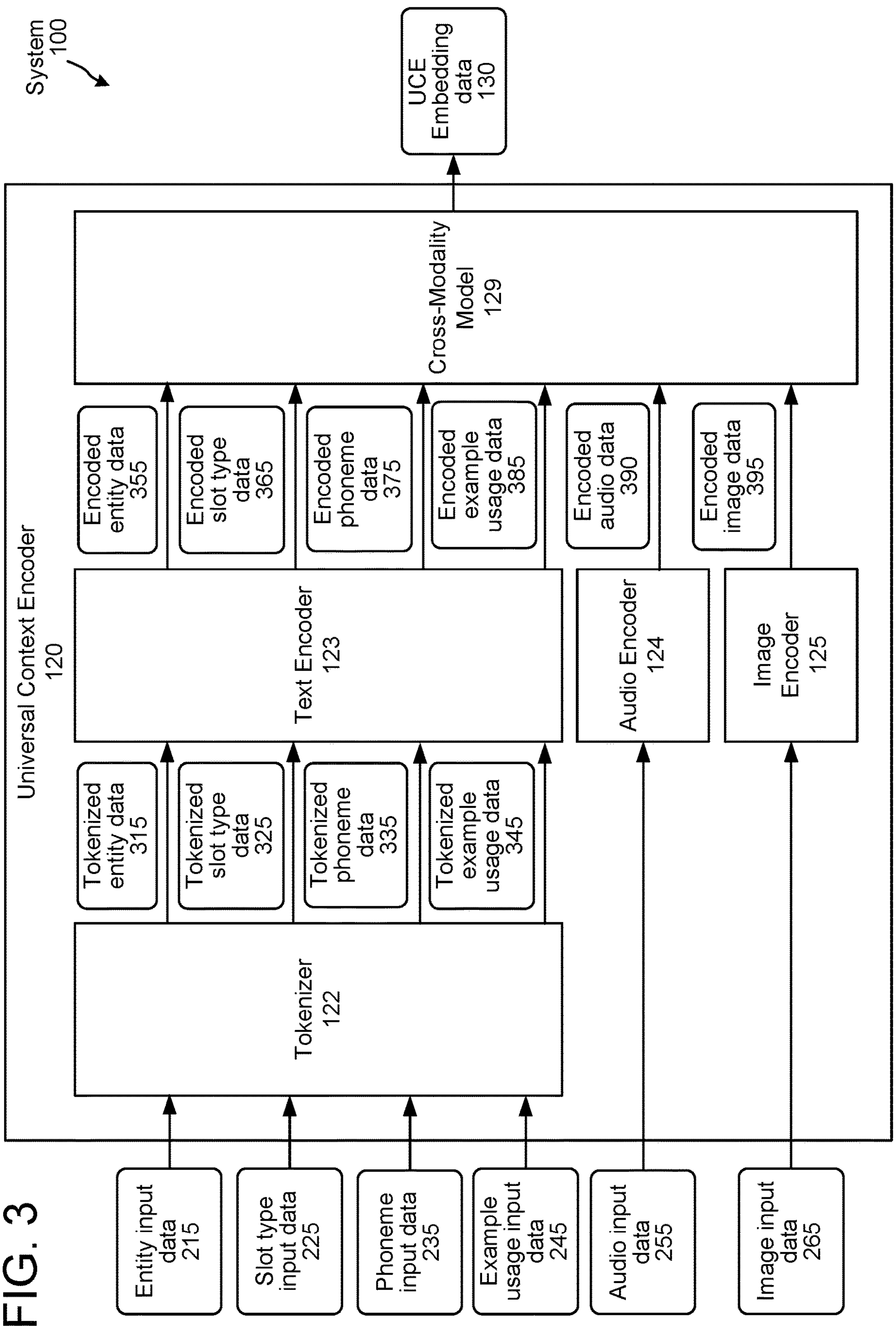
FIG. 3 is a conceptual diagram illustrating example components and processing of the universal context encoder component, according to embodiments of the present disclosure.

FIG. 3 illustrates example processing of the universal context encoder 120 to generate the UCE embedding data 130. As shown in FIG. 3, the universal context encoder 120 may receive the entity and/or associated context input data (e.g., the entity input data 215, the slot type input data 225, the phoneme input data 235, the example usage input data 245, the audio input data 255, and/or the image input data 265). The natural language context input data (e.g., the entity input data 215, the slot type input data 225, the phoneme input data 235, the example usage input data 245, and/or the definition input data (not illustrated) at the tokenizer component 122. In some embodiments, the tokenizer component 122 may correspond to a BERT-based tokenizer.

The tokenizer component 122 is configured to process an instance of input data (e.g., the entity input data 215, the slot type input data 225, the phoneme input data 235, the example usage input data 245, the definition input data) and tokenize the input data (e.g., separate the input data into tokens, such as words, phonemes, etc.). For example, for the entity input data 215*a* "entity, weekly recommendation," the tokenizer component 122 may process to generate the tokens "'entity' 'weekly' 'recommendation'," or the like. For further example, for the phoneme input data 235*a* "phoneme, w iy k l iy r eh k ah m ah n d ey sh ah n," the tokenizer component 122 may process to generate the tokens "'phoneme' 'w' 'iy' 'k' 'l' 'iy' 'r' 'eh' 'k' 'ah' 'm' 'ah' 'n' 'd' 'ey' 'sh' 'ah' 'n'," or the like.

In some embodiments, the tokenized representation of the context input data may begin with a token (e.g., [CLS]) indicating the beginning of the input data and may end with a separate token (e.g., [SEP]) indicating the end of the input data. In some embodiments, the tokenizer component 122 may be configured to generate a tokenized representation of a particular length (e.g., a particular number of tokens). In instances where the tokenized representation of an instance of input data does not meet the particular length, the tokenizer component 122 may generate the tokenized representation to include one or more additional tokens (e.g., [PAD]) such that the tokenized representation meets the particular length.

In some embodiments, the tokenizer component 122 may further process the tokens corresponding to the input data to generate a numerical representation of (e.g., a vector of numerical values corresponding to) the tokens corresponding to the input data, which is to be input to the text encoder 123. For example, for the entity input data 215*a*, the tokenizer component 122 may process as described herein above to generate tokenized entity data 315*a* "'[numerical value 1]' '[numerical value 2]' '[numerical value 3]'." In some embodiments, the tokenizer component 122 may generate the numerical representation of the tokens using a library of mappings between tokens and corresponding numerical representations.

As illustrated in FIG. 3, the tokenizer component 122 performs the abovementioned processing with respect to the entity input data 215, the slot type input data 225, the phoneme input data 235, and the example usage input data 245 to generate the tokenized entity data 315, the tokenized slot type data 325, the tokenized phoneme data 335, and the tokenized example usage data 345, respectively. After generating an instance of tokenized input data, the tokenizer component 122 may send the tokenized input data to the text encoder 123. In some embodiments, the text encoder 123 may correspond to a transformer-based model (e.g., BERT, etc.)

The text encoder 123 is configured to process an instance of tokenized context data (e.g., the tokenized entity data 315, the tokenized slot type data 325, the tokenized phoneme data 335, the tokenized example usage data 345) to generate encoded context data, which is an embedded representation of the tokenized context data. The embedded representation of the tokenized context data may represent various contextual relationships between the one or more tokens of the tokenized context data. For example, for the tokenized entity data 315, the text encoder 123 may generate encoded entity data 355 corresponding to an embedded representation of the tokenized entity data 315, where the encoded entity data 355 represents various contextual relationships between the one or more tokens of the tokenized entity data 315 (e.g., for the tokenized entity data 315*a* discussed above, the various contextual relationships between the tokens "entity," "weekly," and "recommendation," as represented by the tokenized entity data 315*a*).

The audio input data 255 is sent to the audio encoder 124. The audio encoder 124 is configured to process an instance of audio context data (e.g., the audio input data 255) to generate encoded audio data 390, which is an embedded representation of the audio context data. The embedded representation of the audio context data may represent various contextual relationships between one or more frames of the audio context data. For example, for the audio input data 255, the audio encoder 124 may generate the encoded audio data 390 corresponding to an embedded representation of the audio input data 255, where the encoded audio data 390 represents various contextual relationships between one or more audio frames of the audio input data 255.

The image input data 265 is sent to the image encoder 125. The image encoder 125 is configured to process an instance of image/video context data (e.g., the image input data 265) to generate encoded image data 395, which is an embedded representation of the image/video context data. The embedded representation of the image/video context data may represent various contextual relationships between one or more pixels/frames of the image/video context data. For example, for the image input data 265, the image encoder 125 may generate the encoded image data 395 corresponding to an embedded representation of the image input data 265, where the encoded image data 395 represents various contextual relationships between one or more pixels/frames of the image input data 265.

As illustrated in FIG. 3, the text encoder 123 performs the abovementioned processing with respect to the tokenized entity data 315, the tokenized slot type data 325, the tokenized phoneme data 335, and the tokenized example usage data 345 to generate the encoded entity data 355, the encoded slot type data 365, the encoded phoneme data 375, and the encoded example usage data 385, respectively, which may be sent to the cross-modality model 129. Further, the audio encoder 124 and the image encoder 125 perform the abovementioned processing with respect to the audio input data 255 and the image input data 265, respectively, to generate the encoded audio data 390 and the encoded image data 395, respectively, which may be sent to the cross-modality model 129. In some embodiments, the cross-modality model 129 may correspond to a transformer-based model (e.g., BERT, Alexa generative model(s), etc.)

In some instances, the cross-modality model 129 may process similar to the encoders 123, 124, 125, except that the cross-modality model 129 is configured to process with respect to more than one instance of multi-modal data associated with the entity for which the multi-modal, context-aware embedding is to be generated (e.g., the UCE embedding data 130). For example, whereas, in some embodiments, the encoders 123, 124, 125 may process with respect to a representation of a single instance of context data corresponding to a single modality, the cross-modality model 129 may process with respect to more than one instance of context data corresponding to one or more modalities. As such, the cross-modality model 129 is configured to generate a single, multi-modal, context aware embedded representation corresponding to the entity as well as the various context data associated with the entity, which may correspond to multiple modalities. For example, as shown in FIG. 3, the cross-modality model 129 may receive and process the encoded entity data 355, the encoded slot type data 365, the encoded phoneme data 375, the encoded example usage data 385, the encoded audio data 390, and the encoded image data 395 to generate the UCE embedding data 130. The UCE embedding data 130 may, therefore, correspond to an embedded representation of the encoded entity data 355, the encoded slot type data 365, the encoded phoneme data 375, the encoded example usage data 385, the encoded audio data 390, and the encoded image data 395 as well as represent the various contextual relationships between the encoded entity data 355, the encoded slot type data 365, the encoded phoneme data 375, the encoded example usage data 385, the encoded audio data 390, and the encoded image data 395. As discussed herein above with respect to FIG. 1, the UCE embedding data 130 may be stored in the UCE embedding storage 140.

Figure 4:
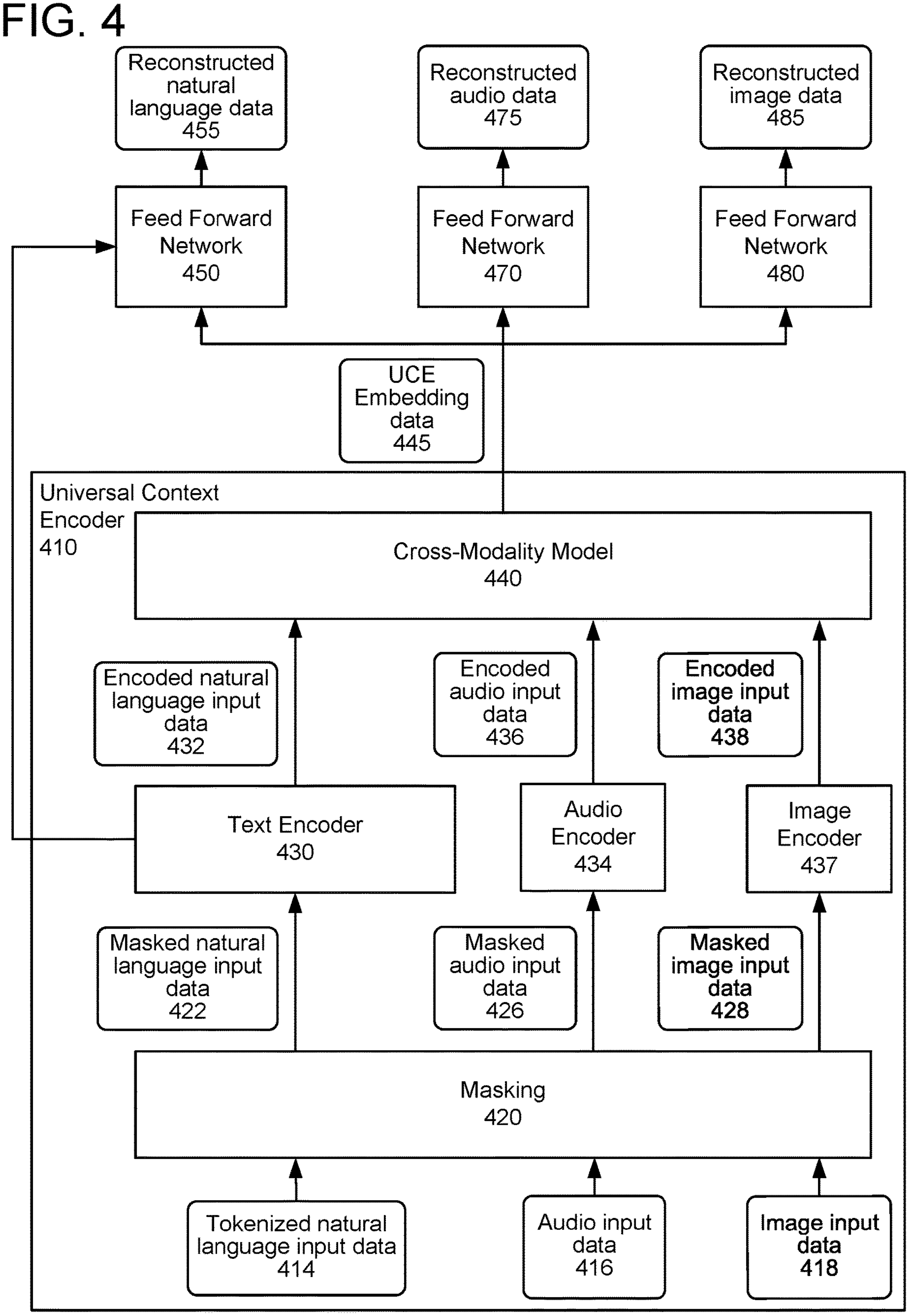
FIG. 4 is a conceptual diagram illustrating example components and processing for training the universal context encoder component, according to embodiments of the present disclosure.

FIG. 4 illustrates example components and processing for training a universal context encoder 410 (e.g., to correspond to the universal context encoder 120, which may represent a result of training the universal context encoder 410). In some embodiments, the universal context encoder 410 may be trained using techniques similar to those used for training an autoencoder model. As shown in FIG. 4, a universal context encoder 410 to be trained may include a masking component 420, a text encoder 430 (configured to process similar to the text encoder 123), an audio encoder 434 (configured to process similar to the audio encoder 124), an image encoder 437 (configured to process similar to the image encoder 125), and a cross-modality model 440 (configured to process similar to the cross-modality model 129). In some embodiments, the masking component 420 may be implemented separately/outside of the universal context encoder 410. The universal context encoder 410 may further include a tokenizer (not illustrated) which may be configured to process similar to the tokenizer component 122 to generate tokenized natural language input data 414, which may correspond to a tokenized representation of at least one or more natural language words corresponding to an entity (similar to the tokenized entity data 315), a tokenized representation of at least a slot type associated with the entity (similar to the tokenized slot type data 325), a tokenized representation of at least a phoneme representation of the one or more natural language words corresponding to the entity (similar to the tokenized phoneme data 335), and/or a tokenized representation of a natural language sentence including the one or more natural language words corresponding to the entity (similar to the tokenized example usage data 345).

As shown in FIG. 4, the tokenized natural language input data 414, audio input data 416, and image input data 418 are received at the masking component 420. The masking component 420 is configured to mask (portions of) one or more instances of the input context data. Training the universal context encoder 410 using the masked data may result in the universal context encoder 410 learning to generate UCE embedding data that further corresponds to the data corresponding to the masked data based on the unmasked portions of the tokenized context data and/or the other tokenized context data input to the universal context encoder 410, as discussed herein. In embodiments where the tokenized natural language input data 414 corresponds to more than one instance of natural language context data, a single instance of natural language context data may be input to the masking component 420 at a time.

In some embodiments, the masking component 420 may perform within context masking, where the masking component 420 may process an instance of tokenized context data and mask (e.g., remove, replace with a special token (e.g., [MASK]), etc.) a portion(s) of the tokenized context data. For example, for tokenized natural language input data 414*a* representing phoneme input data "phoneme, w iy k l iy r eh k ah m ah n d ey sh ah n," the masking component 420 may be configured to generate masked natural language input data 422*a*, where the portion of the masked natural language input data 422*a* representing the portion of the phoneme input data "ey" is masked (e.g., the masked natural language input data 422*a* may be a representation of "phoneme, w iy k l iy r eh k ah m ah n d [MASK] sh ah n,"). Training the universal context encoder 410 using within context masking may result in the universal context encoder 410 learning to fill in the masked portion(s) of the masked context data (e.g., generate UCE embedding data corresponding to the data that is masked) based on the unmasked portions of the context data and/or the other tokenized context data.

Additionally, or alternatively, in some embodiments, the masking component 420 (or another masking component of the universal context encoder 410) may perform full context modality masking, where the masking component 420 may mask an entire instance of tokenized context data. For example, the masking component 420 may determine to mask tokenized natural language input data 414 corresponding to an example usage of an entity, such that the example usage represented by the tokenized natural language input data 414 is not visible/usable by the universal context encoder 410. As an example, for tokenized natural language input data 414*b* representing example usage input data "example usage, play my weekly recommendation playlist," the masking component 420 may be configured to generate masked natural language input data 422*b*: "[MASK]."

Training the universal context encoder 410 using the full context modality masking may result in the universal context encoder 410 learning to generate UCE embedding data that corresponds to the context data that was masked context based on, for example, the other tokenized context data, which, in some embodiments, may correspond to a modality different from the masked context data. In other words, the universal context encoder 410 may learn to generate UCE embedding data corresponding to a modality of context data that was not input to the universal context encoder 410 using one or more different modalities of context data. As such, the universal context encoder 120 (e.g., representing a trained version of the universal context encoder 410) may be configured to use context data associated with an entity (which may correspond to one or more different modalities) to generate the multi-modality, context aware embedded representation of the entity, which may further represent context data that was not provided to the universal context encoder 120 and which may correspond to a modality different from the one or more modalities of the context data provided to the universal context encoder. For example, the universal context encoder 120 may receive context input data including the entity input data: "entity, weekly recommendation," the slot type input data: "slot type, playlist name" and the example usage input data: "play my weekly recommendation playlist," but may not include corresponding phoneme input data (e.g., a phoneme representation of the entity) or audio input data 416 (e.g., audio associated with the entity). The universal context encoder 120 may be configured to generate a corresponding UCE embedding data 130*a* corresponding to the entity and the associated context data and further corresponding to a phoneme representation of the entity (e.g., "w iy k l iy r eh k ah m ah n d ey sh ah n") and/or audio (e.g., speech including the entity) associated with the entity.

As shown in FIG. 4, the masking component 420 may process as described above to generate the masked natural language input data 422, the masked audio input data 426, and the masked image input data 428, respectively, but with one or more portions and/or instances of the masked natural language input data 422, the masked audio input data 426, and/or the masked image input data 428 being masked. The masked natural language input data 422, the masked audio input data 426, and the masked image input data 428 may be sent to the text encoder 430, the audio encoder 434, and image encoder 437, respectively.

In some embodiments, the text encoder 430 may be configured to operate similarly to the text encoder 123 in that the text encoder 430 processes an instance of natural language context data to generate encoded data corresponding to an embedded representation of the audio context data. As such, the text encoder 430 may process the masked natural language input data 422 to generate the encoded natural language input data 432. In embodiments where the masked natural language input data 422 corresponds to multiple instances of masked natural language context data, a single instance of masked natural language context data may be input to the text encoder 430 at a time. The encoded natural language input data 432 may be sent to the cross-modality model 440. As also shown in FIG. 4, the text encoder 430 may send the encoded output (e.g., the encoded natural language input data 432) to the feed forward network 450. In some embodiments, the text encoder 430 may further send positional embeddings corresponding to the encoded output to the feed forward network 450, which may represent the positional ordering of the tokens represented by the encoded data.

In some embodiments, the audio encoder 434 may be configured to operate similarly to the audio encoder 124 in that the audio encoder 434 processes an instance of audio context data to generate encoded data corresponding to an embedded representation of the audio context data. As such, the audio encoder 434 may process the masked audio input data 426 to generate the encoded audio input data 436. The encoded audio input data 436 may be sent to the cross-modality model 440. In some embodiments, the image encoder 437 may be configured to operated similarly to the image encoder 125 in that the image encoder 437 processes an instance of image/video context data to generate encoded data corresponding to an embedded representation of the image/video context data. As such, the image encoder 437 may process the masked image input data 428 to generate the encoded image input data 438. The encoded image input data 438 may be sent to the cross-modality model 440.

In some embodiments, the cross-modality model 440 may be configured to operate similar to the cross-modality model 129 in that the cross-modality model 440 processes the (multi-modal) encoded context data to generate a multi-modal, context aware embedded representation of the entity and the various (multi-modal) context data associated with the entity. As shown in FIG. 4, the cross-modality model 440 receives and processes the encoded natural language input data 432, the encoded audio input data 436, and the encoded image input data 438 to generate UCE embedding data 445 representing the entity and the multi-modal context data associated with the entity.

The UCE embedding data 445 may be sent to one or more feed forward networks (e.g., the feed forward network 450, the feed forward network 470, and the feed forward network 480) configured to process (e.g., decode) the UCE embedding data 445 to reconstruct the context data associated with the entity, which is represented by the UCE embedding data 445 (e.g., to generate reconstructed natural language data 455, reconstructed audio data 475, and the reconstructed image data 485). In some embodiments, a feed forward network may be configured to process the UCE embedding data 445 to reconstruct a particular type of context data associated with the UCE embedding data 445. As such, the system 100 may include a feed forward network configured for each type of context data that may be input to the universal context encoder 410 (e.g., entity, slot type, phoneme, example usage, definition, audio, image, video, etc.).

For example, a feed forward network **450*a* may be configured to process the UCE embedding data 445 to generate reconstructed entity data corresponding to the entity that was input to the universal context encoder 410. For further example, a feed forward network 450*b* may be configured to process the UCE embedding data 445 to generate reconstructed slot type data corresponding to the slot type that was input to the universal context encoder 410. As another example, a feed forward network 450*c* may be configured to process the UCE embedding data 445 to generate reconstructed phoneme data corresponding to the phoneme representation that was input to the universal context encoder 410. As an even further example, the feed forward network 450*d* may be configured to process the UCE embedding data 445 to generate reconstructed example usage data corresponding to the example usage that was input to the universal context encoder 410. Additionally, the feed forward network 470 may be configured to process the UCE embedding data 445 to generate the reconstructed audio data 475 corresponding to the audio data that was input to the universal context encoder 410. Also, the feed forward network 480 may be configured to process the UCE embedding data 445 to generate the reconstructed image data 485 corresponding to the image/video data that was input to the universal context encoder 410**.

In some embodiments, the UCE embedding data 445 may be input to one or more of the feed forward networks to generate reconstructed context data that corresponds to context data that is associated with the entity, but was not input to the universal context encoder 410, as discussed herein above with respect to the masking component 420.

The system 100 may determine an error rate corresponding to a comparison between the reconstructed context data and the actual context data input to the universal context encoder 410. The determined error rate may be used to update one or more values (e.g., weights) of the universal context encoder 410 (e.g., via backpropagation). In some embodiments, after training of the universal context encoder 410 is complete (e.g., once the model consistently achieves an error rate that does not exceed a threshold error rate), the masking component 420 may be removed from the universal context encoder 410, such that the tokenized context data is input to the text encoder 430. In some embodiments, the fully trained universal context encoder 410 (without the masking component 420) may correspond to the universal context encoder 120.

Figure 5:
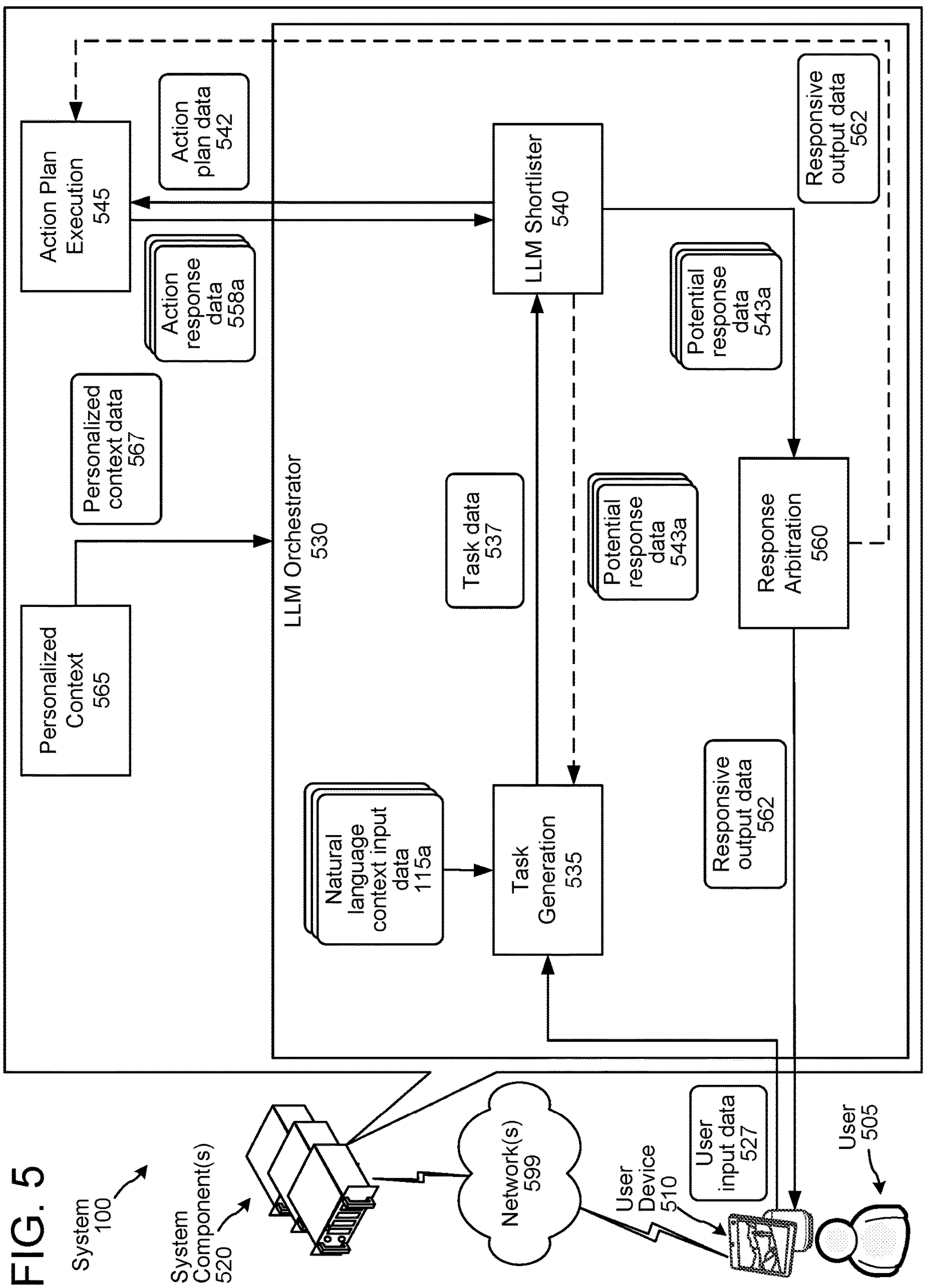
FIG. 5 is a conceptual diagram illustrating further example components and processing of the system, which are configured to determine a response to a user input, according to embodiments of the present disclosure.

FIG. 5 illustrates further example components and processing of the system, which are configured to determine a response to a user input using one or more language models. In some embodiments, the one or more language models may determine the response to the user input using the ASR data generated by the ASR component 650. In other embodiments, the one or more language models may determine the response to the user input using the output of the input representation generation component 110.

Language modeling (LM) is the use of various statistical and probabilistic techniques to determine the probability of a given sequence of words occurring in a sentence. Language models analyze bodies of text data to provide a basis for their word predictions. The language models are generative models. In some embodiments, the language models may be a LLM. An LLM is an advanced artificial intelligence system designed to process, understand, and generate human-like text based on massive amounts of data. In some embodiments, an LLM may be further designed to process, understand, and generate multi-modal data including audio, text, image, and/or video. An LLM model may be built using deep learning techniques, such as neural networks, and may be trained on extensive datasets that include text (or other type of data, such as multi-modal data including text, audio, image, video, etc.) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models (and their corresponding operations, discussed herein below) may be the same language model.

In some embodiments where one or more of the language models are LLMs, the one or more language model may be transformer-based seq2seq models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the one or more language models may be capable of in-context learning.

In other embodiments, where one or more of the language models are an LLM, the one or more language models may be a decoder-only architecture. The decoder-only architecture may use left-to-right (unidirectional) encoding of the input (e.g., audio, text, image, video, etc.). An example of such a LLM is the Generative Pre-trained Transformer 3 (GPT-3) and other versions of GPT. GPT-3 has a capacity of (approximately) 175 billion machine learning parameters.

Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, Bidirectional Encoder Representations from Transformers (BERT), etc.

In some embodiments, the system may include one or more machine learning model(s) other than one or more of the language models. Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In embodiments where one or more of the language models are an LLM, the input to the LLM may be in the form of a prompt. A prompt may be a natural language input, for example, an instruction, for the LLM to generate an output according to the prompt. The output generated by the LLM may be a natural language output responsive to the prompt. In some embodiments, the output may be another type of data, such as audio, image, video, etc. The prompt and the output may be text in a particular language (e.g., English, Spanish, German, etc.) and/or other types of data such as audio, image, video, etc. For example, for an example prompt "how do I cook rice?", the LLM may output a recipe (e.g., a step-by-step process represented by text, audio, image, video, etc.) to cook rice. As another example, for an example prompt "I am hungry. What restaurants in the area are open?", the LLM may output a list of restaurants near the user that are open at the time.

The language models may be configured using various learning techniques. For example, in some embodiments, the language models may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example. As another example, in some embodiments, the language models may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

In some embodiments, the LLM orchestrator component 530 may generate prompt data representing a prompt for input to the language models. As shown in FIG. 5, the system component(s) 520 receive user input data 527, which may be provided to the LLM orchestrator component 530. In some instances, the user input data 527 may correspond to various data types, such as text (e.g., a text or tokenized representation of a user input), audio, image, video, etc. For example, the user input data may include input text (or tokenized) data when the user input is a typed natural language user input. For further example, prior to the LLM orchestrator component 530 receiving the user input data 527, another component (e.g., an automatic speech recognition (ASR) component 650) of the system 100 may receive audio data representing the user input. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 527).

In some embodiments, the LLM orchestrator component 530 may receive input data, which may be processed in a similar manner as the user input data 527 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 510, a user entering the home, etc.).

In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a device 510 (e.g., a smartphone, a smart speaker, etc.) to present an alert to the user. The LLM orchestrator component 530 may process the input data to generate tasks that may cause the foregoing example actions to be performed.

FIG. 5 illustrates further example components included in the system 100 configured to determine an action responsive to a user input. As shown in FIG. 5, the system may include a user device 510, local to a user 505, in communication with a system component(s) 520 via a network(s) 599. The network(s) 599 may include the Internet and/or any other wide- or local-area network, and may include wired, wireless, and/or cellular network hardware.

The system component(s) 520 may include various components, such as a large language model (LLM) orchestrator component 530, a personalized context component 565, and an action plan execution component 545. The LLM orchestrator component 530 may include a task generation component 535, an LLM shortlister component 540, and a response arbitration component 560.

In some embodiments, the LLM orchestrator component 530 may generate prompt data representing a prompt for input to the language models. As shown in FIG. 5, the system component(s) 520 receive user input data 527, which may be provided to the LLM orchestrator component 530. In some instances, the user input data 527 may correspond to various data types, such as text (e.g., a text or tokenized representation of a user input), audio, image, video, etc. For example, the user input data may include input text (or tokenized) data when the user input is a typed natural language user input. For further example, prior to the LLM orchestrator component 530 receiving the user input data 527, another component (e.g., an automatic speech recognition (ASR) component 650) of the system 100 may receive audio data representing the user input. The ASR component 650 may perform ASR processing on the audio data to determine ASR data corresponding to the user input, which may correspond to a transcript of the user input. As described below, with respect to FIG. 7, the ASR component 650 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 650 level of confidence that the corresponding hypothesis represents what the user said. The ASR component 650 may also determine token scores corresponding to each token/word of the ASR hypothesis, where the token score indicates the ASR component's 650 level of confidence that the respective token/word was spoken by the user. The token scores may be identified as an entity score when the corresponding token relates to an entity. In some instances, the user input data 527 may include a top scoring ASR hypothesis of the ASR data. As is discussed herein below with respect to FIG. 7, the ASR data may be generated using UCE embedding data (e.g., the UCE embedding data 130) determined to be associated with the audio data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 527).

In some embodiments, the LLM orchestrator component 530 may receive input data, which may be processed in a similar manner as the user input data 527 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 510, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a device 510 (e.g., a smartphone, a smart speaker, etc.) to present an alert to the user. The LLM orchestrator component 530 may process the input data to generate tasks that may cause the foregoing example actions to be performed.

The user input data 527 may be received at the task generation component 535 of the LLM orchestrator component 530, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 100). For example, for a user input of "What is the weather for today," the task generation component 535 may generate a list of tasks of "(1) determine current outside temperature from thermostat; and (2) determine weather forecast for today" and select the task of "determine weather forecast for today" to be completed first. In instances where the task generation component 535 generates more than one task to be completed in order to perform the action responsive to the user input, the task generation component 535 may further maintain and prioritize the list of tasks as the processing of the system 100 with respect to the user input is performed. In other words, as the system 100 processes to complete the list of tasks, the task generation component 535 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The task generation component 535 may generate and send task data 537 representing the selected task to be completed and various other information needed to perform further processing with respect to the task (e.g., the user input data 527, an indication of the selected task, potential responses associated with previous tasks, the remaining task(s), and context data associated with the user input data 527) to the LLM shortlister component 540.

In some embodiments, the task generation component 535 may receive information associated with the user input data 527. For example, in embodiments where the user input data 527 corresponds to a transcript generated by the ASR component 650 using the UCE embedding data 130, the task generation component 535 may further receive the natural language context input data 115*a-n* associated with the UCE embedding data 130. The natural language context input data 115*a-n* may provide useful contextual information usable by one or more models of the task generation component 535 to generate the task data 537. In some embodiments, the natural language context input data 115*a-n* may be included in the task data 537 so that the natural language context input data 115*a-n* may be used by one or more processing components (e.g., the LLM shortlister component 540 and/or the response arbitration component 560).

The LLM shortlister component 540 may be configured to determine one or more components (e.g., skill component(s) 654, LLM agent component(s), TTS component 656, etc.) configured to perform an action related to the user input or the current task. The LLM shortlister component 540 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the LLM shortlister component 540 may generate requests of "use Weather Application A to determine weather forecast for today" and "use Weather Application B to determine weather forecast for today," or the like. Such requests may be represented in the action plan data 542 sent to the action plan execution component 545. The action plan execution component 545 may identify the request(s) in the action plan data 542, generate executable API calls corresponding to the request(s), and cause the corresponding components (e.g., such as the API provider component, the LLM agent component, the skill component 654, and/or the TTS component 656) to generate action response data 558*a-n* representing the requested potential response(s), where individual action response data 558*a* may be provided by/correspond to a particular responding component—one of the API provider component, the LLM agent component, the skill component 654, and/or the TTS component 656. In some embodiments, the action response data 558*a-n* may include an identifier (e.g., a component name, an alphanumerical value associated with the component, etc.) for the component providing the data. The LLM shortlister component 540 receives and processes the action response data 558*a-n* and generates potential response data 543*a-n* representing the potential response(s) (e.g., relevant potential responses, selected potential responses, ranked potential responses, etc.) for further processing. If the LLM shortlister component 540 determines that there are no remaining tasks to generate potential responses for, the LLM shortlister component 540 may send the potential response data 543*a-n* to the response arbitration component 560.

The potential response data 543*a-n*, in some embodiments, may be determined based on receiving potential responses from various different components that may be relevant in responding to the user input data 527. For example, the potential response data 543*a-n* may include a first potential response from a first component configured to perform a first task determined by the task generation component 535, a second potential response from a second component configured to perform a second task determined by the task generation component 535, etc. The potential response data 543*a-n* can include more than one potential response relating to an individual task. In some embodiments, the potential response data 543*a-n* may be natural language data.

The response arbitration component 560 processes the potential response data 543*a-n* to determine whether the potential responses generated for the one or more tasks are responsive to the user input. The response arbitration component 560 processes the potential response data 543*a-n* (representing at least the generated potential responses) and selects one or more of the potential responses that are determined to be responsive to the user input and/or determines that none of the actions are responsive to the user input. For example, the response arbitration component 560 may process the potential response data 543*a-n* to determine if one or more of the potential responses performable by the API(s) (e.g., the potential responses and/or potential actions) are responsive to the current task. In some embodiments, the response arbitration component 560 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 560 may generate a natural language summary of "The weather for today is expected to be mostly sunny with a high of 75 and a low of 68 and a slight chance of rain in the evening," or the like.

In some embodiments, the task generation component 535, the LLM shortlister component 540 and/or the response arbitration component 560 may perform the abovementioned processing using personalized context data 567 received from the personalized context component 565. The personalized context component 565 may be configured to determine and return contextual information associated with a user input to the one or more components of the system 100. The personalized context component 565 may be caused to generate and return the personalized context data 567 based on the system 100 determining that additional information is needed in order to generate potential responses for a task associated with a user input. For example, one or more of the components of the system 100 (e.g., the task generation component 535, the LLM shortlister component 540 and/or the response arbitration component 560) may determine that an ambiguity exists in the user input (or the data determined/generated as a result of processing with respect to the user input). In such examples, the personalized context component 565 may receive the user input (e.g., the user input data 527), other data associated with the current task (e.g., one or more portions of the task data 537), and/or model output data indicating that an ambiguity exists/additional information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 565 may process as described herein above to generate the personalized context data 567 (e.g., "The user prefers [Music Streaming Service 1].")

In some embodiments, the responsive output data 562 may include a request for additional information (in response to the response arbitration component 560 determining that none of the potential responses are responsive to the user input and/or an ambiguity exists with respect to the user input and/or one or more of the tasks). In some such embodiments, the responsive output data 562 may be sent to the personalized context component 565 to determine context data to resolve the ambiguity and/or determine the response to the user input data 527.

Figure 6:
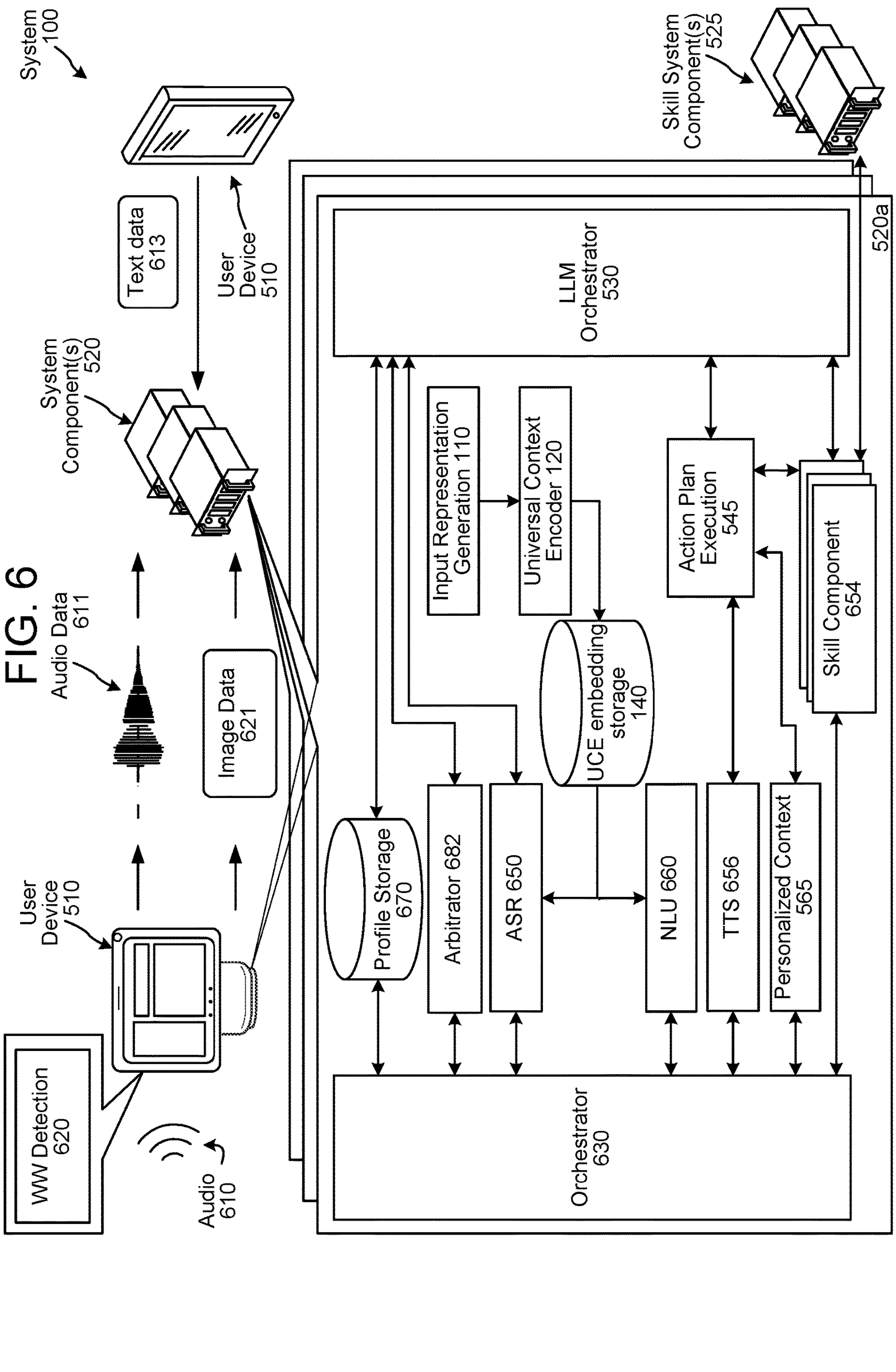
FIG. 6 is a conceptual diagram of components of the system, according to embodiments of the present disclosure.

The system 100 may operate using various components as described in FIG. 6. The various components may be located on same or different physical devices. Communication between various components may occur directly or across a network(s) 599. The user device 510 may include audio capture component(s), such as a microphone or array of microphones of a user device 510, captures audio 610 and creates corresponding audio data. Once speech is detected in audio data representing the audio 610, the user device 510 may determine if the speech is directed at the user device 510/system component(s). In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of user device 510. Other input forms may include indication that the user has pressed a physical or virtual button on user device 510, the user has made a gesture, etc. The user device 510 may also capture images using camera(s) of the user device 510 and may send image data 621 representing those image(s) to the system component(s). The image data 621 may include raw image data or image data processed by the user device 510 before sending to the system component(s). The image data 621 may be used in various manners by different components of the system to perform operations such as determining whether a user is directing an utterance to the system, interpreting a user command, responding to a user command, etc.

The wakeword detection component 620 of the user device 510 may process the audio data, representing the audio 610, to determine whether speech is represented therein. The user device 510 may use various techniques to determine whether the audio data includes speech. In some examples, the user device 510 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 510 may implement a classifier configured to distinguish speech from background noise. The classifier may be implemented by techniques such as linear classifiers, support vector machines, and decision trees. In still other examples, the user device 510 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 610, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 620 and/or input is detected by an input detector, the user device 510 may "wake" and begin transmitting audio data 611, representing the audio 610, to the system component(s) 520. The audio data 611 may include data corresponding to the wakeword; in other embodiments, the portion of the audio corresponding to the wakeword is removed by the user device 510 prior to sending the audio data 611 to the system component(s) 520. In the case of touch input detection or gesture based input detection, the audio data may not include a wakeword.

In some implementations, the system 100 may include more than one system component(s). The system component(s) 520 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 620 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 654 of one or more system component(s) 520.

The user device 510/system component(s) may also include a system directed input detector. The system directed input detector may be configured to determine whether an input to the system (for example speech, a gesture, etc.) is directed to the system or not directed to the system (for example directed to another user, etc.). The system directed input detector may work in conjunction with the wakeword detection component 620. If the system directed input detector determines an input is directed to the system, the user device 510 may "wake" and begin sending captured data for further processing. If data is being processed the user device 510 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector determines an input is not directed to the system (such as a speech or gesture directed to another user) the user device 510 may discard the data and take no further action for processing purposes. In this way the system 100 may prevent processing of data not directed to the system, thus protecting user privacy. As an indicator to the user, however, the system may output an audio, visual, or other indicator when the system directed input detector is determining whether an input is potentially device directed. For example, the system may output an orange indicator while considering an input, and may output a green indicator if a system directed input is detected. Other such configurations are possible.

Upon receipt by the system component(s) 520, the audio data 611 may be sent to an orchestrator component 630 and/or the LLM orchestrator component 530. The orchestrator component 630 may include memory and logic that enables the orchestrator component 630 to transmit various pieces and forms of data to various components of the system, as well as perform other operations as described herein. In some embodiments, the orchestrator component 630 may optionally be included in the system component(s) 520. In embodiments where the orchestrator component 630 is not included in the system component(s) 520, the audio data 611 may be sent directly to the LLM orchestrator component 530. Further, in such embodiments, each of the components of the system component(s) 520 may be configured to interact with the LLM orchestrator component 530, the action plan execution component 545, and/or the API provider component.

In some embodiments, the system component(s) 520 may include an arbitrator component 682, which may be configured to determine whether the orchestrator component 630 and/or the LLM orchestrator component 530 are to process with respect to the audio data 611. In some embodiments, the LLM orchestrator component 530 may be selected to process with respect to the audio data 611 only if the user 505 associated with the audio data 611 (or the user device 510 that captured the audio 610) has previously indicated that the LLM orchestrator component 530 may be selected to process with respect to user inputs received from the user 505.

In some embodiments, the arbitrator component 682 may determine the orchestrator component 630 and/or the LLM orchestrator component 530 are to process with respect to the audio data 611 based on metadata associated with the audio data 611. For example, the arbitrator component 682 may be a classifier configured to process a natural language representation of the audio data 611 (e.g., output by the ASR component 650) and classify the corresponding user input as to be processed by the orchestrator component 630 and/or the LLM orchestrator component 530. For further example, the arbitrator component 682 may determine whether the device from which the audio data 611 is received is associated with an indicator representing the audio data 611 is to be processed by the orchestrator component 630 and/or the LLM orchestrator component 530. As an even further example, the arbitrator component 682 may determine whether the user (e.g., determined using data output from the user recognition component) from which the audio data 611 is received is associated with a user profile including an indicator representing the audio data 611 is to be processed by the orchestrator component 630 and/or the LLM orchestrator component 530. As another example, the arbitrator component 682 may determine whether the audio data 611 (or the output of the ASR component 650) corresponds to a request representing that the audio data 611 is to be processed by the orchestrator component 630 and/or the LLM orchestrator component 530 (e.g., a request including "let's chat" may represent that the audio data 611 is to be processed by the LLM orchestrator component 530).

In some embodiments, if the arbitrator component 682 is unsure (e.g., a confidence score corresponding to whether the orchestrator component 630 and/or the LLM orchestrator component 530 is to process is below a threshold), then the arbitrator component 682 may send the audio data 611 to both of the orchestrator component 630 and the LLM orchestrator component 530. In such embodiments, the orchestrator component 630 and/or the LLM orchestrator component 530 may include further logic for determining further confidence scores during processing representing whether the orchestrator component 630 and/or the LLM orchestrator component 530 should continue processing, as is discussed further herein below.

The arbitrator component 682 may send the audio data 611 to an ASR component 650. In some embodiments, the component selected to process the audio data 611 (e.g., the orchestrator component 630 and/or the LLM orchestrator component 530) may send the audio data 611 to the ASR component 650. The ASR component 650 may transcribe the audio data 611 into text data. The text data output by the ASR component 650 represents one or more than one (e.g., in the form of an N-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., acoustic units such as phonemes, senons, phones, etc.) and sequences of sounds to identify words that match the sequence of sounds of the speech represented in the audio data 611. The ASR component 650 sends the text data generated thereby to the arbitrator component 682, the orchestrator component 630, and/or the LLM orchestrator component 530. In instances where the text data is sent to the arbitrator component 682, the arbitrator component 682 may send the text data to the component selected to process the audio data 611 (e.g., the orchestrator component 630 and/or the LLM orchestrator component 530). The text data sent from the ASR component 650 to the arbitrator component 682, the orchestrator component 630, and/or the LLM orchestrator component 530 may include a single top-scoring ASR hypothesis or may include an N-best list including multiple top-scoring ASR hypotheses. An N-best list may additionally include a respective score associated with each ASR hypothesis represented therein.

In embodiments where the text data is sent to the orchestrator component 630, the orchestrator component 630 may, in turn, send the text data to the NLU component 660. The text data sent from the ASR component 650 to the NLU component 660 may include a single top-scoring ASR hypothesis or may include an N-best list including multiple top-scoring ASR hypotheses. An N-best list may additionally include a respective score associated with each ASR hypothesis represented therein. The ASR component 650 is described in greater detail below with regard to FIG. 7.

The NLU component 660 may receive the text data from the ASR component. The NLU component 660 may attempts to make a semantic interpretation of the phrase(s) or statement(s) represented in the text data input therein by determining one or more meanings associated with the phrase(s) or statement(s) represented in the text data. The NLU component 660 may determine an intent representing an action that a user desires be performed and may determine information that allows a device (e.g., the user device 510, the system component(s) 520, a skill component 690, a skill system component(s) 525, etc.) to execute the intent. For example, if the text data corresponds to "play the 5$^{th}$ Symphony by Beethoven," the NLU component 660 may determine an intent that the system output music and may identify "Beethoven" as an artist/composer and "5th Symphony" as the piece of music to be played. For further example, if the text data corresponds to "what is the weather," the NLU component 660 may determine an intent that the system output weather information associated with a geographic location of the user device 510. In another example, if the text data corresponds to "turn off the lights," the NLU component 660 may determine an intent that the system turn off lights associated with the user device 510 or the user 5. However, if the NLU component 660 is unable to resolve the entity—for example, because the entity is referred to by anaphora such as "this song" or "my next appointment"—the speech processing system 692 can send a decode request to another speech processing system 692 for information regarding the entity mention and/or other context related to the utterance. The speech processing system 692 may augment, correct, or base results data upon the audio data 611 as well as any data received from the other speech processing system 692.

The NLU component 660 may return NLU output data 1085/1025 (which may include tagged text data, indicators of intent, etc.) back to the orchestrator component 630. The orchestrator component 630 may forward the NLU results data to a skill component(s) 690. If the NLU results data includes a single NLU hypothesis, the NLU component 660 and the orchestrator component 630 may direct the NLU results data to the skill component(s) 690 associated with the NLU hypothesis. If the NLU output data 1085/1025 includes an N-best list of NLU hypotheses, the NLU component 660 and the orchestrator component 630 may direct the top scoring NLU hypothesis to a skill component(s) 690 associated with the top scoring NLU hypothesis. The system may also include a post-NLU ranker 665 which may incorporate other information to rank potential interpretations determined by the NLU component 660. The local user device 510 may also include its own post-NLU ranker, which may operate similarly to the post-NLU ranker 665. The NLU component 660, post-NLU ranker 665 and other components are described in greater detail below with regard to FIGS. 9 and 10.

A skill system component(s) 525 may communicate with a skill component(s) 654 within the system component(s) 520 directly with the orchestrator component 630 and/or the action plan execution component 545, or with other components. A skill system component(s) 525 may be configured to perform one or more actions. An ability to perform such action(s) may sometimes be referred to as a "skill." That is, a skill may enable a skill system component(s) 525 to execute specific functionality in order to provide data or perform some other action requested by a user. For example, a weather service skill may enable a skill system component(s) 525 to provide weather information to the system component(s) 520, a car service skill may enable a skill system component(s) 525 to book a trip with respect to a taxi or ride sharing service, an order pizza skill may enable a skill system component(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 520 may be configured with a skill component 654 dedicated to interacting with the skill system component(s) 525. Unless expressly stated otherwise, reference to a skill, skill device, or skill component may include a skill component 654 operated by the system component(s) 520 and/or skill operated by the skill system component(s) 525. Moreover, the functionality described herein as a skill or skill may be referred to using many different terms, such as an action, bot, app, or the like. The skill component 654 and or skill system component(s) 525 may return output data to the orchestrator component 630.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 656. The TTS component 656 may generate audio data (e.g., synthesized speech) from text data using one or more different methods. Text data input to the TTS component 656 may come from a skill component 654, the orchestrator component 630, or another component of the system. In one method of synthesis called unit selection, the TTS component 656 matches text data against a database of recorded speech. The TTS component 656 selects matching units of recorded speech and concatenates the units together to form audio data. In another method of synthesis called parametric synthesis, the TTS component 656 varies parameters such as frequency, volume, and noise to create audio data including an artificial speech waveform. Parametric synthesis uses a computerized voice generator, sometimes called a vocoder.

The user device 510 may include still image and/or video capture components such as a camera or cameras to capture one or more images. The user device 510 may include circuitry for digitizing the images and/or video for transmission to the system component(s) 520 as image data. The user device 510 may further include circuitry for voice command-based control of the camera, allowing a user 505 to request capture of image or video data. The user device 510 may process the commands locally or send audio data 611 representing the commands to the system component(s) 520 for processing, after which the system component(s) 520 may return output data that can cause the user device 510 to engage its camera.

The system component(s) 520/the user device 510 may include a user recognition component that recognizes one or more users using a variety of data. However, the disclosure is not limited thereto, and the user device 510 may include the user recognition component instead of and/or in addition to the system component(s) 520 without departing from the disclosure.

The user recognition component may take as input the audio data 611 and/or text data output by the ASR component 650. The user recognition component may perform user recognition by comparing audio characteristics in the audio data 611 to stored audio characteristics of users. The user recognition component may also perform user recognition by comparing biometric data (e.g., fingerprint data, iris data, etc.), received by the system in correlation with the present user input, to stored biometric data of users assuming user permission and previous authorization. The user recognition component may further perform user recognition by comparing image data (e.g., including a representation of at least a feature of a user), received by the system in correlation with the present user input, with stored image data including representations of features of different users. The user recognition component may perform additional user recognition processes, including those known in the art.

The user recognition component determines scores indicating whether user input originated from a particular user. For example, a first score may indicate a likelihood that the user input originated from a first user, a second score may indicate a likelihood that the user input originated from a second user, etc. The user recognition component also determines an overall confidence regarding the accuracy of user recognition operations.

Output of the user recognition component may include a single user identifier corresponding to the most likely user that originated the user input. Alternatively, output of the user recognition component may include an N-best list of user identifiers with respective scores indicating likelihoods of respective users originating the user input. The output of the user recognition component may be used to inform processing of the arbitrator component 682, the orchestrator component 630, and/or the LLM orchestrator component 530 as well as processing performed by other components of the system.

The system component(s) 520/user device 510 may include a presence detection component that determines the presence and/or location of one or more users using a variety of data.

The system 100 (either on user device 510, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 510, the user profile (associated with the presented login information) may be updated to include information about the user device 510, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 6 may be illustrated as part of system component(s) 520, user device 510, or otherwise, the components may be arranged in other device(s) (such as in user device 510 if illustrated in system component(s) 520 or vice-versa, or in other device(s) altogether) without departing from the disclosure.

In at least some embodiments, the system component(s) may receive the audio data 611 from the user device 510, to recognize speech corresponding to a spoken input in the received audio data 611, and to perform functions in response to the recognized speech. In at least some embodiments, these functions involve sending directives (e.g., commands), from the system component(s) to the user device 510 (and/or other devices 510) to cause the user device 510 to perform an action, such as output an audible response to the spoken input via a loudspeaker(s), and/or control secondary devices in the environment by sending a control command to the secondary devices.

Thus, when the user device 510 is able to communicate with the system component(s) over the network(s) 599, some or all of the functions capable of being performed by the system component(s) may be performed by sending one or more directives over the network(s) 599 to the user device 510, which, in turn, may process the directive(s) and perform one or more corresponding actions. For example, the system component(s), using a remote directive that is included in response data (e.g., a remote response), may instruct the user device 510 to output an audible response (e.g., using TTS processing performed by an on-device TTS component) to a user's question via a loudspeaker(s) of (or otherwise associated with) the user device 510, to output content (e.g., music) via the loudspeaker(s) of (or otherwise associated with) the user device 510, to display content on a display of (or otherwise associated with) the user device 510, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 505 as part of a shopping function, establishing a communication session (e.g., a video call) between the user 505 and another user, and so on.

In at least some embodiments, a hybrid selector, of the user device 510, may send the audio data 611 to the wakeword detection component 620. If the wakeword detection component 620 detects a wakeword in the audio data 611, the wakeword detection component 620 may send an indication of such detection to the hybrid selector. In response to receiving the indication, the hybrid selector may send the audio data 611 to the system component(s) and/or the ASR component of the user device 510. The wakeword detection component 620 may also send an indication, to the hybrid selector, representing a wakeword was not detected. In response to receiving such an indication, the hybrid selector may refrain from sending the audio data 611 to the system component(s), and may prevent the ASR component of the user device 510 from further processing the audio data 611. In this situation, the audio data 611 can be discarded.

The user device 510 may conduct its own speech processing using on-device language processing components, such as an ASR component, similar to the manner discussed herein with respect to the ASR component 650 of the system component(s). The user device 510 may also internally include, or otherwise have access to, other components such as one or more skill components capable of executing commands based on the output of an orchestrator component, an LLM orchestrator, or other results determined by the user device 510/system component(s) (which may operate similarly to skill components 654), an arbitrator component (configured to process in a similar manner to that discussed herein above with respect to the arbitrator component 682), an action plan execution component (configured to process in a similar manner to that discussed herein with respect to the action plan execution component 545), a personalized context component (configured to process in a similar manner to that discussed herein with respect to the personalized context component 565), a user recognition component (configured to process in a similar manner to that discussed herein with respect to the user recognition component of the system component(s)), profile storage (configured to store similar profile data to that discussed herein with respect to the profile storage 670 of the system component(s)), or other components. In at least some embodiments, the profile storage may only store profile data for a user or group of users specifically associated with the user device 510. Similar to as described above with respect to skill component 654, a skill component of the user device 510 may communicate with a skill system component(s) 525. The user device 510 may also have its own TTS component, which may operate similarly to TTS component 656.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 510 attempts to process a natural language user input for which the on-device language processing components are not necessarily best suited, the language processing results determined by the user device 510 may indicate a low confidence or other metric indicating that the processing by the user device 510 may not be as accurate as the processing done by the system component(s).

The hybrid selector, of the user device 510, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 611 to pass to the system component(s) while also receiving (e.g., intercepting) this audio data 611 and sending the audio data 611 to the HEC.

In at least some embodiments, the hybrid selector may further include a local request orchestrator (LRO) configured to notify the ASR component of the user device 510 about the availability of new audio data 611 that represents user speech, and to otherwise initiate the operations of local language processing when new audio data 611 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 510 receives directive data from the system component(s) and chooses to use that remotely-determined directive data.

Thus, when the audio data 611 is received, the HP may allow the audio data 611 to pass through to the system component(s) and the HP may also input the audio data 611 to the on-device ASR component by routing the audio data 611 through the HEC of the hybrid selector, whereby the LRO notifies the on-device ASR component of the audio data 611. At this point, the hybrid selector may wait for response data from either or both of the system component(s) or the local language processing components. However, the disclosure is not limited thereto, and in some examples the hybrid selector may send the audio data 611 only to the local ASR component without departing from the disclosure. For example, the user device 510 may process the audio data 611 locally without sending the audio data 611 to the system component(s).

The local ASR component is configured to receive the audio data 611 from the hybrid selector, and to recognize speech in the audio data 611. The user device 510 and/or the system component(s) may associate a unique identifier with each natural language user input. The user device 510 may include the unique identifier when sending the audio data 611 to the system component(s), and the response data from the system component(s) may include the unique identifier to identify which natural language user input the response data corresponds.

In at least some embodiments, the user device 510 may include, or be configured to use, one or more skill components that may work similarly to the skill component(s) 654 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 510 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 510 may be in communication with one or more skill system component(s) 525. For example, a skill system component(s) 525 may be located in a remote environment (e.g., separate location) such that the user device 510 may only communicate with the skill system component(s) 525 via the network(s) 599. However, the disclosure is not limited thereto. For example, in at least some embodiments, a skill system component(s) 525 may be configured in a local environment (e.g., home server and/or the like) such that the user device 510 may communicate with the skill system component(s) 525 via a private network, such as a local area network (LAN).

A skill system component(s) 525 may communicate with a skill component(s) 654 within the system component(s) 520 directly with the orchestrator component 630 and/or the action plan execution component 545, or with other components. A skill system component(s) 525 may be configured to perform one or more actions. An ability to perform such action(s) may sometimes be referred to as a "skill." That is, a skill may enable a skill system component(s) 525 to execute specific functionality in order to provide data or perform some other action requested by a user. For example, a weather service skill may enable a skill system component(s) 525 to provide weather information to the system component(s) 520, a car service skill may enable a skill system component(s) 525 to book a trip with respect to a taxi or ride sharing service, an order pizza skill may enable a skill system component(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 520 may be configured with a skill component 654 dedicated to interacting with the skill system component(s) 525. Unless expressly stated otherwise, reference to a skill, skill device, or skill component may include a skill component 654 operated by the system component(s) 520 and/or skill operated by the skill system component(s) 525. Moreover, the functionality described herein as a skill or skill may be referred to using many different terms, such as an action, bot, app, or the like. The skill component 654 and or skill system component(s) 525 may return output data to the orchestrator component 630.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 656. The TTS component 656 may generate audio data (e.g., synthesized speech) from text data using one or more different methods. Text data input to the TTS component 656 may come from a skill component 654, the orchestrator component 630, or another component of the system. In one method of synthesis called unit selection, the TTS component 656 matches text data against a database of recorded speech. The TTS component 656 selects matching units of recorded speech and concatenates the units together to form audio data. In another method of synthesis called parametric synthesis, the TTS component 656 varies parameters such as frequency, volume, and noise to create audio data including an artificial speech waveform. Parametric synthesis uses a computerized voice generator, sometimes called a vocoder.

The user device 510 may include still image and/or video capture components such as a camera or cameras to capture one or more images. The user device 510 may include circuitry for digitizing the images and/or video for transmission to the system component(s) 520 as image data. The user device 510 may further include circuitry for voice command-based control of the camera, allowing a user 505 to request capture of image or video data. The user device 510 may process the commands locally or send audio data 611 representing the commands to the system component(s) 520 for processing, after which the system component(s) 520 may return output data that can cause the user device 510 to engage its camera.

The system component(s) 520 may include a user recognition component that recognizes one or more users using a variety of data. The user recognition component may take as input the audio data 611 and/or text data output by the ASR component 650. The user recognition component may perform user recognition by comparing audio characteristics in the audio data 611 to stored audio characteristics of users. The user recognition component may also perform user recognition by comparing biometric data (e.g., fingerprint data, iris data, etc.), received by the system in correlation with the present user input, to stored biometric data of users assuming user permission and previous authorization. The user recognition component may further perform user recognition by comparing image data (e.g., including a representation of at least a feature of a user), received by the system in correlation with the present user input, with stored image data including representations of features of different users. The user recognition component may perform additional user recognition processes, including those known in the art.

The user recognition component determines scores indicating whether user input originated from a particular user. For example, a first score may indicate a likelihood that the user input originated from a first user, a second score may indicate a likelihood that the user input originated from a second user, etc. The user recognition component also determines an overall confidence regarding the accuracy of user recognition operations.

Output of the user recognition component may include a single user identifier corresponding to the most likely user that originated the user input. Alternatively, output of the user recognition component may include an N-best list of user identifiers with respective scores indicating likelihoods of respective users originating the user input. The output of the user recognition component may be used to inform processing of the arbitrator component 682, the orchestrator component 630, and/or the LLM orchestrator component 530 as well as processing performed by other components of the system.

The system component(s) 520/user device 510 may include a presence detection component that determines the presence and/or location of one or more users using a variety of data.

The system 100 (either on user device 510, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 510, the user profile (associated with the presented login information) may be updated to include information about the user device 510, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 6 may be illustrated as part of system component(s) 520, user device 510, or otherwise, the components may be arranged in other device(s) (such as in user device 510 if illustrated in system component(s) 520 or vice-versa, or in other device(s) altogether) without departing from the disclosure.

In at least some embodiments, the system component(s) may receive the audio data 611 from the user device 510, to recognize speech corresponding to a spoken input in the received audio data 611, and to perform functions in response to the recognized speech. In at least some embodiments, these functions involve sending directives (e.g., commands), from the system component(s) to the user device 510 (and/or other devices 510) to cause the user device 510 to perform an action, such as output an audible response to the spoken input via a loudspeaker(s), and/or control secondary devices in the environment by sending a control command to the secondary devices.

Thus, when the user device 510 is able to communicate with the system component(s) over the network(s) 599, some or all of the functions capable of being performed by the system component(s) may be performed by sending one or more directives over the network(s) 599 to the user device 510, which, in turn, may process the directive(s) and perform one or more corresponding actions. For example, the system component(s), using a remote directive that is included in response data (e.g., a remote response), may instruct the user device 510 to output an audible response (e.g., using TTS processing performed by an on-device TTS component) to a user's question via a loudspeaker(s) of (or otherwise associated with) the user device 510, to output content (e.g., music) via the loudspeaker(s) of (or otherwise associated with) the user device 510, to display content on a display of (or otherwise associated with) the user device 510, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 505 as part of a shopping function, establishing a communication session (e.g., a video call) between the user 505 and another user, and so on.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 7:
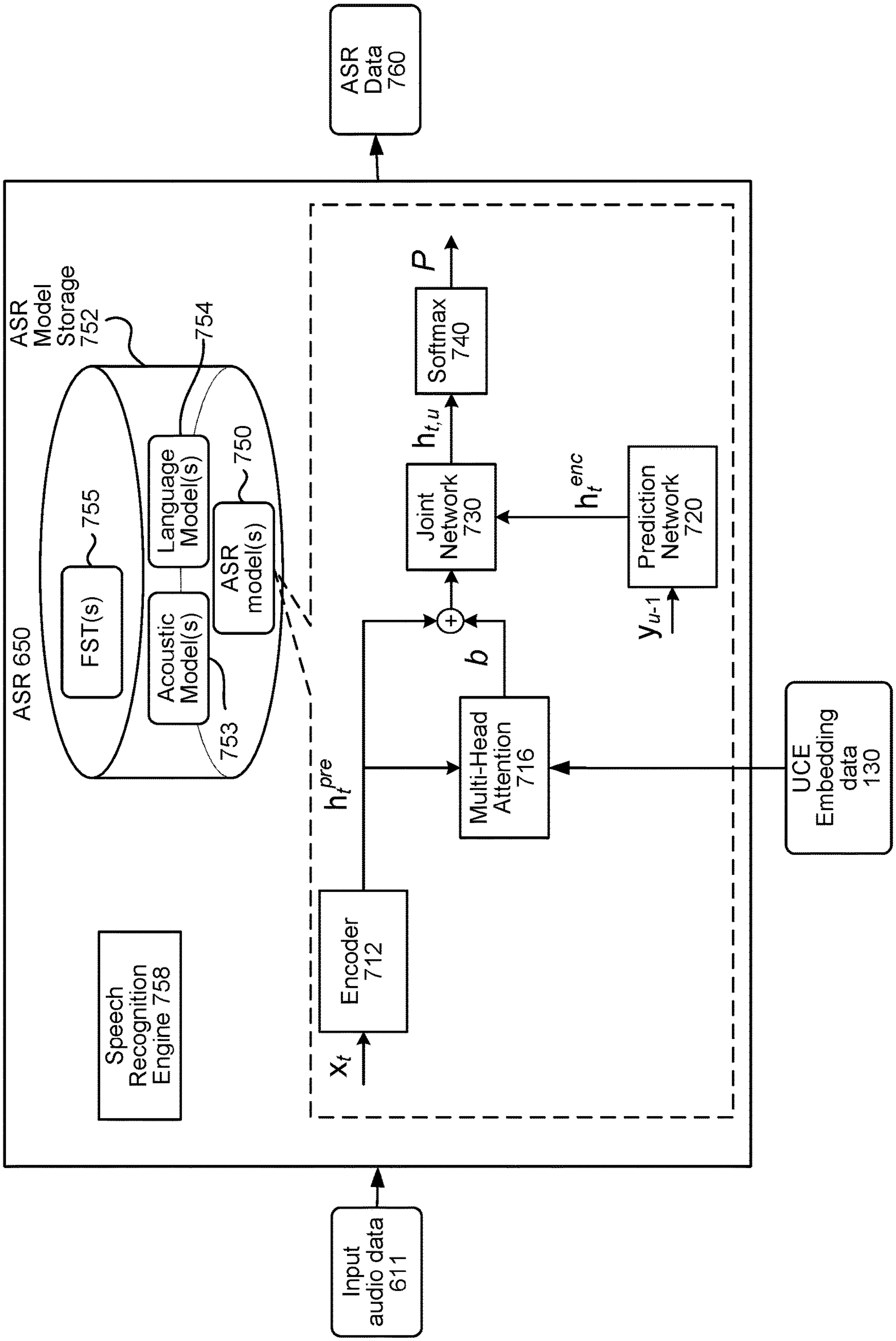
FIG. 7 is a conceptual diagram of an ASR component, according to embodiments of the present disclosure.

FIG. 7 is a conceptual diagram of an ASR component 650, according to embodiments of the present disclosure. As shown in FIG. 7, the ASR component 650 receives input audio data 611, which may correspond to spoken user input. For example, the input audio data 611 may correspond to a user input of "please play the weekly recommendation playlist," "shuffle my weekly recommendation playlist," "shuffle weekly recommendation," or the like. The ASR component 650 is configured to process the input audio data 611 to generate a transcript (e.g., natural language text or tokens) corresponding to the spoken user input (e.g., the user input corresponding to the input audio data 611). As shown in FIG. 7, the ASR component 650 may further receive the UCE embedding data 130. For example, the ASR component 650 may query for the UCE embedding data 130 in response to receiving the input audio data 611. In some embodiments, another component of the system 100 (e.g., the system component(s) 520, the orchestrator component 630, the LLM orchestrator component 530, etc.) may query for the UCE embedding data 130 and send the UCE embedding data 130 to the ASR component 650.

In some embodiments, where the UCE embedding data 130 is stored in association with a user/user profile, the system 100 may query for the UCE embedding data 130 using a user (profile) ID associated with the input audio data 611 (e.g., received from a user recognition component, discussed herein below with respect to FIG. 6). In some embodiments, the system 100 may query for the UCE embedding data 130 in response to receiving the input audio data 611. In other embodiments, the system 100 may query for the UCE embedding data 130 in response to determining a confidence value with respect to ASR data generated for the input audio data 611 (e.g., one or more ASR hypotheses) fails to meet a threshold confidence value. In still other embodiments, the ASR component 650 may query for the UCE embedding data 130 in response to determining that previously generated ASR data corresponding to the input audio data 611 was erroneous and/or the resulted in user dissatisfaction.

The ASR component 650 may interpret a spoken natural language input based on the similarity between the spoken natural language input and pre-established language models 754 stored in an ASR model storage 752. For example, the ASR component 650 may compare the audio data with models for sounds (e.g., subword units or phonemes) and sequences of sounds to identify words that match the sequence of sounds spoken in the natural language input. Alternatively, the ASR component 650 may use a finite state transducer (FST) 755 to implement the language model functions.

When the ASR component 650 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 650 may output an ASR hypothesis that most likely matches the spoken natural language input, or may output multiple ASR hypotheses in the form of a lattice or an N-best list, with each ASR hypothesis corresponding to a respective score.

In some embodiments, where the ASR component 650 receives the UCE embedding data 130, as discussed herein below, the score assigned to each ASR hypothesis may be recomputed based on the UCE embedding data 130. For example, after generating the one or more ASR hypotheses, the ASR component 650 may recompute the score based on the UCE embedding data 130 (e.g., using the acoustic model 753 and/or the language or grammar model 754). In some embodiments, the ASR component 650 may also determine token scores corresponding to each token/word of an ASR hypothesis, where the token score indicates the ASR component's 650 level of confidence that the respective token/word was spoken by the user. The token scores may be identified as an entity score when the corresponding token relates to an entity. In some such embodiments, and where the ASR component 650 receives the UCE embedding data 130, as discussed herein below, the token score may be recomputed based on the UCE embedding data 130.

The ASR component 650 may include a speech recognition engine 758. The ASR component 650 receives audio data 611 (for example, received from a local user device 510 having processed audio detected by a microphone by an acoustic front end (AFE) or other component). The speech recognition engine 758 compares the audio data 611 with acoustic models 753, language models 754, FST(s) 755, and/or other data models and information for recognizing the speech conveyed in the audio data. The audio data 611 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting system component(s) 520 encoded, in which case they may be decoded by the speech recognition engine 758 and/or prior to processing by the speech recognition engine 758.

In some implementations, the ASR component 650 may process the audio data 611 using the ASR model 750. The ASR model 750 may be, for example, a recurrent neural network such as an RNN-T. An example RNN-T architecture is illustrated in FIG. 7. The ASR model 750 may predict a probability (y|x) of labels y=(y1, . . . , yu) given acoustic features x=(x1, . . . , xt). During inference, the ASR model 750 can generate an N-best list using, for example, a beam search decoding algorithm. The ASR model 750 may include an encoder 712, a multi-head attention component 716, a prediction network 720, a joint network 730, and a softmax 740. The encoder 712 may be similar or analogous to an acoustic model (e.g., similar to the acoustic model 753 described below), and may process a sequence of acoustic input features to generate encoded hidden representations. The multi-head attention component 716 may process the output of the encoder 712 (e.g., the encoded hidden representations corresponding to the acoustic input features) and the UCE embedding data 130 to determine a similarity (e.g., represented by weights) between the encoded hidden representations corresponding to the acoustic input features and the UCE embedding data 130. In some embodiments, the multi-head attention component 716 generates higher weights (e.g., scores) for portions of the encoded hidden representations that are determined to be similar to (portions of) the UCE embedding data 130. The output of the multi-head attention component 716 may be a vector or matrix of weights/scores, where the weights may correspond to the matrix including the encoded acoustic features generated by the encoder 712. For example, a first weight outputted by the multi-head attention component 716 may correspond to a first portion of the acoustic features to which attention is to be applied in view of the UCE embedding data 130. The output of the multi-head attention component 716 is combined (e.g., fused) with the output of the encoder 712 to generate a single hidden representation input to the joint network 730. Based on the combined/fused input the joint network 730 applies attention to the appropriate portions of the acoustic input features in view of the UCE embedding data 130. The prediction network 720 may be similar or analogous to a language model (e.g., similar to the language model 754 described below), and may process the previous output label predictions, and map them to corresponding hidden representations.

The joint network 730 may be, for example, a feed forward neural network (NN) that may process the hidden representation from the prediction network 720 and the hidden representation corresponding to the outputs of the encoder 712 and the multi-head attention component 716, and predict output label probabilities. The softmax 740 may be a function implemented (e.g., as a layer of the joint network 730) to normalize the predicted output probabilities.

The speech recognition engine 758 may process the audio data 611 with reference to information stored in the ASR model storage 752. Feature vectors of the audio data 611 may arrive at the system component(s) encoded, in which case they may be decoded prior to processing by the speech recognition engine 758.

The speech recognition engine 758 attempts to match received feature vectors to language acoustic units (e.g., phonemes) and words as known in the stored acoustic models 753, language models 754, and FST(s) 755. For example, audio data 611 may be processed by one or more acoustic model(s) 753 to determine acoustic unit data. The acoustic unit data may include indicators of acoustic units detected in the audio data 611 by the ASR component 650. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR output data 760. The ASR output data 760 can include one or more hypotheses. One or more of the hypotheses represented in the ASR output data 760 may then be sent to further components (such as the NLU component 660) for further processing as discussed herein. The ASR output data 760 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 650 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 650 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 650 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

In some embodiments, the ASR output data 760 may be sent to an arbitrator component (e.g., the arbitrator component 682), which processes the ASR output data 760 to determine whether an orchestrator component 630 and/or an LLM orchestrator component 530 is to process the ASR output data 760 to generate a response to the user input, as is described in more detail herein below with respect to FIG. 8. In embodiments where the ASR output data 760 is sent to the orchestrator component 630, the orchestrator component 630 may, in turn, send the ASR output data 760 to an NLU component 960 to perform natural language understanding processing with respect to the ASR output data 760, as is discussed herein below with respect to FIGS. 9 and 10.

Figure 8:
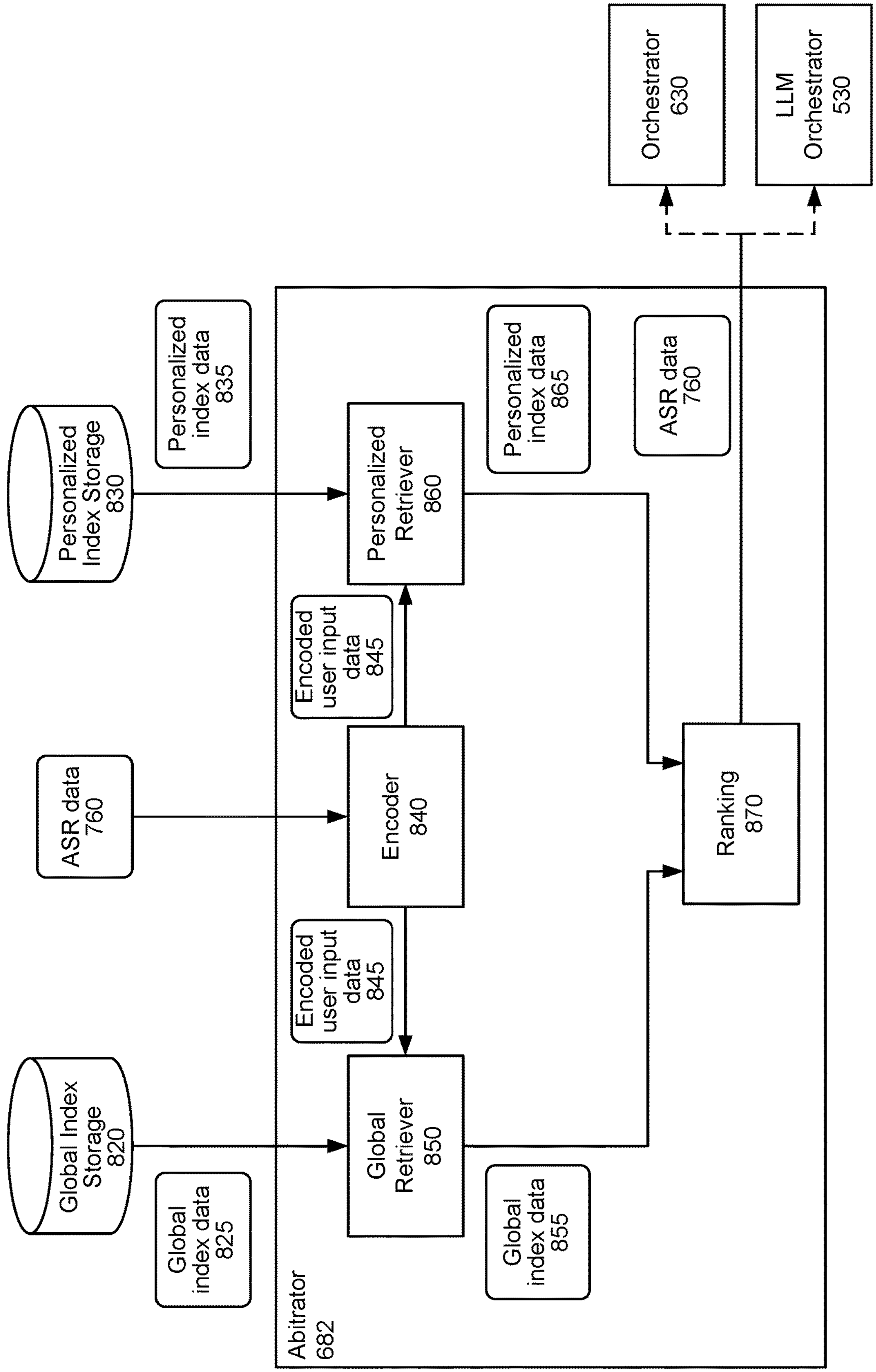
FIG. 8 is a conceptual diagram illustrating example processing of an arbitrator component, according to embodiments of the present disclosure.

FIG. 8 illustrates example components and processing of the arbitrator component 682. As shown in FIG. 8, the arbitrator component 682 may include an encoder component 840, a global retriever component 850, a personalized retriever component 860, and a ranking component 870. The arbitrator component 682 may be in communication with a global index storage 820 and a personalized index storage 830. The arbitrator component 682 may be configured to perform retrieval-based techniques based on a semantic vectorized representation of a user input and historical user inputs received by the system 100 over a period of time (e.g., past 30 days) to determine whether the orchestrator component 630 or the LLM orchestrator component 530 or both of them should process with respect to the user input.

The user input data 527 may be received at the encoder component 840 of the arbitrator component 682. The encoder component 840 may process the user input data 527 to generate encoded user input data 845 represented an encoded representation of the user input data 527 (e.g., a vectorized representation of the user input). The encoder component may send the encoded user input data 845 to the global retriever component 850 and the personalized retriever component 860. In some embodiments, the encoder component 840 may be trained using techniques associated with Deep Structured Semantic Models (DSSM).

The global retriever component 850 is configured to determine one or more historical user inputs that are similar to the user input data 527. The global retriever component 850 queries a global index storage 820 for global index data 825 representing one or more historical user inputs that are semantically similar to the user input data 527. The global retriever component 850 may include one or more historical user inputs received from various users over a period of time (e.g., 30 days). In some embodiments, the global index data 825 may correspond to an encoded representation(s) of the historical user input(s). In such embodiments, the one or more historical user inputs that are semantically similar to the user input data 527 may be determined based on comparing the encoded user input data 845 to the encoder representation(s) of the historical user input(s) (e.g., to determine a cosine similarity). The global retriever component 850 may send the global index data 825 to the ranking component 870.

The personalized retriever component 860 is configured to determine one or more historical user inputs that are similar to the user input data 527, where the one or more historical user inputs are associated with the user 505 that provided the user input corresponding to the user input data 527. The personalized retriever component 860 queries a personalized index storage 830 for personalized index data 835 representing one or more historical user inputs that are semantically similar to the user input data 527 and were provided by the same user that provided the user input corresponding to the user input data 527. The personalized retriever component 860 may include one or more historical user inputs received from the user corresponding to the user input data 527 over a period of time (e.g., 30 days). In some embodiments, the personalized index data 835 may correspond to an encoded representation(s) of the historical user input(s). In such embodiments, the one or more historical user inputs that are semantically similar to the user input data 527 may be determined based on comparing the encoded user input data 845 to the encoder representation(s) of the historical user input(s) (e.g., to determine a cosine similarity). The personalized retriever component 860 may send the personalized index data 835 to the ranking component 870.

In some embodiments, the global index storage 820 and/or the personalized index storage 830 may further include metadata associated with the historical user inputs, which may be further included in the global index data 825 and/or the personalized index data 835. For example, the global index storage 820 and/or the personalized index storage 830 may further include a user satisfaction associated with a system-generated response to the user input, a value representing how many times the user input was received during the time period, a domain (e.g., routine, smart home, shopping, weather, etc.), etc.

In some embodiments, the global retriever component 850 and/or the personalized retriever component 860 may retrieve the global index data 825 and/or the personalized index data 835 semantically similar to the encoded user input data 845 using Maximum Inner Product Search Solution.

The ranking component 870 may process the global index data 855 and the personalized index data 865 to determine whether to send the user input data 527 to the orchestrator component 630 and/or the LLM orchestrator component 530. In some embodiments, the ranking component 870 may make such a determination based on the metadata included in the global index data 855 and/or the personalized index data 865. In some embodiments, the ranking component 870 may be a rule-based component. In other embodiments, the ranking component 870 may be an ML-based component (e.g., a decision tree, a classifier, an LLM, etc.). In embodiments where the ranking component 870 is an LLM, the ranking component 870 may be further configured to determine if there the user input is ambiguous, in which case the ranking component 870 may generate a request for additional information to resolve the ambiguity.

In some embodiments, after determining that the orchestrator component 630 and/or the LLM orchestrator component 530 should process with respect to the user input data 527, the ranking component 870 may be configured to periodically determine whether the orchestrator component 630 and/or the LLM orchestrator component 530 should continue processing with respect to the user input data 527. For example, after a particular point in the processing of the orchestrator component 630 (e.g., after performing NLU, prior to determining a skill component 654 to process with respect to the user input data 527, prior to performing an action responsive to the user input, etc.) and/or the LLM orchestrator component 530 (e.g., after selecting a task to be completed, after receiving the action response data from the one or more components, after completing a task, prior to performing an action responsive to the user input, etc.) the orchestrator component 630 and/or the LLM orchestrator component 530 may query the arbitrator component 682 has determined that the orchestrator component 630 and/or the LLM orchestrator component 530 should halt processing with respect to the user input data 527. As discussed above, the system 100 may be configured to stream portions of data associated with processing with respect to a user input to the one or more components such that the one or more components may begin performing their configured processing with respect to that data as soon as it is available to the one or more components. As such, the arbitrator component 682 may cause the orchestrator component 630 and/or the LLM orchestrator component 530 to begin processing with respect to a user input as soon as a portion of data associated with the user input data 527 is available (e.g., the ASR data, context data, output of the user recognition component. Thereafter, once the arbitrator component 682 has enough data to perform the processing described herein above to determine whether the orchestrator component 630 and/or the LLM orchestrator component 530 is to process with respect to the user input, the arbitrator component 682 may inform the corresponding component (e.g., the orchestrator component 630 and/or the LLM orchestrator component 530) to continue/halt processing with respect to the user input at one of the logical checkpoints in the processing of the orchestrator component 630 and/or the LLM orchestrator component 530.

In some embodiments, the orchestrator component 630 and/or the LLM orchestrator component 530 may periodically confirm that they are to continue processing with respect to the user input. For example, the arbitrator component 682 may be further configured to periodically receive data generated by the orchestrator component 630 and/or the LLM orchestrator component 530 during processing with respect to the user input and determine whether the orchestrator component 630 and/or the LLM orchestrator component 530 should continue processing. The arbitrator component 682 may receive such data at logical checkpoints in the processing of the orchestrator component 630 (e.g., after completion of ASR processing, after completion of natural language understanding processing, after selection of a skill component to process with respect to the user input and prior to initiation of processing by the skill component, or prior to the processing of any component discussed herein with respect to the orchestrator component 630) and/or the LLM orchestrator component 530 (e.g., prior to processing of the LLM shortlister component 540, prior to beginning processing with respect to a subsequent task, or prior to the processing of any other component discussed herein above with respect to the LLM orchestrator component 530). The arbitrator component 682 may be configured to process as described herein above to compare the received data to data associated with processing of a previous user input. This may allow the arbitrator component 682 to make a more informed determination (e.g., based on the additional data determined during processing of the orchestrator component 630 and/or the LLM orchestrator component 530) as to which component(s) should process the user input. In some embodiments, the data may be received at another component of the system 100 configured to process as described herein.

In some embodiments, after sending the data to the arbitrator component 682, the orchestrator component 630 and/or the LLM orchestrator component 530 may temporarily suspend processing with respect to the user input until they receive data from the arbitrator component 682 confirming that they are to continue processing with respect to the user input. As discussed above, in some embodiments, the LLM orchestrator component 530 may send the data to the arbitrator component 682 prior to the processing of the LLM shortlister component 540. In some embodiments, the LLM orchestrator component 530 may further include a component configured to process the task processing data output by the task generation component 535 (e.g., the task data 537) to determine whether completion of the current task will result in a real-world action (e.g., a change in the state of a device, such as turning on a light, changing a channel on a television, changing a temperature value on a thermostat, locking a door, etc.). If the component determines that completion of the current task will result in a real-world action, then the LLM orchestrator component 530 may temporarily suspend its processing prior to the processing of the LLM shortlister component 540. If the component determines that completion of the current task will not result in a real-world action, then the LLM orchestrator component 530 may begin processing of the LLM shortlister component 540, rather than temporarily suspending processing. In some embodiments, the orchestrator component 630 may include a similarly configured component.

Figure 9:
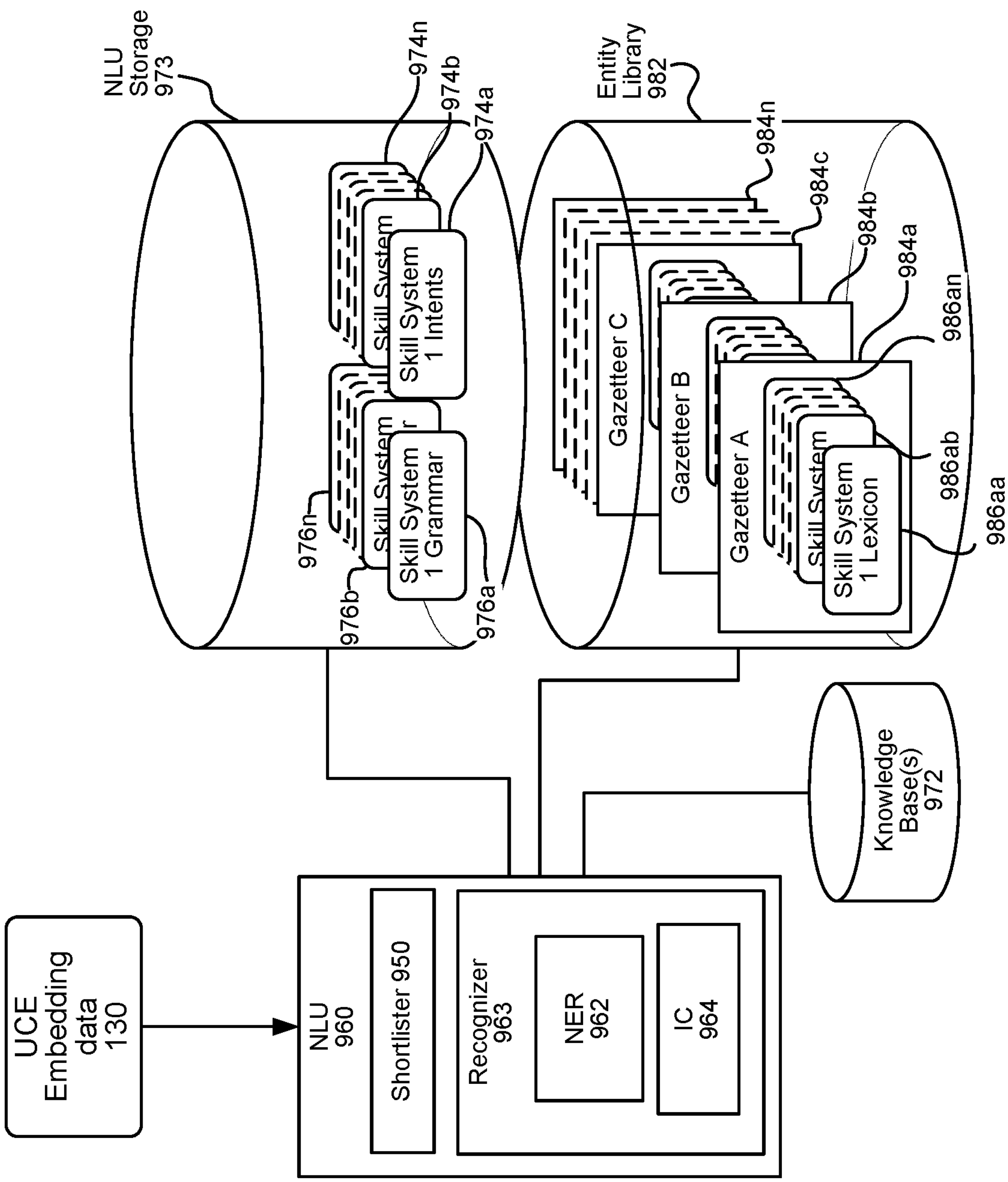
FIG. 9 is a conceptual diagram of how natural language processing is performed, according to embodiments of the present disclosure.
Figure 10:
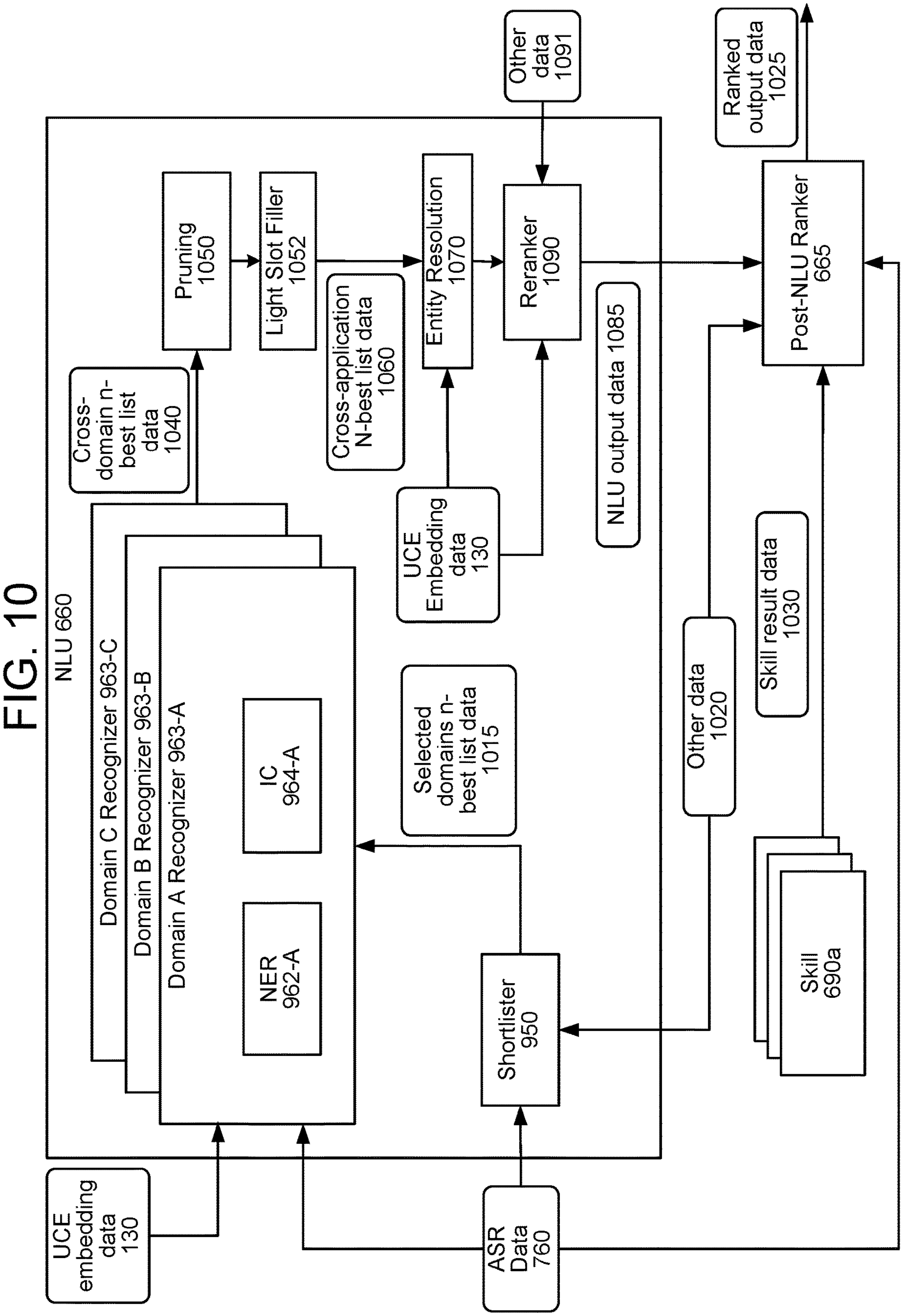
FIG. 10 is a conceptual diagram of how natural language processing is performed, according to embodiments of the present disclosure.

FIGS. 9 and 10 illustrates how the NLU component 660 may perform NLU processing. FIG. 9 is a conceptual diagram of how natural language processing is performed, according to embodiments of the present disclosure. And FIG. 10 is a conceptual diagram of how natural language processing is performed, according to embodiments of the present disclosure.

FIG. 9 illustrates how NLU processing is performed on text data. The NLU component 660 may process text data including several ASR hypotheses of a single user input. For example, if the ASR component 650 outputs text data including an n-best list of ASR hypotheses, the NLU component 660 may process the text data with respect to all (or a portion of) the ASR hypotheses represented therein.

The NLU component 660 may annotate text data by parsing and/or tagging the text data. For example, for the text data "tell me the weather for Seattle," the NLU component 660 may tag "tell me the weather for Seattle" as an <OutputWeather> intent as well as separately tag "Seattle" as a location for the weather information.

The NLU component 660 may include a shortlister component 950. The shortlister component 950 selects skills that may execute with respect to ASR output data 760 input to the NLU component 660 (e.g., applications that may execute with respect to the user input). The ASR output data 760 (which may also be referred to as ASR output data 760) may include representations of text of an utterance, such as words, subword units, or the like. The shortlister component 950 thus limits downstream, more resource intensive NLU processes to being performed with respect to skills that may execute with respect to the user input.

Without a shortlister component 950, the NLU component 660 may process ASR output data 760 input thereto with respect to every skill of the system, either in parallel, in series, or using some combination thereof. By implementing a shortlister component 950, the NLU component 660 may process ASR output data 760 with respect to only the skills that may execute with respect to the user input. This reduces total compute power and latency attributed to NLU processing.

The shortlister component 950 may include one or more trained models. The model(s) may be trained to recognize various forms of user inputs that may be received by the system component(s) 520. For example, during a training period skill system component(s) 525 associated with a skill may provide the system component(s) 520 with training text data representing sample user inputs that may be provided by a user to invoke the skill. For example, for a ride sharing skill, a skill system component(s) 525 associated with the ride sharing skill may provide the system component(s) 520 with training text data including text corresponding to "get me a cab to [location]," "get me a ride to [location]," "book me a cab to [location]," "book me a ride to [location]," etc. The one or more trained models that will be used by the shortlister component 950 may be trained, using the training text data representing sample user inputs, to determine other potentially related user input structures that users may try to use to invoke the particular skill. During training, the system component(s) 520 may solicit the skill system component(s) 525 associated with the skill regarding whether the determined other user input structures are permissible, from the perspective of the skill system component(s) 525, to be used to invoke the skill. The alternate user input structures may be derived by one or more trained models during model training and/or may be based on user input structures provided by different skills. The skill system component(s) 525 associated with a particular skill may also provide the system component(s) 520 with training text data indicating grammar and annotations. The system component(s) 520 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 950 may be trained with respect to a different skill. Alternatively, the shortlister component 950 may use one trained model per domain, such as one trained model for skills associated with a weather domain, one trained model for skills associated with a ride sharing domain, etc.

The system component(s) 520 may use the sample user inputs provided by a skill system component(s) 525, and related sample user inputs potentially determined during training, as binary examples to train a model associated with a skill associated with the skill system component(s) 525. The model associated with the particular skill may then be operated at runtime by the shortlister component 950. For example, some sample user inputs may be positive examples (e.g., user inputs that may be used to invoke the skill). Other sample user inputs may be negative examples (e.g., user inputs that may not be used to invoke the skill).

As described above, the shortlister component 950 may include a different trained model for each skill of the system, a different trained model for each domain, or some other combination of trained model(s). For example, the shortlister component 950 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 950 to output indications of only a portion of the skills that the ASR output data 760 may relate to. For example, a user input may correspond to "tell me about Tom Collins." If the model is clustered based on domain, the shortlister component 950 may determine the user input corresponds to a recipe skill (e.g., a drink recipe) even though the user input may also correspond to an information skill (e.g., including information about a person named Tom Collins).

The NLU component 660 may include one or more recognizers 963. In at least some embodiments, a recognizer 963 may be associated with a skill system component(s) 525 (e.g., the recognizer may be configured to interpret text data to correspond to the skill system component(s) 525). In at least some other examples, a recognizer 963 may be associated with a domain such as smart home, video, music, weather, custom, etc. (e.g., the recognizer may be configured to interpret text data to correspond to the domain).

If the shortlister component 950 determines ASR output data 760 is potentially associated with multiple domains, the recognizers 963 associated with the domains may process the ASR output data 760, while recognizers 963 not indicated in the shortlister component 950's output may not process the ASR output data 760. The "shortlisted" recognizers 963 may process the ASR output data 760 in parallel, in series, partially in parallel, etc. For example, if ASR output data 760 potentially relates to both a communications domain and a music domain, a recognizer associated with the communications domain may process the ASR output data 760 in parallel, or partially in parallel, with a recognizer associated with the music domain processing the ASR output data 760.

Each recognizer 963 may include a named entity recognition (NER) component 962. The NER component 962 attempts to identify grammars and lexical information that may be used to construe meaning with respect to text data input therein. The NER component 962 identifies portions of text data that correspond to a named entity associated with a domain, associated with the recognizer 963 implementing the NER component 962. The NER component 962 (or other component of the NLU component 660) may also determine whether a word refers to an entity whose identity is not explicitly mentioned in the text data, for example "him," "her," "it" or other anaphora, exophora, or the like.

Each recognizer 963, and more specifically each NER component 962, may be associated with a particular grammar database 976, a particular set of intents/actions 974, and a particular personalized lexicon 986. The grammar databases 976, and intents/actions 974 may be stored in an NLU storage 973. Each gazetteer 984 may include domain/skill-indexed lexical information associated with a particular user and/or user device 510. For example, a Gazetteer A (984*a*) includes skill-indexed lexical information 986*aa* to 986*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 962 applies grammar information 976 and lexical information 986 associated with a domain (associated with the recognizer 963 implementing the NER component 962) to determine a mention of one or more entities in text data. In this manner, the NER component 962 identifies "slots" (each corresponding to one or more particular words in text data, also referred to herein as "slot types") that may be useful for later processing. The NER component 962 may also label each slot with a type (e.g., noun, place, city, artist name, song name, etc.). As shown in FIG. 10, the recognizer 963 may further receive the UCE embedding data 130

Each grammar database 976 includes the names of entities (i.e., nouns) commonly found in speech about the particular domain to which the grammar database 976 relates, whereas the lexical information 986 is personalized to the user and/or the user device 510 from which the user input originated. For example, a grammar database 976 associated with a shopping domain may include a database of words commonly used when people discuss shopping.

A downstream process called entity resolution (discussed in detail elsewhere herein) links a slot of text data to a specific entity known to the system. To perform entity resolution, the NLU component 660 may utilize gazetteer information (984*a*-984*n*) stored in an entity library storage 982. The gazetteer information 984 may be used to match text data (representing a portion of the user input) with text data representing known entities, such as song titles, contact names, etc. Gazetteers 984 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 963 may also include an intent classification (IC) component 964. An IC component 964 parses text data to determine an intent(s) (associated with the domain associated with the recognizer 963 implementing the IC component 964) that potentially represents the user input. An intent represents to an action a user desires be performed. An IC component 964 may communicate with a database 974 of words linked to intents. For example, a music intent database may link words and phrases such as "quiet," "volume off," and "mute" to a <Mute> intent. An IC component 964 identifies potential intents by comparing words and phrases in text data (representing at least a portion of the user input) to the words and phrases in an intents database 974 (associated with the domain that is associated with the recognizer 963 implementing the IC component 964).

The intents identifiable by a specific IC component 964 are linked to domain-specific (i.e., the domain associated with the recognizer 963 implementing the IC component 964) grammar frameworks 976 with "slots" to be filled. Each slot of a grammar framework 976 corresponds to a portion of text data that the system believes corresponds to an entity. For example, a grammar framework 976 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 976 may not be structured as sentences, but rather based on associating slots with grammatical tags.

For example, an NER component 962 may parse text data to identify words as subject, object, verb, preposition, etc. based on grammar rules and/or models prior to recognizing named entities in the text data. An IC component 964 (implemented by the same recognizer 963 as the NER component 962) may use the identified verb to identify an intent. The NER component 962 may then determine a grammar model 976 associated with the identified intent. For example, a grammar model 976 for an intent corresponding to <PlayMusic> may specify a list of slots applicable to play the identified "object" and any object modifier (e.g., a prepositional phrase), such as {Artist Name}, {Album Name}, {Song name}, etc. The NER component 962 may then search corresponding fields in a lexicon 986 (associated with the domain associated with the recognizer 963 implementing the NER component 962), attempting to match words and phrases in text data the NER component 962 previously tagged as a grammatical object or object modifier with those identified in the lexicon 986.

An NER component 962 may perform semantic tagging, which is the labeling of a word or combination of words according to their type/semantic meaning. An NER component 962 may parse text data using heuristic grammar rules, or a model may be constructed using techniques such as Hidden Markov Models, maximum entropy models, log linear models, conditional random fields (CRF), and the like. For example, an NER component 962 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 962 identifies "Play" as a verb based on a word database associated with the music domain, which an IC component 964 (also implemented by the music domain recognizer) may determine corresponds to a <PlayMusic> intent. At this stage, no determination has been made as to the meaning of "mother's little helper" or "the rolling stones," but based on grammar rules and models, the NER component 962 has determined the text of these phrases relates to the grammatical object (i.e., entity) of the user input represented in the text data.

An NER component 962 may tag text data to attribute meaning thereto. For example, an NER component 962 may tag "play mother's little helper by the rolling stones" as: {domain} Music, {intent}<PlayMusic>, {artist name} rolling stones, {media type}SONG, and {song title} mother's little helper. For further example, the NER component 962 may tag "play songs by the rolling stones" as: {domain} Music, {intent}<PlayMusic>, {artist name} rolling stones, and {media type}SONG.

In some embodiments, the NER component 962 or the IC component 964 may use the UCE embedding data 130 to perform processing. For example, the NER component 962 may use the UCE embedding data 130 to determine portions of the ASR output data 760 that correspond to particular entities and slot types that may be represented in the UCE embedding data 130 (e.g., identify a particular contact name from the user profile and represented in the UCE embedding data 130 as a "contact name" or "person name"; identify a newly released song as a "song" slot type; etc.). As another example, the IC component 964 may use the UCE embedding data 130 to identify an intent (e.g., identify a new intent/term or user-specific intent/term that may be represented in the UCE embedding data 130).

The UCE embedding data 130 may be used by other components of the NLU component 660 for processing as well.

The shortlister component 950 may receive ASR output data 760 output from the ASR component 650 or output from the user device 510*b* (as illustrated in FIG. 10). The ASR component 650 may embed the ASR output data 760 into a form processable by a trained model(s) using sentence embedding techniques as known in the art. Sentence embedding results in the ASR output data 760 including text in a structure that enables the trained models of the shortlister component 950 to operate on the ASR output data 760. For example, an embedding of the ASR output data 760 may be a vector representation of the ASR output data 760.

The shortlister component 950 may make binary determinations (e.g., yes or no) regarding which domains relate to the ASR output data 760. The shortlister component 950 may make such determinations using the one or more trained models described herein above. If the shortlister component 950 implements a single trained model for each domain, the shortlister component 950 may simply run the models that are associated with enabled domains as indicated in a user profile associated with the user device 510 and/or user that originated the user input.

The shortlister component 950 may generate n-best list data 1015 representing domains that may execute with respect to the user input represented in the ASR output data 760. The size of the n-best list represented in the n-best list data 1015 is configurable. In an example, the n-best list data 1015 may indicate every domain of the system as well as contain an indication, for each domain, regarding whether the domain is likely capable to execute the user input represented in the ASR output data 760. In another example, instead of indicating every domain of the system, the n-best list data 1015 may only indicate the domains that are likely to be able to execute the user input represented in the ASR output data 760. In yet another example, the shortlister component 950 may implement thresholding such that the n-best list data 1015 may indicate no more than a maximum number of domains that may execute the user input represented in the ASR output data 760. In an example, the threshold number of domains that may be represented in the n-best list data 1015 is ten. In another example, the domains included in the n-best list data 1015 may be limited by a threshold a score, where only domains indicating a likelihood to handle the user input is above a certain score (as determined by processing the ASR output data 760 by the shortlister component 950 relative to such domains) are included in the n-best list data 1015.

The ASR output data 760 may correspond to more than one ASR hypothesis. When this occurs, the shortlister component 950 may output a different n-best list (represented in the n-best list data 1015) for each ASR hypothesis. Alternatively, the shortlister component 950 may output a single n-best list representing the domains that are related to the multiple ASR hypotheses represented in the ASR output data 760.

As indicated above, the shortlister component 950 may implement thresholding such that an n-best list output therefrom may include no more than a threshold number of entries. If the ASR output data 760 includes more than one ASR hypothesis, the n-best list output by the shortlister component 950 may include no more than a threshold number of entries irrespective of the number of ASR hypotheses output by the ASR component 650. Alternatively or in addition, the n-best list output by the shortlister component 950 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 760, the shortlister component 950 may generate confidence scores representing likelihoods that domains relate to the ASR output data 760. If the shortlister component 950 implements a different trained model for each domain, the shortlister component 950 may generate a different confidence score for each individual domain trained model that is run. If the shortlister component 950 runs the models of every domain when ASR output data 760 is received, the shortlister component 950 may generate a different confidence score for each domain of the system. If the shortlister component 950 runs the models of only the domains that are associated with skills indicated as enabled in a user profile associated with the user device 510 and/or user that originated the user input, the shortlister component 950 may only generate a different confidence score for each domain associated with at least one enabled skill. If the shortlister component 950 implements a single trained model with domain specifically trained portions, the shortlister component 950 may generate a different confidence score for each domain who's specifically trained portion is run. The shortlister component 950 may perform matrix vector modification to obtain confidence scores for all domains of the system in a single instance of processing of the ASR output data 760.

N-best list data 1015 including confidence scores that may be output by the shortlister component 950 may be represented as, for example:

Search domain, 0.67
Recipe domain, 0.62
Information domain, 0.57
Shopping domain, 0.42

As indicated, the confidence scores output by the shortlister component 950 may be numeric values. The confidence scores output by the shortlister component 950 may alternatively be binned values (e.g., high, medium, low).

The n-best list may only include entries for domains having a confidence score satisfying (e.g., equaling or exceeding) a minimum threshold confidence score. Alternatively, the shortlister component 950 may include entries for all domains associated with user enabled skills, even if one or more of the domains are associated with confidence scores that do not satisfy the minimum threshold confidence score.

The shortlister component 950 may consider other data 1020 when determining which domains may relate to the user input represented in the ASR output data 760 as well as respective confidence scores. The other data 1020 may include usage history data associated with the user device 510 and/or user that originated the user input. For example, a confidence score of a domain may be increased if user inputs originated by the user device 510 and/or user routinely invoke the domain. Conversely, a confidence score of a domain may be decreased if user inputs originated by the user device 510 and/or user rarely invoke the domain. Thus, the other data 1020 may include an indicator of the user associated with the ASR output data 760, for example as determined by the user recognition component.

The other data 1020 may be character embedded prior to being input to the shortlister component 950. The other data 1020 may alternatively be embedded using other techniques known in the art prior to being input to the shortlister component 950.

The other data 1020 may also include data indicating the domains associated with skills that are enabled with respect to the user device 510 and/or user that originated the user input. The shortlister component 950 may use such data to determine which domain-specific trained models to run. That is, the shortlister component 950 may determine to only run the trained models associated with domains that are associated with user-enabled skills. The shortlister component 950 may alternatively use such data to alter confidence scores of domains.

As an example, considering two domains, a first domain associated with at least one enabled skill and a second domain not associated with any user-enabled skills of the user that originated the user input, the shortlister component 950 may run a first model specific to the first domain as well as a second model specific to the second domain. Alternatively, the shortlister component 950 may run a model configured to determine a score for each of the first and second domains. The shortlister component 950 may determine a same confidence score for each of the first and second domains in the first instance. The shortlister component 950 may then alter those confidence scores based on which domains is associated with at least one skill enabled by the present user. For example, the shortlister component 950 may increase the confidence score associated with the domain associated with at least one enabled skill while leaving the confidence score associated with the other domain the same. Alternatively, the shortlister component 950 may leave the confidence score associated with the domain associated with at least one enabled skill the same while decreasing the confidence score associated with the other domain. Moreover, the shortlister component 950 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 670. When the shortlister component 950 receives the ASR output data 760, the shortlister component 950 may determine whether profile data associated with the user and/or user device 510 that originated the command includes an indication of enabled skills.

The other data 1020 may also include data indicating the type of the user device 510. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 950 may use such data to determine which domain-specific trained models to run. For example, if the user device 510 corresponds to a displayless type device, the shortlister component 950 may determine not to run trained models specific to domains that output video data. The shortlister component 950 may alternatively use such data to alter confidence scores of domains.

As an example, considering two domains, one that outputs audio data and another that outputs video data, the shortlister component 950 may run a first model specific to the domain that generates audio data as well as a second model specific to the domain that generates video data. Alternatively the shortlister component 950 may run a model configured to determine a score for each domain. The shortlister component 950 may determine a same confidence score for each of the domains in the first instance. The shortlister component 950 may then alter the original confidence scores based on the type of the user device 510 that originated the user input corresponding to the ASR output data 760. For example, if the user device 510 is a displayless device, the shortlister component 950 may increase the confidence score associated with the domain that generates audio data while leaving the confidence score associated with the domain that generates video data the same. Alternatively, if the user device 510 is a displayless device, the shortlister component 950 may leave the confidence score associated with the domain that generates audio data the same while decreasing the confidence score associated with the domain that generates video data. Moreover, if the user device 510 is a displayless device, the shortlister component 950 may increase the confidence score associated with the domain that generates audio data as well as decrease the confidence score associated with the domain that generates video data.

The type of device information represented in the other data 1020 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1020 may represent the smart TV of other display device, and not the displayless device that captured the spoken user input.

The other data 1020 may also include data indicating the user input originating device's speed, location, or other mobility information. For example, the device may correspond to a vehicle including a display. If the vehicle is moving, the shortlister component 950 may decrease the confidence score associated with a domain that generates video data as it may be undesirable to output video content to a user while the user is driving. The device may output data to the system component(s) 520 indicating when the device is moving.

The other data 1020 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 950 may use such data to alter confidence scores of domains. For example, the shortlister component 950 may run a first model specific to a first domain as well as a second model specific to a second domain. Alternatively, the shortlister component 950 may run a model configured to determine a score for each domain. The shortlister component 950 may also determine a same confidence score for each of the domains in the first instance. The shortlister component 950 may then alter the original confidence scores based on the first domain being invoked to cause the system to output content while the current user input was received. Based on the first domain being invoked, the shortlister component 950 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1015 generated by the shortlister component 950 as well as the different types of other data 1020 considered by the shortlister component 950 are configurable. For example, the shortlister component 950 may update confidence scores as more other data 1020 is considered. For further example, the n-best list data 1015 may exclude relevant domains if thresholding is implemented. Thus, for example, the shortlister component 950 may include an indication of a domain in the n-best list data 1015 unless the shortlister component 950 is one hundred percent confident that the domain may not execute the user input represented in the ASR output data 760 (e.g., the shortlister component 950 determines a confidence score of zero for the domain).

The shortlister component 950 may send the ASR output data 760 to recognizers 963 associated with domains represented in the n-best list data 1015. Alternatively, the shortlister component 950 may send the n-best list data 1015 or some other indicator of the selected subset of domains to another component (such as the orchestrator component 630) which may in turn send the ASR output data 760 to the recognizers 963 corresponding to the domains included in the n-best list data 1015 or otherwise indicated in the indicator. If the shortlister component 950 generates an n-best list representing domains without any associated confidence scores, the shortlister component 950/orchestrator component 630 may send the ASR output data 760 to recognizers 963 associated with domains that the shortlister component 950 determines may execute the user input. If the shortlister component 950 generates an n-best list representing domains with associated confidence scores, the shortlister component 950/orchestrator component 630 may send the ASR output data 760 to recognizers 963 associated with domains associated with confidence scores satisfying (e.g., meeting or exceeding) a threshold minimum confidence score.

A recognizer 963 may output tagged text data generated by an NER component 962 and an IC component 964, as described herein above. The NLU component 660 may compile the output tagged text data of the recognizers 963 into a single cross-domain n-best list 1040 and may send the cross-domain n-best list 1040 to a pruning component 1050. Each entry of tagged text (e.g., each NLU hypothesis) represented in the cross-domain n-best list data 1040 may be associated with a respective score indicating a likelihood that the NLU hypothesis corresponds to the domain associated with the recognizer 963 from which the NLU hypothesis was output. For example, the cross-domain n-best list data 1040 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1050 may sort the NLU hypotheses represented in the cross-domain n-best list data 1040 according to their respective scores. The pruning component 1050 may perform score thresholding with respect to the cross-domain NLU hypotheses. For example, the pruning component 1050 may select NLU hypotheses associated with scores satisfying (e.g., meeting and/or exceeding) a threshold score. The pruning component 1050 may also or alternatively perform number of NLU hypothesis thresholding. For example, the pruning component 1050 may select the top scoring NLU hypothesis(es). The pruning component 1050 may output a portion of the NLU hypotheses input thereto. The purpose of the pruning component 1050 is to create a reduced list of NLU hypotheses so that downstream, more resource intensive, processes may only operate on the NLU hypotheses that most likely represent the user's intent.

The NLU component 660 may include a light slot filler component 1052. The light slot filler component 1052 can take text from slots represented in the NLU hypotheses output by the pruning component 1050 and alter them to make the text more easily processed by downstream components. The light slot filler component 1052 may perform low latency operations that do not involve heavy operations such as reference to a knowledge base (e.g., 972. The purpose of the light slot filler component 1052 is to replace words with other words or values that may be more easily understood by downstream components. For example, if a NLU hypothesis includes the word "tomorrow," the light slot filler component 1052 may replace the word "tomorrow" with an actual date for purposes of downstream processing. Similarly, the light slot filler component 1052 may replace the word "CD" with "album" or the words "compact disc." The replaced words are then included in the cross-domain n-best list data 1060.

The cross-domain n-best list data 1060 may be input to an entity resolution component 1070. The entity resolution component 1070 can apply rules or other instructions to standardize labels or tokens from previous stages into an intent/slot representation. The precise transformation may depend on the domain. For example, for a travel domain, the entity resolution component 1070 may transform text corresponding to "Boston airport" to the standard BOS three-letter code referring to the airport. The entity resolution component 1070 can refer to a knowledge base (e.g., 972) that is used to specifically identify the precise entity referred to in each slot of each NLU hypothesis represented in the cross-domain n-best list data 1060. Specific intent/slot combinations may also be tied to a particular source, which may then be used to resolve the text. In the example "play songs by the stones," the entity resolution component 1070 may reference a personal music catalog, Amazon Music account, a user profile, or the like. The entity resolution component 1070 may output an altered n-best list that is based on the cross-domain n-best list 1060 but that includes more detailed information (e.g., entity IDs) about the specific entities mentioned in the slots and/or more detailed slot data that can eventually be used by a skill. The NLU component 660 may include multiple entity resolution components 1070 and each entity resolution component 1070 may be specific to one or more domains. The entity resolution component 1070 may also use the UCE embedding data 130. For example, the entity resolution component 1070 may resolve a particular contact name or a user-defined device name based on the UCE embedding data 130 including a representation of such entities.

The NLU component 660 may include a reranker 1090. The reranker 1090 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1070.

The reranker 1090 may apply re-scoring, biasing, or other techniques. The reranker 1090 may consider not only the data output by the entity resolution component 1070, but may also consider other data 1091. The other data 1091 may include a variety of information. For example, the other data 1091 may include skill rating or popularity data. For example, if one skill has a high rating, the reranker 1090 may increase the score of a NLU hypothesis that may be processed by the skill. The other data 1091 may also include information about skills that have been enabled by the user that originated the user input. For example, the reranker 1090 may assign higher scores to NLU hypothesis that may be processed by enabled skills than NLU hypothesis that may be processed by non-enabled skills. The other data 1091 may also include data indicating user usage history, such as if the user that originated the user input regularly uses a particular skill or does so at particular times of day. The other data 1091 may additionally include data indicating date, time, location, weather, type of user device 510, user identifier, context, as well as other information. For example, the reranker 1090 may consider when any particular skill is currently active (e.g., music being played, a game being played, etc.). The reranker 1090 may also consider the UCE embedding data 130.

As illustrated and described, the entity resolution component 1070 is implemented prior to the reranker 1090. The entity resolution component 1070 may alternatively be implemented after the reranker 1090. Implementing the entity resolution component 1070 after the reranker 1090 limits the NLU hypotheses processed by the entity resolution component 1070 to only those hypotheses that successfully pass through the reranker 1090.

The reranker 1090 may be a global reranker (e.g., one that is not specific to any particular domain). Alternatively, the NLU component 660 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 660 may perform NLU processing described above with respect to domains associated with skills wholly implemented as part of the system component(s) 520 (e.g., designated 690 in FIG. 6). The NLU component 660 may separately perform NLU processing described above with respect to domains associated with skills that are at least partially implemented as part of the skill system component(s) 525. In an example, the shortlister component 950 may only process with respect to these latter domains. Results of these two NLU processing paths may be merged into NLU output data 1085, which may be sent to a post-NLU ranker 665, which may be implemented by the system component(s) 520.

The post-NLU ranker 665 may include a statistical component that produces a ranked list of intent/skill pairs with associated confidence scores. Each confidence score may indicate an adequacy of the skill's execution of the intent with respect to NLU results data associated with the skill. The post-NLU ranker 665 may operate one or more trained models configured to process the NLU output data 1085, skill result data 1030, and the other data 1020 in order to output ranked output data 1025. The ranked output data 1025 may include an n-best list where the NLU hypotheses in the NLU output data 1085 are reordered such that the n-best list in the ranked output data 1025 represents a prioritized list of skills to respond to a user input as determined by the post-NLU ranker 665. The ranked output data 1025 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 665 enables the system to better determine the best skill to execute the user input. For example, first and second NLU hypotheses in the NLU output data 1085 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 665 (or other scheduling component such as orchestrator component 630) may solicit the first skill and the second skill to provide potential result data 1030 based on the first NLU hypothesis and the second NLU hypothesis, respectively. For example, the post-NLU ranker 665 may send the first NLU hypothesis to the first skill component 690*a* along with a request for the first skill component 690*a* to at least partially execute with respect to the first NLU hypothesis. The post-NLU ranker 665 may also send the second NLU hypothesis to the second skill component 690*b* along with a request for the second skill component 690*b* to at least partially execute with respect to the second NLU hypothesis. The post-NLU ranker 665 receives, from the first skill component 690*a*, first result data 1030*a* generated from the first skill component 690*a*'s execution with respect to the first NLU hypothesis. The post-NLU ranker 665 also receives, from the second skill component 690*b*, second results data 1030*b* generated from the second skill component 690*b*'s execution with respect to the second NLU hypothesis.

The result data 1030 may include various portions. For example, the result data 1030 may include content (e.g., audio data, text data, and/or video data) to be output to a user. The result data 1030 may also include a unique identifier used by the system component(s) 520 and/or the skill system component(s) 525 to locate the data to be output to a user. The result data 1030 may also include an instruction. For example, if the user input corresponds to "turn on the light," the result data 1030 may include an instruction causing the system to turn on a light associated with a profile of the device (110*a*/110*b*) and/or user.

The post-NLU ranker 665 may consider the first result data 1030*a* and the second result data 1030*b* to alter the first confidence score and the second confidence score of the first NLU hypothesis and the second NLU hypothesis, respectively. That is, the post-NLU ranker 665 may generate a third confidence score based on the first result data 1030*a* and the first confidence score. The third confidence score may correspond to how likely the post-NLU ranker 665 determines the first skill will correctly respond to the user input. The post-NLU ranker 665 may also generate a fourth confidence score based on the second result data 1030*b* and the second confidence score. One skilled in the art will appreciate that a first difference between the third confidence score and the fourth confidence score may be greater than a second difference between the first confidence score and the second confidence score. The post-NLU ranker 665 may also consider the other data 1020 to generate the third confidence score and the fourth confidence score. While it has been described that the post-NLU ranker 665 may alter the confidence scores associated with first and second NLU hypotheses, one skilled in the art will appreciate that the post-NLU ranker 665 may alter the confidence scores of more than two NLU hypotheses. The post-NLU ranker 665 may select the result data 1030 associated with the skill component 690 with the highest altered confidence score to be the data output in response to the current user input. The post-NLU ranker 665 may also consider the ASR output data 760 to alter the NLU hypotheses confidence scores.

The orchestrator component 630 may, prior to sending the NLU output data 1085 to the post-NLU ranker 665, associate intents in the NLU hypotheses with skill components 690. For example, if a NLU hypothesis includes a <PlayMusic> intent, the orchestrator component 630 may associate the NLU hypothesis with one or more skill components 690 that can execute the <PlayMusic> intent. Thus, the orchestrator component 630 may send the NLU output data 1085, including NLU hypotheses paired with skill components 690, to the post-NLU ranker 665. In response to ASR output data 760 corresponding to "what should I do for dinner today," the orchestrator component 630 may generates pairs of skill components 690 with associated NLU hypotheses corresponding to:

Skill 1/NLU hypothesis including <Help> intent

Skill 2/NLU hypothesis including <Order> intent

Skill 3/NLU hypothesis including <DishType> intent

The post-NLU ranker 665 queries each skill component 690, paired with a NLU hypothesis in the NLU output data 1085, to provide result data 1030 based on the NLU hypothesis with which it is associated. That is, with respect to each skill, the post-NLU ranker 665 colloquially asks the each skill "if given this NLU hypothesis, what would you do with it." According to the above example, the post-NLU ranker 665 may send skill components 690 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 665 may query each of the skill components 690 in parallel or substantially in parallel.

A skill component 690 may provide the post-NLU ranker 665 with various data and indications in response to the post-NLU ranker 665 soliciting the skill component 690 for result data 1030. A skill component 690 may simply provide the post-NLU ranker 665 with an indication of whether or not the skill can execute with respect to the NLU hypothesis it received. A skill component 690 may also or alternatively provide the post-NLU ranker 665 with output data generated based on the NLU hypothesis it received. In some situations, a skill component 690 may need further information in addition to what is represented in the received NLU hypothesis to provide output data responsive to the user input. In these situations, the skill component 690 may provide the post-NLU ranker 665 with result data 1030 indicating slots of a framework that the skill component 690 further needs filled or entities that the skill component 690 further needs resolved prior to the skill component 690 being able to provided result data 1030 responsive to the user input. The skill component 690 may also provide the post-NLU ranker 665 with an instruction and/or computer-generated speech indicating how the skill component 690 recommends the system solicit further information needed by the skill component 690. The skill component 690 may further provide the post-NLU ranker 665 with an indication of whether the skill component 690 will have all needed information after the user provides additional information a single time, or whether the skill component 690 will need the user to provide various kinds of additional information prior to the skill component 690 having all needed information. According to the above example, skill components 690 may provide the post-NLU ranker 665 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1030 includes an indication provided by a skill component 690 indicating whether or not the skill component 690 can execute with respect to a NLU hypothesis; data generated by a skill component 690 based on a NLU hypothesis; as well as an indication provided by a skill component 690 indicating the skill component 690 needs further information in addition to what is represented in the received NLU hypothesis.

The post-NLU ranker 665 uses the result data 1030 provided by the skill components 690 to alter the NLU processing confidence scores generated by the reranker 1090. That is, the post-NLU ranker 665 uses the result data 1030 provided by the queried skill components 690 to create larger differences between the NLU processing confidence scores generated by the reranker 1090. Without the post-NLU ranker 665, the system may not be confident enough to determine an output in response to a user input, for example when the NLU hypotheses associated with multiple skills are too close for the system to confidently determine a single skill component 690 to invoke to respond to the user input. For example, if the system does not implement the post-NLU ranker 665, the system may not be able to determine whether to obtain output data from a general reference information skill or a medical information skill in response to a user input corresponding to "what is acne."

The post-NLU ranker 665 may prefer skill components 690 that provide result data 1030 responsive to NLU hypotheses over skill components 690 that provide result data 1030 corresponding to an indication that further information is needed, as well as skill components 690 that provide result data 1030 indicating they can provide multiple responses to received NLU hypotheses. For example, the post-NLU ranker 665 may generate a first score for a first skill component 690*a* that is greater than the first skill's NLU confidence score based on the first skill component 690*a* providing result data 1030*a* including a response to a NLU hypothesis. For further example, the post-NLU ranker 665 may generate a second score for a second skill component 690*b* that is less than the second skill's NLU confidence score based on the second skill component 690*b* providing result data 1030*b* indicating further information is needed for the second skill component 690*b* to provide a response to a NLU hypothesis. Yet further, for example, the post-NLU ranker 665 may generate a third score for a third skill component 690*c* that is less than the third skill's NLU confidence score based on the third skill component 690*c* providing result data 1030*c* indicating the third skill component 690*c* can provide multiple responses to a NLU hypothesis.

The post-NLU ranker 665 may consider other data 1020 in determining scores. The other data 1020 may include rankings associated with the queried skill components 690. A ranking may be a system ranking or a user-specific ranking. A ranking may indicate a veracity of a skill from the perspective of one or more users of the system. For example, the post-NLU ranker 665 may generate a first score for a first skill component 690*a* that is greater than the first skill's NLU processing confidence score based on the first skill component 690*a* being associated with a high ranking. For further example, the post-NLU ranker 665 may generate a second score for a second skill component 690*b* that is less than the second skill's NLU processing confidence score based on the second skill component 690*b* being associated with a low ranking.

The other data 1020 may include information indicating whether or not the user that originated the user input has enabled one or more of the queried skill components 690. For example, the post-NLU ranker 665 may generate a first score for a first skill component 690*a* that is greater than the first skill's NLU processing confidence score based on the first skill component 690*a* being enabled by the user that originated the user input. For further example, the post-NLU ranker 665 may generate a second score for a second skill component 690*b* that is less than the second skill's NLU processing confidence score based on the second skill component 690*b* not being enabled by the user that originated the user input. When the post-NLU ranker 665 receives the NLU output data 1085, the post-NLU ranker 665 may determine whether profile data, associated with the user and/or device that originated the user input, includes indications of enabled skills.

The other data 1020 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 665 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 665 may increase the NLU processing confidence score associated with a first skill configured to output visual data and/or decrease the NLU processing confidence score associated with a second skill configured to output audio data.

The other data 1020 may include information indicating the veracity of the result data 1030 provided by a skill component 690. For example, if a user says "tell me a recipe for pasta sauce," a first skill component 690*a* may provide the post-NLU ranker 665 with first result data 1030*a* corresponding to a first recipe associated with a five star rating and a second skill component 690*b* may provide the post-NLU ranker 665 with second result data 1030*b* corresponding to a second recipe associated with a one star rating. In this situation, the post-NLU ranker 665 may increase the NLU processing confidence score associated with the first skill component 690*a* based on the first skill component 690*a* providing the first result data 1030*a* associated with the five star rating and/or decrease the NLU processing confidence score associated with the second skill component 690*b* based on the second skill component 690*b* providing the second result data 1030*b* associated with the one star rating.

The other data 1020 may include information indicating the type of device that originated the user input. For example, the device may correspond to a "hotel room" type if the device is located in a hotel room. If a user inputs a command corresponding to "order me food" to the device located in the hotel room, the post-NLU ranker 665 may increase the NLU processing confidence score associated with a first skill component 690*a* corresponding to a room service skill associated with the hotel and/or decrease the NLU processing confidence score associated with a second skill component 690*b* corresponding to a food skill not associated with the hotel.

The other data 1020 may include information indicating a location of the device and/or user that originated the user input. The system may be configured with skill components 690 that may only operate with respect to certain geographic locations. For example, a user may provide a user input corresponding to "when is the next train to Portland." A first skill component 690*a* may operate with respect to trains that arrive at, depart from, and pass through Portland, Oregon. A second skill component 690*b* may operate with respect to trains that arrive at, depart from, and pass through Portland, Maine. If the device and/or user that originated the user input is located in Seattle, Washington, the post-NLU ranker 665 may increase the NLU processing confidence score associated with the first skill component 690*a* and/or decrease the NLU processing confidence score associated with the second skill component 690*b*. Likewise, if the device and/or user that originated the user input is located in Boston, Massachusetts, the post-NLU ranker 665 may increase the NLU processing confidence score associated with the second skill component 690*b* and/or decrease the NLU processing confidence score associated with the first skill component 690*a*.

The other data 1020 may include information indicating a time of day. The system may be configured with skill components 690 that operate with respect to certain times of day. For example, a user may provide a user input corresponding to "order me food." A first skill component 690*a* may generate first result data 1030*a* corresponding to breakfast. A second skill component 690*b* may generate second result data 1030*b* corresponding to dinner. If the system component(s) 520 receives the user input in the morning, the post-NLU ranker 665 may increase the NLU processing confidence score associated with the first skill component 690*a* and/or decrease the NLU processing score associated with the second skill component 690*b*. If the system component(s) 520 receives the user input in the afternoon or evening, the post-NLU ranker 665 may increase the NLU processing confidence score associated with the second skill component 690*b* and/or decrease the NLU processing confidence score associated with the first skill component 690*a*.

The other data 1020 may include information indicating user preferences. The system may include multiple skill components 690 configured to execute in substantially the same manner. For example, a first skill component 690*a* and a second skill component 690*b* may both be configured to order food from respective restaurants. The system may store a user preference (e.g., in the profile storage 670) that is associated with the user that provided the user input to the system component(s) 520 as well as indicates the user prefers the first skill component 690*a* over the second skill component 690*b*. Thus, when the user provides a user input that may be executed by both the first skill component 690*a* and the second skill component 690*b*, the post-NLU ranker 665 may increase the NLU processing confidence score associated with the first skill component 690*a* and/or decrease the NLU processing confidence score associated with the second skill component 690*b*.

The other data 1020 may include information indicating system usage history associated with the user that originated the user input. For example, the system usage history may indicate the user originates user inputs that invoke a first skill component 690*a* more often than the user originates user inputs that invoke a second skill component 690*b*. Based on this, if the present user input may be executed by both the first skill component 690*a* and the second skill component 690*b*, the post-NLU ranker 665 may increase the NLU processing confidence score associated with the first skill component 690*a* and/or decrease the NLU processing confidence score associated with the second skill component 690*b*.

The other data 1020 may include information indicating a speed at which the user device 510 that originated the user input is traveling. For example, the user device 510 may be located in a moving vehicle, or may be a moving vehicle. When a user device 510 is in motion, the system may prefer audio outputs rather than visual outputs to decrease the likelihood of distracting the user (e.g., a driver of a vehicle). Thus, for example, if the user device 510 that originated the user input is moving at or above a threshold speed (e.g., a speed above an average user's walking speed), the post-NLU ranker 665 may increase the NLU processing confidence score associated with a first skill component 690*a* that generates audio data. The post-NLU ranker 665 may also or alternatively decrease the NLU processing confidence score associated with a second skill component 690*b* that generates image data or video data.

The other data 1020 may include information indicating how long it took a skill component 690 to provide result data 1030 to the post-NLU ranker 665. When the post-NLU ranker 665 multiple skill components 690 for result data 1030, the skill components 690 may respond to the queries at different speeds. The post-NLU ranker 665 may implement a latency budget. For example, if the post-NLU ranker 665 determines a skill component 690 responds to the post-NLU ranker 665 within a threshold amount of time from receiving a query from the post-NLU ranker 665, the post-NLU ranker 665 may increase the NLU processing confidence score associated with the skill component 690. Conversely, if the post-NLU ranker 665 determines a skill component 690 does not respond to the post-NLU ranker 665 within a threshold amount of time from receiving a query from the post-NLU ranker 665, the post-NLU ranker 665 may decrease the NLU processing confidence score associated with the skill component 690.

It has been described that the post-NLU ranker 665 uses the other data 1020 to increase and decrease NLU processing confidence scores associated with various skill components 690 that the post-NLU ranker 665 has already requested result data from. Alternatively, the post-NLU ranker 665 may use the other data 1020 to determine which skill components 690 to request result data from. For example, the post-NLU ranker 665 may use the other data 1020 to increase and/or decrease NLU processing confidence scores associated with skill components 690 associated with the NLU output data 1085 output by the NLU component 660. The post-NLU ranker 665 may select n-number of top scoring altered NLU processing confidence scores. The post-NLU ranker 665 may then request result data 1030 from only the skill components 690 associated with the selected n-number of NLU processing confidence scores.

As described, the post-NLU ranker 665 may request result data 1030 from all skill components 690 associated with the NLU output data 1085 output by the NLU component 660. Alternatively, the system component(s) 520 may prefer result data 1030 from skills implemented entirely by the system component(s) 520 rather than skills at least partially implemented by the skill system component(s) 525. Therefore, in the first instance, the post-NLU ranker 665 may request result data 1030 from only skills associated with the NLU output data 1085 and entirely implemented by the system component(s) 520. The post-NLU ranker 665 may only request result data 1030 from skills associated with the NLU output data 1085, and at least partially implemented by the skill system component(s) 525, if none of the skills, wholly implemented by the system component(s) 520, provide the post-NLU ranker 665 with result data 1030 indicating either data response to the NLU output data 1085, an indication that the skill can execute the user input, or an indication that further information is needed.

As indicated above, the post-NLU ranker 665 may request result data 1030 from multiple skill components 690. If one of the skill components 690 provides result data 1030 indicating a response to a NLU hypothesis and the other skills provide result data 1030 indicating either they cannot execute or they need further information, the post-NLU ranker 665 may select the result data 1030 including the response to the NLU hypothesis as the data to be output to the user. If more than one of the skill components 690 provides result data 1030 indicating responses to NLU hypotheses, the post-NLU ranker 665 may consider the other data 1020 to generate altered NLU processing confidence scores, and select the result data 1030 of the skill associated with the greatest score as the data to be output to the user.

A system that does not implement the post-NLU ranker 665 may select the highest scored NLU hypothesis in the NLU output data 1085. The system may send the NLU hypothesis to a skill component 690 associated therewith along with a request for output data. In some situations, the skill component 690 may not be able to provide the system with output data. This results in the system indicating to the user that the user input could not be processed even though another skill associated with lower ranked NLU hypothesis could have provided output data responsive to the user input.

The post-NLU ranker 665 reduces instances of the aforementioned situation. As described, the post-NLU ranker 665 queries multiple skills associated with the NLU output data 1085 to provide result data 1030 to the post-NLU ranker 665 prior to the post-NLU ranker 665 ultimately determining the skill component 690 to be invoked to respond to the user input. Some of the skill components 690 may provide result data 1030 indicating responses to NLU hypotheses while other skill components 690 may providing result data 1030 indicating the skills cannot provide responsive data. Whereas a system not implementing the post-NLU ranker 665 may select one of the skill components 690 that could not provide a response, the post-NLU ranker 665 only selects a skill component 690 that provides the post-NLU ranker 665 with result data corresponding to a response, indicating further information is needed, or indicating multiple responses can be generated.

The post-NLU ranker 665 may select result data 1030, associated with the skill component 690 associated with the highest score, for output to the user. Alternatively, the post-NLU ranker 665 may output ranked output data 1025 indicating skill components 690 and their respective post-NLU ranker rankings. Since the post-NLU ranker 665 receives result data 1030, potentially corresponding to a response to the user input, from the skill components 690 prior to post-NLU ranker 665 selecting one of the skills or outputting the ranked output data 1025, little to no latency occurs from the time skills provide result data 1030 and the time the system outputs responds to the user.

If the post-NLU ranker 665 selects result audio data to be output to a user and the system determines content should be output audibly, the post-NLU ranker 665 (or another component of the system component(s) 520) may cause the user device 510*a* and/or the user device 510*b* to output audio corresponding to the result audio data. If the post-NLU ranker 665 selects result text data to output to a user and the system determines content should be output visually, the post-NLU ranker 665 (or another component of the system component(s) 520) may cause the user device 510*b* to display text corresponding to the result text data. If the post-NLU ranker 665 selects result audio data to output to a user and the system determines content should be output visually, the post-NLU ranker 665 (or another component of the system component(s) 520) may send the result audio data to the ASR component 650. The ASR component 650 may generate output text data corresponding to the result audio data. The system component(s) 520 may then cause the user device 510*b* to display text corresponding to the output text data. If the post-NLU ranker 665 selects result text data to output to a user and the system determines content should be output audibly, the post-NLU ranker 665 (or another component of the system component(s) 520) may send the result text data to the TTS component 656. The TTS component 656 may generate output audio data (corresponding to computer-generated speech) based on the result text data. The system component(s) 520 may then cause the user device 510*a* and/or the user device 510*b* to output audio corresponding to the output audio data.

As described, a skill component 690 may provide result data 1030 either indicating a response to the user input, indicating more information is needed for the skill component 690 to provide a response to the user input, or indicating the skill component 690 cannot provide a response to the user input. If the skill component 690 associated with the highest post-NLU ranker score provides the post-NLU ranker 665 with result data 1030 indicating a response to the user input, the post-NLU ranker 665 (or another component of the system component(s) 520, such as the orchestrator component 630) may simply cause content corresponding to the result data 1030 to be output to the user. For example, the post-NLU ranker 665 may send the result data 1030 to the orchestrator component 630. The orchestrator component 630 may cause the result data 1030 to be sent to the device (110*a*/110*b*), which may output audio and/or display text corresponding to the result data 1030. The orchestrator component 630 may send the result data 1030 to the ASR component 650 to generate output text data and/or may send the result data 1030 to the TTS component 656 to generate output audio data, depending on the situation.

The skill component 690 associated with the highest post-NLU ranker score may provide the post-NLU ranker 665 with result data 1030 indicating more information is needed as well as instruction data. The instruction data may indicate how the skill component 690 recommends the system obtain the needed information. For example, the instruction data may correspond to text data or audio data (i.e., computer-generated speech) corresponding to "please indicate ______.” The instruction data may be in a format (e.g., text data or audio data) capable of being output by the device (110*a*/110*b*). When this occurs, the post-NLU ranker 665 may simply cause the received instruction data be output by the device (110*a*/110*b*). Alternatively, the instruction data may be in a format that is not capable of being output by the device (110*a*/110*b*). When this occurs, the post-NLU ranker 665 may cause the ASR component 650 or the TTS component 656 to process the instruction data, depending on the situation, to generate instruction data that may be output by the device (110*a*/110*b*). Once the user provides the system with all further information needed by the skill component 690, the skill component 690 may provide the system with result data 1030 indicating a response to the user input, which may be output by the system as detailed above.

The system may include “informational” skill components 690 that simply provide the system with information, which the system outputs to the user. The system may also include “transactional” skill components 690 that require a system instruction to execute the user input. Transactional skill components 690 include ride sharing skills, flight booking skills, etc. A transactional skill component 690 may simply provide the post-NLU ranker 665 with result data 1030 indicating the transactional skill component 690 can execute the user input. The post-NLU ranker 665 may then cause the system to solicit the user for an indication that the system is permitted to cause the transactional skill component 690 to execute the user input. The user-provided indication may be an audible indication or a tactile indication (e.g., activation of a virtual button or input of text via a virtual keyboard). In response to receiving the user-provided indication, the system may provide the transactional skill component 690 with data corresponding to the indication. In response, the transactional skill component 690 may execute the command (e.g., book a flight, book a train ticket, etc.). Thus, while the system may not further engage an informational skill component 690 after the informational skill component 690 provides the post-NLU ranker 665 with result data 1030, the system may further engage a transactional skill component 690 after the transactional skill component 690 provides the post-NLU ranker 665 with result data 1030 indicating the transactional skill component 690 may execute the user input.

In some instances, the post-NLU ranker 665 may generate respective scores for first and second skills that are too close (e.g., are not different by at least a threshold difference) for the post-NLU ranker 665 to make a confident determination regarding which skill should execute the user input. When this occurs, the system may request the user indicate which skill the user prefers to execute the user input. The system may output TTS-generated speech to the user to solicit which skill the user wants to execute the user input.

Figure 11:
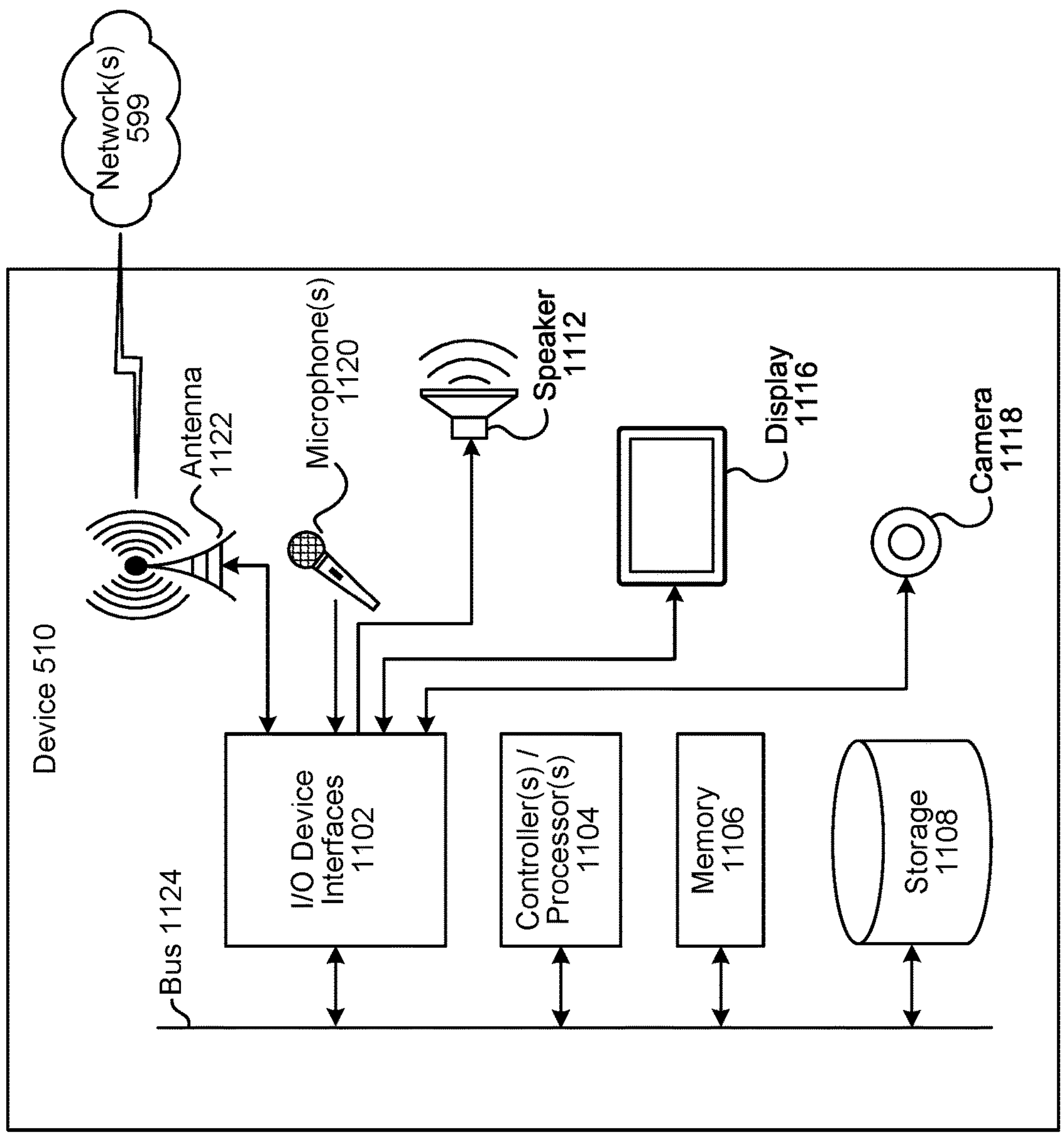
FIG. 11 is a block diagram conceptually illustrating example components of a device, according to embodiments of the present disclosure.
Figure 12:
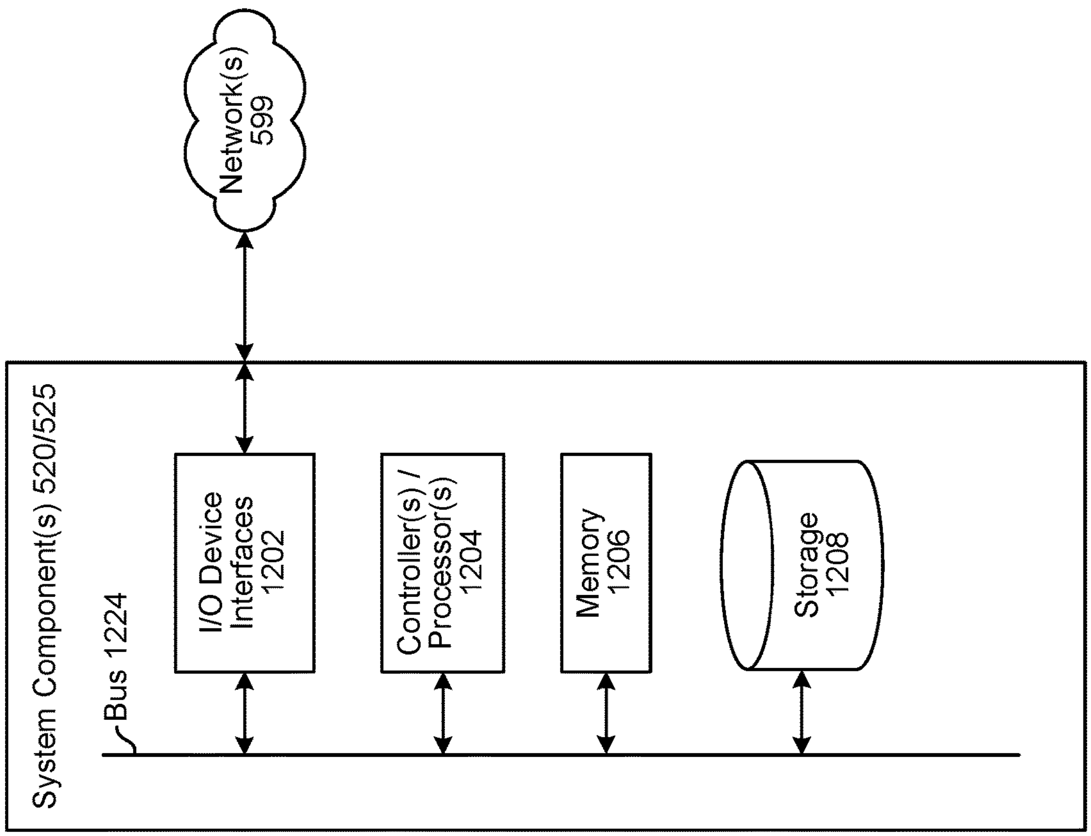
FIG. 12 is a block diagram conceptually illustrating example components of a system, according to embodiments of the present disclosure.

FIG. 11 is a block diagram conceptually illustrating a user device 510 that may be used with the system. FIG. 12 is a block diagram conceptually illustrating example components of a remote device, such as the natural language command processing system component(s), which may assist with ASR processing, NLU processing, etc., and a skill system component(s) 525. A system (520/525) may include one or more servers. A “server” as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 510 may operate locally to a user (e.g., within a same environment so the device may receive inputs and playback outputs for the user) the server/system component(s) may be located remotely from the user device 510 as its operations may not require proximity to the user. The server/system component(s) may be located in an entirely different location from the user device 510 (for example, as part of a cloud computing system or the like) or may be located in a same environment as the user device 510 but physically separated therefrom (for example a home server or similar device that resides in a user’s home or business but perhaps in a closet, basement, attic, or the like). The system component(s) 520 may also be a version of a user device 510 that includes different (e.g., more) processing capabilities than other user device(s) 510 in a home/office. One benefit to the server/system component(s) being in a user’s home/business is that data used to process a command/return a response may be kept within the user’s home, thus reducing potential privacy concerns.

Multiple system components (520/525) may be included in the overall system 100 of the present disclosure, such as one or more natural language processing system component(s) 520 for performing ASR processing, one or more natural language processing system component(s) 520 for performing NLU processing, one or more skill system component(s) 525, etc. In operation, each of these systems may include computer-readable and computer-executable instructions that reside on the respective device (520/525), as will be discussed further below.

Each of these devices (510/520/525) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random-access memory (RAM), non-volatile read only memory (ROM), non-volatile magnetoresistive memory (MRAM), and/or other types of memory. Each device (510/520/525) may also include a data storage component (1108/1208) for storing data and controller/processor-executable instructions. Each data storage component (1108/1208) may individually include one or more non-volatile storage types such as magnetic storage, optical storage, solid-state storage, etc. Each device (510/520/525) may also be connected to removable or external non-volatile memory and/or storage (such as a removable memory card, memory key drive, networked storage, etc.) through respective input/output device interfaces (1102/1202).

Computer instructions for operating each device (510/520/525) and its various components may be executed by the respective device’s controller(s)/processor(s) (1104/1204), using the memory (1106/1206) as temporary “working” storage at runtime. A device’s computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (510/520/525) includes input/output device interfaces (1102/1202). A variety of components may be connected through the input/output device interfaces (1102/1202), as will be discussed further below. Additionally, each device (510/520/525) may include an address/data bus (1124/1224) for conveying data among components of the respective device. Each component within a device (510/520/525) may also be directly connected to other components in addition to (or instead of) being connected to other components across the bus (1124/1224).

Referring to FIG. 11, the user device 510 may include input/output device interfaces 1102 that connect to a variety of components such as an audio output component such as a speaker 1112, a wired headset or a wireless headset (not illustrated), or other component capable of outputting audio. The user device 510 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 510 may additionally include a display 1116 for displaying content. The user device 510 may further include a camera 1118.

Via antenna(s) 1122, the input/output device interfaces 1102 may connect to one or more networks 599 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 599, the system may be distributed across a networked environment. The I/O device interface (1102/1002) may also include communication components that allow data to be exchanged between devices such as different physical servers in a collection of servers or other components.

The components of the device(s) 510, the natural language command processing system component(s), or a skill system component(s) 525 may include their own dedicated processors, memory, and/or storage. Alternatively, one or more of the components of the device(s) 510, the natural language command processing system component(s), or a skill system component(s) 525 may utilize the I/O interfaces (1102/1202), processor(s) (1104/1204), memory (1106/1206), and/or storage (1108/1208) of the device(s) 510, natural language command processing system component(s), or the skill system component(s) 525, respectively. Thus, the ASR component 650 may have its own I/O interface(s), processor(s), memory, and/or storage; the NLU component 660 may have its own I?O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 510, the natural language command processing system component(s), and a skill system component(s) 525, as described herein, are illustrative, and may be located as a stand-alone device or may be included, in whole or in part, as a component of a larger device or system. As can be appreciated, a number of components may exist either on a system component(s) and/or on user device 510. For example, ASR component 650 and TTS component), etc., for example as illustrated in FIG. 6. Unless expressly noted otherwise, the system version of such components may operate similarly to the device version of such components and thus the description of one version (e.g., the system version or the local version) applies to the description of the other version (e.g., the local version or system version) and vice-versa.

Figure 13:
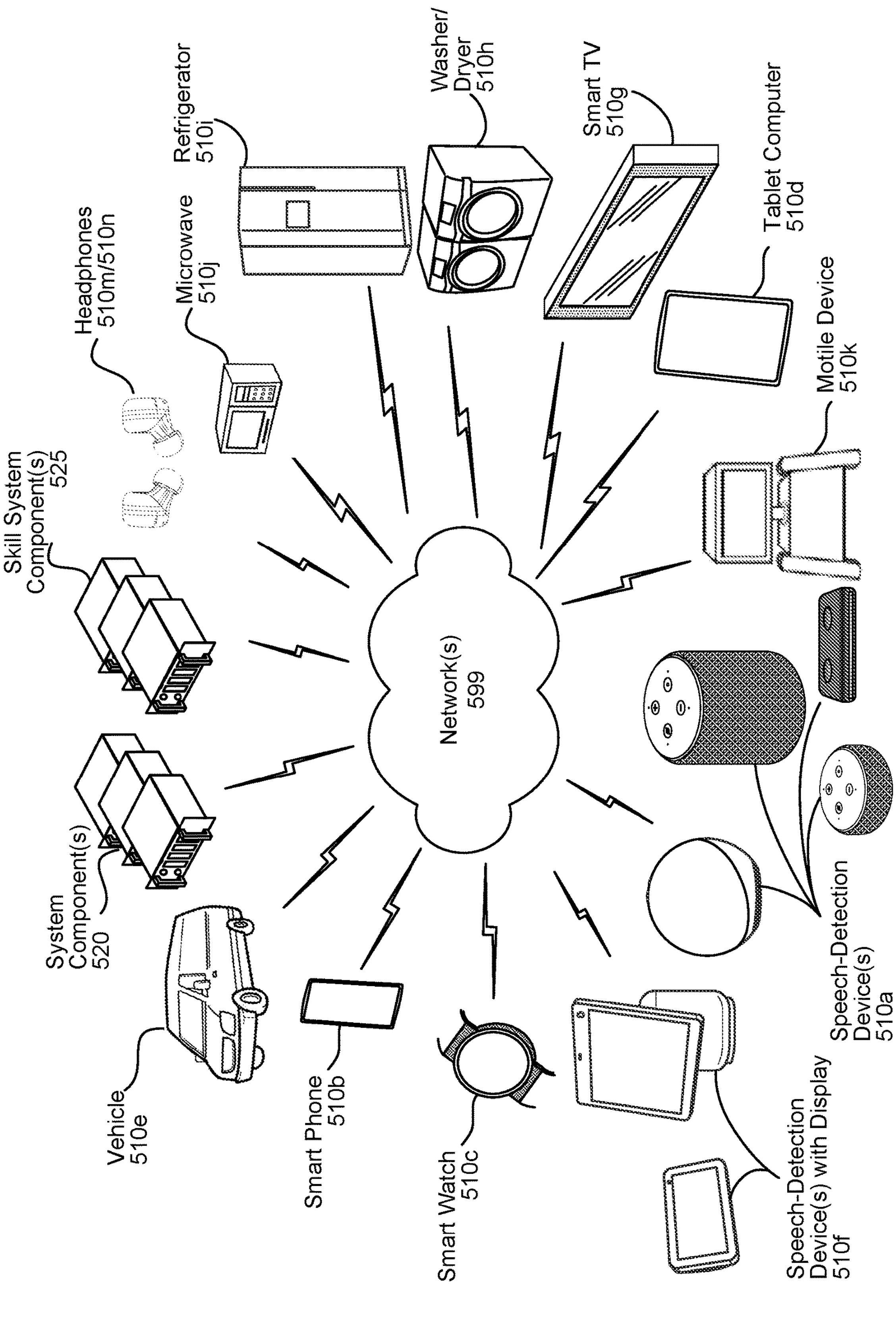
FIG. 13 illustrates an example of a computer network for use with the overall system, according to embodiments of the present disclosure.

As illustrated in FIG. 13, multiple devices (510*a*-510*n*, 520, 525) may contain components of the system and the devices may be connected over a network(s) 599. The network(s) 599 may include a local or private network or may include a wide network such as the Internet. Devices may be connected to the network(s) 599 through either wired or wireless connections. For example, a speech-detection device 510*a*, a smart phone 510*b*, a smart watch 510*c*, a tablet computer 510*d*, a vehicle 510*e*, a speech-detection device with display 510*f*, a display/smart television 510*g*, a washer/dryer 510*h*, a refrigerator 510*i*, a microwave 510*j*, autonomously motile device 510*k* (e.g., a robot), etc., may be connected to the network(s) 599 through a wireless service provider, over a Wi-Fi or cellular network connection, or the like. Other devices are included as network-connected support devices, such as the natural language command processing system component(s) 520, the skill system component(s) 525, and/or others. The support devices may connect to the network(s) 599 through a wired connection or wireless connection. Networked devices may capture audio using one-or-more built-in or connected microphones or other audio capture devices, with processing performed by ASR components, NLU components, or other components of the same device or another device connected via the network(s) 599, such as the ASR component 650, etc. of the natural language command processing system component(s) 520.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

receiving first natural language data corresponding to an entity;

determining first context data associated with the entity, the first context data corresponding to second natural language data representing a first example usage of the entity within at least one phrase;

processing, using a first machine learning (ML) model, the first natural language data and the first context data to generate first embedding data corresponding to the entity and the first context data, wherein the first embedding data represents a first contextual relationship between the entity and the first context data;

storing the first embedding data in a data store;

receiving first input data corresponding to a first user input provided to an input component, wherein the first user input is provided to the input component after the first embedding data has been stored in the data store;

following receipt of the first input data, retrieving the first embedding data from the data store;

determining, using the first input data and the first embedding data retrieved from the data store, first data;

processing the first data to generate first output data responsive to the first user input; and causing presentation of the first output data.

2. The computer-implemented method of claim 1, wherein processing, using the first ML model, the first natural language data and the first context data to generate the first embedding data comprises:

processing, using a first component, the first natural language data to generate first tokenized data corresponding to the first natural language data;

processing, using the first component, the first context data to generate second tokenized data corresponding to the first context data;

processing, using a first encoder, the first tokenized data to generate first encoded data, the first encoded data representing a second contextual relationship between a first set of tokens of the first tokenized data;

processing, using the first encoder, the second tokenized data to generate second encoded data, the second encoded data representing a third contextual relationship between a second set of tokens of the second tokenized data; and processing, using a second ML model, the first encoded data and the second encoded data to generate the first embedding data.

3. The computer-implemented method of claim 1, wherein:

the first embedding data is stored in the data store in association with a user profile associated with the entity;

the method further comprises determining the first input data is associated with the user profile; and the first embedding data is retrieved from the data store based at least in part on the first input data being associated with the user profile.

4. The computer-implemented method of claim 1, further comprising:

determining second context data associated with the entity, the second context data corresponding to a slot type associated with the entity;

determining third context data associated with the entity, the third context data corresponding to a phoneme representation corresponding to the entity;

determining fourth context data associated with the entity, the fourth context data corresponding to a natural language definition associated with the entity;

determining fifth context data associated with the entity, the fifth context data corresponding to audio data representing a spoken user input including the entity; and determining sixth context data associated with the entity, the sixth context data corresponding to image data associated with the entity, wherein processing the first natural language data and the first context data to generate the first embedding data further comprises processing, using the first ML model, the second context data, the third context data, the fourth context data, the fifth context data, and the sixth context data to generate the first embedding data.

5. The computer-implemented method of claim 1, wherein determining the first context data further comprises:

processing, by a first component, the first natural language data to generate the first context data, wherein the first component is configured to determine an example usage of the entity.

6. The computer-implemented method of claim 1, wherein the first embedding data further corresponds to second context data, different than the first context data, and the first contextual relationship is further between the entity, the first context data, and the second context data.

7. The computer-implemented method of claim 1, wherein the first input data corresponds to input audio data, and determining the first data further comprises:

performing automatic speech recognition (ASR) processing using the input audio data and the first embedding data to generate ASR data corresponding to a first transcript of the first user input.

8. The computer-implemented method of claim 1, wherein the first input data corresponds to a natural language user input, and determining the first data further comprises:

performing natural language processing using the natural language user input and the first embedding data to generate natural language processing data representing at least an intent corresponding to the first user input.

9. The computer-implemented method of claim 1, wherein:

the first data comprises a natural language prompt; and processing the first data comprises processing the natural language prompt using a language model to generate the first output data.

10. The computer-implemented method of claim 1, wherein the first example usage corresponds to a previous user input.

11. A computing system comprising:

at least one processor; and at least one memory including instructions that, when executed by the at least one processor, cause the computing system to:

receive first natural language data corresponding to an entity;

determine first context data associated with the entity, the first context data corresponding to second natural language data representing a first example usage of the entity within at least one phrase;

process, using a first machine learning (ML) model, the first natural language data and the first context data to generate first embedding data corresponding to the entity and the first context data, wherein the first embedding data represents a first contextual relationship between the entity and the first context data;

store the first embedding data in a data store:

receive first input data corresponding to a first user input provided to an input component, wherein the first user input is provided to the input component after the first embedding data has been stored in the data store;

following receipt of the first input data, retrieving the first embedding data from the data store:

determine, using the first input data and the first embedding data retrieved from the data store, first data;

process the first data to generate first output data responsive to the first user input; and cause presentation of the first output data.

12. The computing system of claim 11, wherein the instructions that cause the computing system to process, using the first ML model, the first natural language data and the first context data to generate the first embedding data comprise further instructions that, when executed by the at least one processor, further cause the computing system to:

process, using a first component, the first natural language data to generate first tokenized data corresponding to the first natural language data;

process, using the first component, the first context data to generate second tokenized data corresponding to the first context data;

process, using a first encoder, the first tokenized data to generate first encoded data, the first encoded data representing a second contextual relationship between a first set of tokens of the first tokenized data;

process, using the first encoder, the second tokenized data to generate second encoded data, the second encoded data representing a third contextual relationship between a second set of tokens of the second tokenized data; and process, using a second ML model, the first encoded data and the second encoded data to generate the first embedding data.

13. The computing system of claim 11, wherein the at least one memory further comprises instructions that, when executed by the at least one processor, further cause the computing system to:

store the first embedding data in the data store in association with a user profile associated with the entity;

determine the first input data is associated with the user profile; and retrieve the first embedding data from the data store based at least in part on the first input data being associated with the user profile.

14. The computing system of claim 11, wherein the at least one memory further comprises instructions that, when executed by the at least one processor, further cause the computing system to:

determine second context data associated with the entity, the second context data corresponding to a slot type associated with the entity;

determine third context data associated with the entity, the third context data corresponding to a phoneme representation corresponding to the entity;

determine fourth context data associated with the entity, the fourth context data corresponding to a natural language definition associated with the entity;

determine fifth context data associated with the entity, the fifth context data corresponding to audio data representing a spoken user input including the entity; and determine sixth context data associated with the entity, the sixth context data corresponding to image data associated with the entity, wherein the instructions that cause the computing system to process the first natural language data and the first context data to generate the first embedding data comprise further instructions that, when executed by the at least one processor, further cause the computing system to process, using the first ML model, the second context data, the third context data, the fourth context data, the fifth context data, and the sixth context data to generate the first embedding data.

15. The computing system of claim 11, wherein the instructions that cause the computing system to determine the first context data comprise further instructions that, when executed by the at least one processor, further cause the computing system to:

process, by a first component, the first natural language data to generate the first context data, wherein the first component is configured to determine an example usage of the entity.

16. The computing system of claim 11, wherein the first embedding data further corresponds to second context data, different than the first context data, and the first contextual relationship is further between the entity, the first context data, and the second context data.

17. The computing system of claim 11, wherein the first input data corresponds to input audio data, and the instructions that cause the computing system to determine the first data comprise further instructions that, when executed by the at least one processor, further cause the computing system to:

perform automatic speech recognition (ASR) processing using the input audio data and the first embedding data to generate ASR data corresponding to a first transcript of the first user input.

18. The computing system of claim 11, wherein the first input data corresponds to a natural language user input, and the instructions that cause the computing system to determine the first data comprise further instructions that, when executed by the at least one processor, further cause the computing system to:

perform natural language processing using the natural language user input and the first embedding data to generate natural language processing data representing at least an intent corresponding to the first user input.

19. The computing system of claim 11, wherein:

the first data comprises a natural language prompt; and the instructions that cause the computing system to process the first data comprise instructions that, when executed by the at least one processor, further cause the computing system to process the natural language prompt using a language model to generate the first output data.

20. The computing system of claim 11, wherein the first example usage corresponds to a previous user input.

* * * * *